(12) United States Patent
Yamazaki

(10) Patent No.: US 8,472,069 B2
(45) Date of Patent: Jun. 25, 2013

(54) DOT POSITION MEASUREMENT METHOD AND APPARATUS, AND COMPUTER READABLE MEDIUM

(75) Inventor: Yoshirou Yamazaki, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 561 days.

(21) Appl. No.: 12/728,774

(22) Filed: Mar. 22, 2010

(65) Prior Publication Data
US 2010/0238459 A1    Sep. 23, 2010

(30) Foreign Application Priority Data
Mar. 23, 2009   (JP) .................................. 2009-070607

(51) Int. Cl.
*G06K 15/10*   (2006.01)
(52) U.S. Cl.
USPC .................. 358/1.5; 347/19; 347/20; 347/40; 347/47
(58) Field of Classification Search
USPC ................................................. 358/1.1–3.29
See application file for complete search history.

(56) References Cited

U.S. PATENT DOCUMENTS
2008/0253607 A1   10/2008   Miyamoto et al.
2010/0079774 A1*   4/2010   Yamazaki ...................... 358/1.5

FOREIGN PATENT DOCUMENTS
JP   2004-275801 A   10/2004
JP   2006-168195 A   6/2006
JP   2008-44273 A   2/2008
JP   2008-80630 A   4/2008

* cited by examiner

*Primary Examiner* — Benny Q Tieu
*Assistant Examiner* — Marcellus Augustin
(74) *Attorney, Agent, or Firm* — Birch, Stewart, Kolasch & Birch, LLP

(57) ABSTRACT

According to an aspect of the present invention, the function expressing the relationship between the temporary recording element number and the line positions for each line block is obtained, and adequacy of the temporary recording element number is determined based on consistency between the line blocks having the characteristics expressed by the functions. For the line blocks that have different characteristics from the rest of the line blocks, it is determined that the temporary recording element numbers of such line blocks have errors, and these temporary recording element numbers are corrected. Thus, the correspondence relation between each recording element number and each line position can be defined so that the characteristics of the line blocks become consistent with one another.

26 Claims, 54 Drawing Sheets

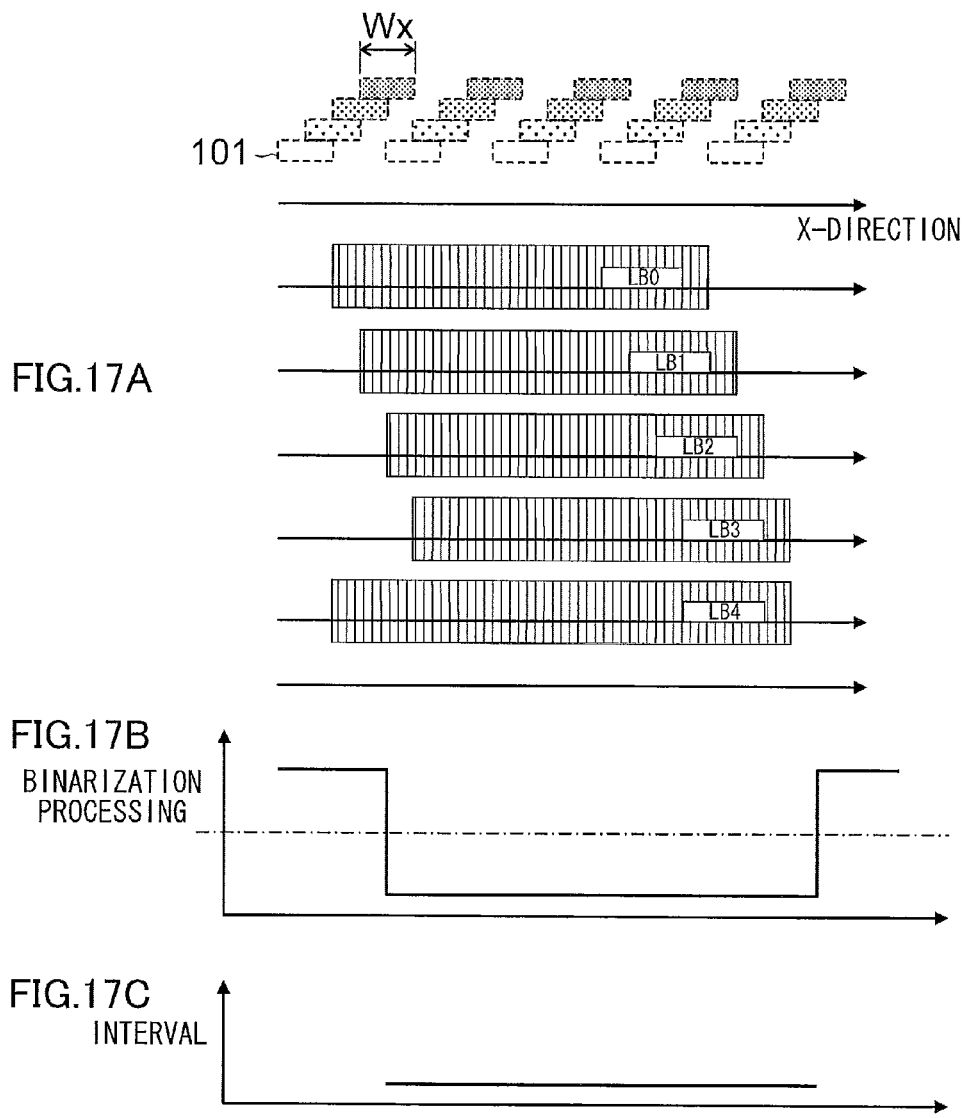

X-DIRECTION INTERVAL

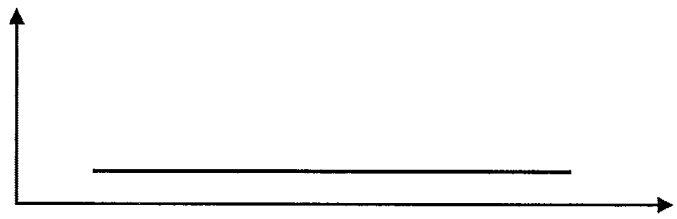
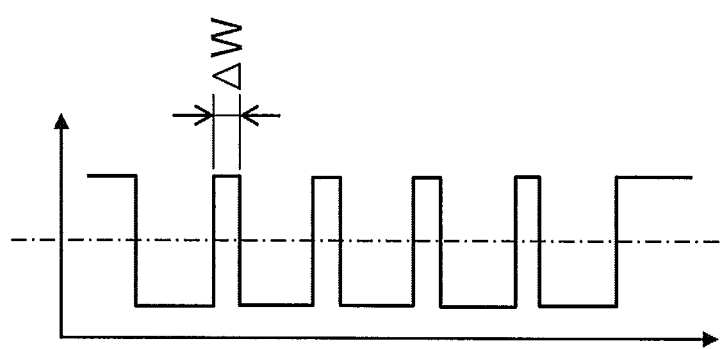
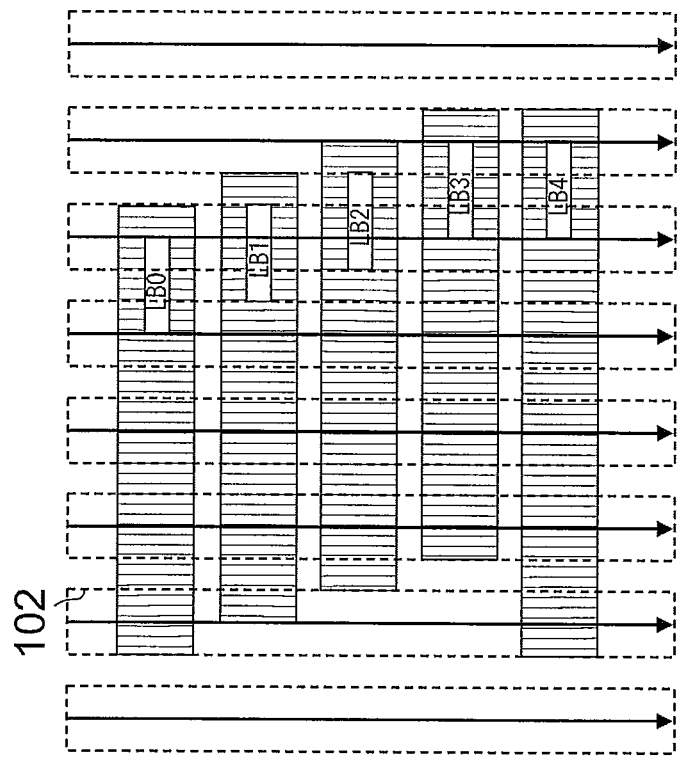

INTERSECTION BETWEEN X-DIRECTION
INTERVAL AND Y-DIRECTION INTERVAL

TARGET ROI, PARALLEL MOVEMENT AMOUNT
OF WHICH IS TO BE DETERMINED

FIG.36

|      | LB0 | LB1 | LB2 | LB3 | LB4 |
|------|-----|-----|-----|-----|-----|
| LB0  |     | θ01 | θ02 | θ03 | θ04 |
| LB1  |     |     | θ12 | θ13 | θ14 |
| LB2  |     |     |     | θ23 | θ24 |
| LB3  |     |     |     |     | θ34 |
| LB4  |     |     |     |     |     |

ERROR OF TEMPORARY NOZZLE NUMBER EXISTS

NO ERROR OF TEMPORARY NOZZLE NUMBER

NO ERROR OF TEMPORARY NOZZLE NUMBER

ERROR OF TEMPORARY NOZZLE NUMBER EXISTS

DOT POSITION MEASUREMENT METHOD AND APPARATUS, AND COMPUTER READABLE MEDIUM

BACKGROUND OF THE INVENTION

1. Field of the Invention

The present invention relates to a dot position measurement method, a dot position measurement apparatus, and a computer readable medium, and more particularly to dot position measurement technique suitable for measurement of a deposition position of a dot recorded by each nozzle of an inkjet head.

2. Description of the Related Art

One method of recording an image onto a recording medium such as recording paper is an inkjet drawing method in which an image is recorded by ejecting ink droplets in response to an image signal and depositing the ink droplets on the recording medium. As an image forming apparatus which employs such an inkjet drawing system, there exists a full-line head image drawing apparatus, in which ejection units (nozzles) which eject ink droplets are disposed in a line facing the whole of one side of the recording medium, and the recording medium is conveyed in a direction orthogonal to the line of the ejection units so as to record an image over the whole area of the recording medium.

By conveying the recording medium without moving the ejection units, the full-line head image drawing apparatus is able to draw an image over the whole area of the recording medium and increase the recording speed.

However, with line-head image forming apparatuses, there is the problem that streaks or unevenness of the image recorded on the recording medium occurs due to inconsistencies during production such as displacement of the ejection units.

Such streaks and unevenness are caused by scatter of the ink droplet deposition position, and techniques to correct streaks and unevenness, based on the deposition position, are known.

When measuring an error in deposition position, each of the nozzles needs to be specified to determine a relevant positional error. Japanese Patent Application Publication Nos. 2004-275801 and 2006-168195 disclose a technology for solving the problem of specifying a nozzle. More specifically, Japanese Patent Application Publication No. 2004-275801 discloses a technology for performing control to assume the on/off state of each nozzle, and specifying a nozzle by measuring the obtained result. However, this involves obtaining several nozzle ejection patterns in order to specify a nozzle, which increases the region required for detection. Japanese Patent Application Publication No. 2006-168195, on the other hand, discloses a technology for specifying a nozzle position using a coarse pattern. However, this involves adding a special pattern (coarse pattern) to the patterns used for measuring the nozzle positions, which increases the region required for measurement.

Japanese Patent Application Publication No. 2008-044273 discloses a technology whereby a line pattern and, at the same time, a reference pattern are read with a scanner, and the deposition position is measured while correcting any scanner conveyance errors. Japanese Patent Application Publication No. 2008-080630 discloses a technology which reads a line pattern with a scanner to determine the edge position of a line from the read image, and measure the line position (deposition position) from a plurality of edge positions for each line.

The followings are the problems in position measurement accuracy caused by an image reading apparatus (scanner).

In recent years, as paper widths have grown larger and higher line-head densities have been developed, the number of nozzles to be measured has reached the tens of thousands or more. For example, a recording width of eleven inches at a resolution of 1200 DPI requires 13200 nozzles per ink, and for the four inks of the CMYK color model, there are a total of 52800 nozzles. A print head with such a large number of nozzles requires a high-speed, high-accuracy, and low-cost deposition position measurement method.

More specifically, taking a 1200-DPI image drawing apparatus as an example, the recording lattice pitch for 1200 DPI is 21.17 µm, and a dot diameter equal to or more than 21.17×√2 is required to deposit dots without any gaps, and therefore a dot diameter of approximately 30 to 40 µm is required.

4800 DPI is about the upper limit for commercial scanners, even for high-resolution scanners, and, at this resolution, the reading lattice pitch of the scanner is approximately 5.29 µm. In comparison with the dot diameter, the deposition position must be found from as many as 6 to 8 pixels. These figures are cut in half for 2400 DPI. Although higher resolutions are desirable for reading devices (scanners) in order to improve deposition position accuracy, higher reading device resolutions cause (1) problems with the size of read image data, and (2) the problem that reading is not completed in a single pass.

Suppose, for example, that, for a reading resolution of 4800 DPI, the size of the deposition position precision measurement sample is A3-size, the A3 reading range is then 11.5 inches×15.5 inches, which means that, for a color image, the total data amount of the read image, for the 8 bits on each of the three RGB channels, is 12.3 GB. The reading resolution is 3.08 GB even for 2400 DPI. Such a large volume of data is time-consuming even when the data is written to a hard disk device (HDD).

Moreover, since current commercial scanners have a limited reading range at the highest resolution (4800 DPI for an A4 scanner and 2400 DPI for an A3 scanner, for example), reading cannot be performed all at once at the maximum reading range. The maximum reading range must therefore be divided into strips for reading.

Thus, in cases where a single image is divided up for reading, each initial operation of the scanner (the time taken to correct the brightness, and the time to move to the designated reading position) takes time. Typically, overlap regions must be added to the reading range in order to ensure mutual conformity between the data corresponding to the reading regions thus divided. Extra capacity for the image data of the overlap regions is required and the reading time is increased to the extent of the overlap regions. Typically, the larger the number of divisions of the whole reading range, the greater the proportion of the overlap regions to the reading range. Even if processing is performed to reduce the image data and the write time is reduced, dividing up an image causes problems, namely a larger image data capacity, and an increase in the reading time.

The technologies disclosed in Japanese Patent Application Publication Nos. 2008-044273 and 2008-080630 are faced by the problem that, because the main and sub-scanning resolutions during reading are the same, when these technologies are used, an image cannot be read all at once, or the processing time is long due to the large size of the image to be processed.

Further, many commercial scanners repeat operations of reading and data transfer, rather than reading in the whole of the reading range at a uniform speed. In this case, it is possible that the reading operation is interrupted and the carriage is halted, whereupon the carriage is moved again. Although there are no problems if a dot deposition position accuracy of approximately 10 μm is expected, when measurement accuracy is determined at the sub-micron level, then positional variation caused by this restarting of the carriage gives rise to error which cannot be ignored.

Furthermore, if the measurement object is long in the sub-scanning direction (this varies depending on the model of scanner, but as a general benchmark, 10 cm or longer, for instance), then positional variation caused by fluctuation in the carriage of the scanning mechanism also gives rise to error. Error of this kind is particular marked in the case of measuring a line pattern in which lines of dots deposited by mutually adjacent nozzles are arranged at different positions in the sub-scanning direction as shown in FIG. 51, which illustrates an example of a dot position measurement line pattern in the related art.

If the nozzle numbers are taken to be 0, 1, 2, 3, and so on, in sequence from the end of the line head, then the line block 0 shown in FIG. 51 is a block of a group of lines formed by nozzles having nozzle numbers of "4N+0" (where N is an integer equal to or greater than 0), such as the nozzle numbers 0, 4, 8, . . . . The line block 1 is a line block formed by nozzles having nozzle numbers of "4N+1", such as the nozzle numbers 1, 5, 9, . . . . The line block 2 is a line block formed by nozzles having nozzle numbers of "4N+2", and the line block 3 is a line block formed by nozzles having nozzle numbers of "4N+3". It is possible to form lines corresponding to all of the nozzles by means of a line pattern in which the line blocks of lines spaced apart by a uniform nozzle interval are arranged at different positions on the recording paper 16.

FIG. 52 is a diagram showing the relationship between the measurement positions for different sub-scanning positions of a scanner, in the related art. As shown in FIG. 52, the measurement positions when measuring the respective line positions of line blocks A and B, which are arranged at different positions in the sub-scanning direction, have a linear relationship. Error caused by the scanner such as that described above is expressed as disruption of the grid coordinates read in by the scanner.

FIG. 53 shows results of measuring position (dot position) errors in each line from a line pattern in which line blocks spaced at an interval of 16 nozzles apart are arranged at different positions in the sub-scanning direction, in the related art, instead of the line blocks spaced at the interval of 4 nozzles apart as shown in FIG. 51.

Although error in the respective nozzle positions ought to be random, regular positional error having a period of 16 nozzles occurs in the overall line pattern, as shown in FIG. 53. This is because each line block in a different position in the sub-scanning direction includes offset-type positional error.

Thus, even if measurement accuracy is achieved in respect of the data within each of the line blocks which are divided into a plurality of line blocks in the sub-scanning direction, a certain offset error occurs in the measurement accuracy between respective line blocks, and therefore a phenomenon occurs whereby the measurement results repeat a similar shape at a period equal to the number of line blocks.

Error of approximately 2 to 3 μm is generally not a problem in relation to the resolution of the scanner (for example, 2400 dpi); however, if the objective is measurement at the sub-micron order, then divergence of this kind cannot be ignored and becomes problematic when the measurement results for a plurality of line blocks are merged together.

Moreover, apart from error caused by the scanner, a similar phenomenon also occurs in relation to deformation of the paper. For example, in a printing apparatus which ejects and deposits droplets of ink on a recording paper after applying a treatment liquid to the recording paper, error occurs due to variation in the elongation of the recording paper between the printing start position and the printing end position. In the measurement of dot deposition positions after deformation of the paper, the offset error and the extension error in the line spacing are compounded together.

Furthermore, FIG. 54 shows a diagram in which equally spaced lines are read in by a scanner and the line spacing is plotted for each main scanning position, in the related art. Although the line spacing is ideally constant, the line spacing is actually changed in the main scanning direction since there is positional distortion in the main scanning direction of the scanner. This positional distortion in the main scanning direction tends to vary with the sub-scanning position.

In FIG. 54, the sub-scanning position 1, the sub-scanning position 2 and the sub-scanning position 3 are respectively different sub-scanning positions and indicate results of reading in sub-scanning direction lines which are arranged at equal spacing in the main scanning direction. Since the positional distortion characteristics in the main scanning direction vary depending on the sub-scanning position, then these characteristics tend to be different.

FIG. 55 is a diagram plotting the difference in the line spacing between the sub-scanning position 2 and the sub-scanning position 3, with reference to the sub-scanning position 1, in the related art. The characteristics of the positional distortion in the main scanning direction at the sub-scanning position 2 and the sub-scanning position 3 with respect to the sub-scanning position 1 are such that the line spacing tends to become shorter towards a central position in the main scanning direction. The characteristics of the positional distortion in the main scanning direction at the sub-scanning positions 2 and 3 show tendencies very different from each other in the vicinity of a 250 mm position in the main scanning direction.

As described above, in a scanner apparatus that has distortion in the main scanning direction, distortion occurs in the positions determined on the basis of the grid positions of the image read by the scanner. If this distortion has a tendency to vary with the sub-scanning position, then it is necessary to have two-dimensional parameters (in the main scanning direction and the sub-scanning direction) for correcting the distortion, and a scale which is accurate in the two dimensions is required in order to measure correction parameters of this kind. A two-dimensional scale of this kind is extremely expensive and difficult to handle, and in general, in order to compensate for the measurement accuracy, it is necessary to save the correction parameters periodically, and therefore the cost involved in measurement and saving parameters becomes very high indeed.

In respect of the above-described problems, Japanese Patent Application Publication Nos. 2008-044273 and 2008-080630 do not teach or suggest technology for correcting disturbance of image data read out by a scanner.

SUMMARY OF THE INVENTION

The present invention has been contrived in view of these circumstances, an object thereof being to provide a dot position measurement method and apparatus and a computer readable medium containing a program used in same, whereby the aforementioned problems can be resolved, and dot positions recorded by recording elements (e.g., nozzles) can be measured with high accuracy without requiring any special pattern for specifying the recording elements, and also to provide a technology for solving the above-mentioned problems in position measurement accuracy caused by an image reading apparatus (e.g., a scanner).

In order to attain the aforementioned object, the present invention is directed to a dot position measurement method, comprising: a line pattern forming step of forming a measurement line pattern including a plurality of lines formed by dot sequences corresponding to respective recording elements on a recording medium, by continuously recording dots by the recording elements while causing a recording head having the recording elements and the recording medium to move relatively to each other in a relative movement direction, the measurement line pattern including a plurality of line blocks each constituted of a group of lines to be recorded using the recording elements spaced a prescribed interval apart in an effective direction of alignment of the recording elements which is perpendicular to the relative movement direction, the line blocks being formed at mutually different positions in a lengthwise direction of the lines on the recording medium; a reading step of reading the measurement line pattern formed on the recording medium in the line pattern forming step by an image reading device, and acquiring electronic image data representing a read image of the measurement line pattern; a position-in-line-block identifying step of identifying line positions in each of the line blocks, from the read image acquired in the reading step; a function determination step of providing a temporary recording element number corresponding to the line positions within each of the line blocks, and obtaining a function representing a relationship between the temporary recording element number and the line positions for each of the line blocks; a determination step of determining whether there is an error in the temporary recording element number for each of the line blocks, between the line blocks, in accordance with the function obtained for each of the line blocks; and a recording element position specifying step of changing the temporary recording element number of at least one of the line blocks which is determined to have the error in the temporary recording element number in the determination step, and specifying a correspondence relation between the line positions within each of the line blocks and the recording elements.

According to the present invention, the function expressing the relationship between the temporary recording element number and the line positions for each line block is obtained, and adequacy of the temporary recording element number is determined based on consistency between the line blocks having the characteristics expressed by the functions. For the line blocks that have different characteristics from the rest of the line blocks, it is determined that the temporary recording element numbers of such line blocks have errors, and these temporary recording element numbers are corrected. Thus, the correspondence relation between each recording element number and each line position can be defined so that the characteristics of the line blocks become consistent with one another.

This will help to accurately define the correspondence relation between each recording element number and each line position, even in the case where unrecordable recording elements are generated at the end of a group of lines configuring each line block. Therefore, highly accurate position measurement can be performed. Moreover, no special pattern is required in order to understand the position of each recording element, and the problem in which the area required by a measurement line pattern increases can be avoided.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIGS. 17A to 17C are explanatory diagrams of an X-direction interval calculation method;

FIGS. 20A to 20C are explanatory diagrams of a Y-direction interval calculation method;

FIG. 36 is an explanatory diagram showing a matrix for calculating an inclination angle between line blocks;

DETAILED DESCRIPTION OF THE PREFERRED EMBODIMENTS

Here, an example of the application to the measurement of the dot deposition positions (that is, dot positions) by an inkjet recording apparatus is described. Firstly, the overall composition of an inkjet recording apparatus will be described.

Description of Inkjet Recording Apparatus

Figure 1:
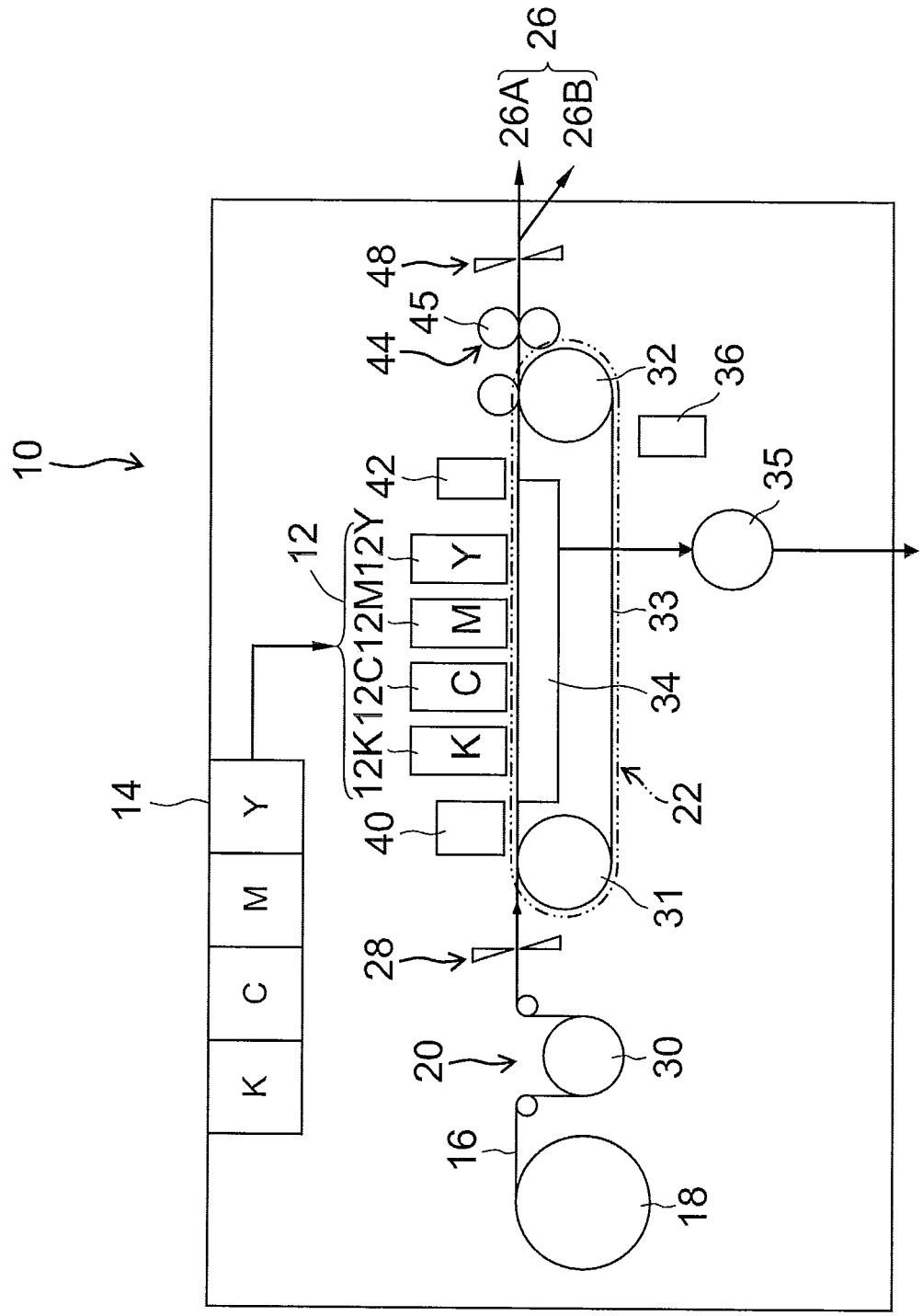
FIG. 1 is a general schematic drawing of an inkjet recording apparatus.

FIG. 1 is a general schematic drawing of an inkjet recording apparatus. As illustrated in FIG. 1, the inkjet recording apparatus 10 includes: a print unit 12 having a plurality of inkjet recording heads (corresponding to "liquid ejection heads", hereinafter referred to as "heads") 12K, 12C, 12M and 12Y provided for ink colors of black (K), cyan (C), magenta (M), and yellow (Y), respectively; an ink storing and loading unit 14 for storing inks to be supplied to the heads 12K, 12C, 12M and 12Y; a paper supply unit 18 for supplying recording paper 16 forming a recording medium; a decurling unit 20 for removing curl in the recording paper 16; a belt conveyance unit 22, disposed facing the nozzle face (ink ejection face) of the print unit 12, for conveying the recording paper 16 while keeping the recording paper 16 flat; and a paper output unit 26 for outputting recorded recording paper (printed matter) to the exterior.

The ink storing and loading unit 14 has ink tanks for storing the inks of each color to be supplied to the heads 12K, 12C, 12M, and 12Y, respectively, and the tanks are connected to the heads 12K, 12C, 12M, and 12Y by means of prescribed channels.

In FIG. 1, a magazine for rolled paper (continuous paper) is illustrated as an example of the paper supply unit 18; however, a plurality of magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording medium (media) can be used, it is desirable that a device for identifying the type of recording medium to be used (type of medium) is provided, and ink-droplet ejection is controlled so that the ink-droplets are ejected in an appropriate manner in accordance with the type of medium.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is desirably controlled so that the recording paper 16 has a curl in which the surface on which the print is to be made is slightly round outward.

The decurled recording paper 16 is cut by a cutter (first cutter) 28 into a desired size, and is delivered to the belt conveyance unit 22. The belt conveyance unit 22 has a configuration in which an endless belt 33 is set around rollers 31 and 32 so that the portion of the endless belt 33 facing at least the nozzle face of the print unit 12 forms a horizontal plane (flat plane).

The belt 33 has a width that is greater than the width of the recording paper 16, and a plurality of suction apertures (not illustrated) are formed on the belt surface. A suction chamber 34 is disposed in a position facing the nozzle surface of the print unit 12 on the interior side of the belt 33, which is set around the rollers 31 and 32. The suction chamber 34 provides suction with a fan 35 to generate a negative pressure, and the recording paper 16 is held on the belt 33 by suction. It is also possible to use an electrostatic attraction method, instead of a suction-based attraction method.

The belt 33 is driven in the clockwise direction in FIG. 1 by the motive force of a motor 88 (illustrated in FIG. 6) being transmitted to at least one of the rollers 31 and 32, and the recording paper 16 held on the belt 33 is conveyed from left to right in FIG. 1.

A belt-cleaning unit 36 is disposed in a predetermined position (a suitable position outside the printing area) on the exterior side of the belt 33. Although the details of the configuration of the belt-cleaning unit 36 are not illustrated, examples thereof include a configuration of nipping with a brush roller and a water absorbent roller or the like, an air blow configuration of blowing clean air, or a combination of these.

A heating fan 40 is disposed on the upstream side of the print unit 12 in the conveyance pathway formed by the belt conveyance unit 22. The heating fan 40 blows heated air onto the recording paper 16 to heat the recording paper 16 immediately before printing so that the ink deposited on the recording paper 16 dries more easily.

Figure 2A:
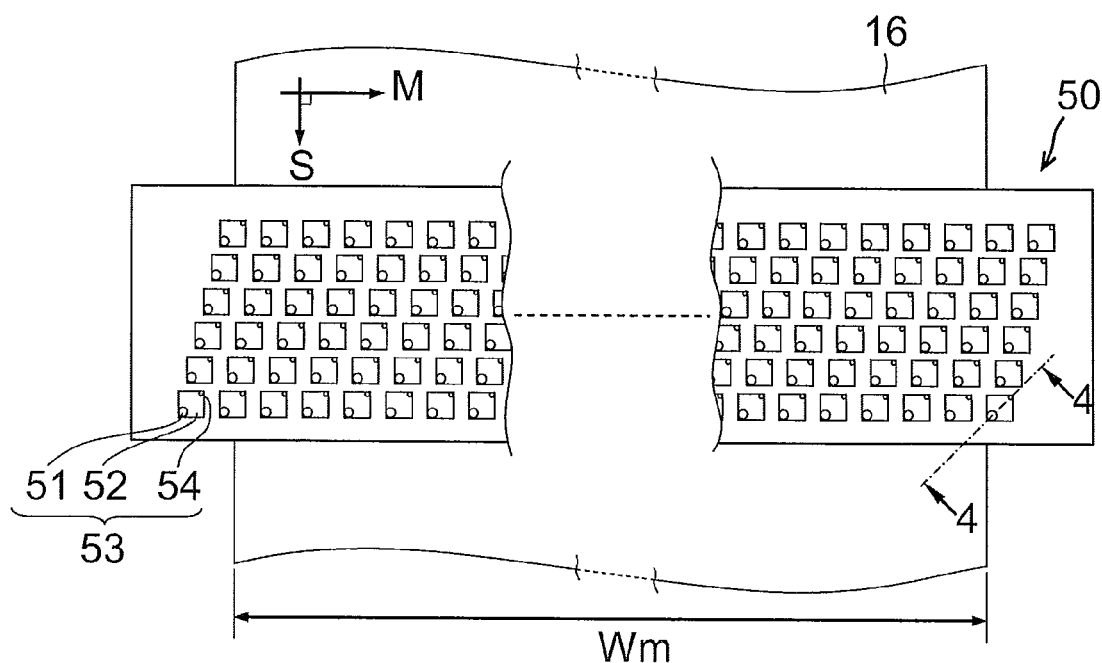
FIGS. 2A and 2B are plan view perspective diagrams illustrating an example of the composition of a print head.
Figure 2B:
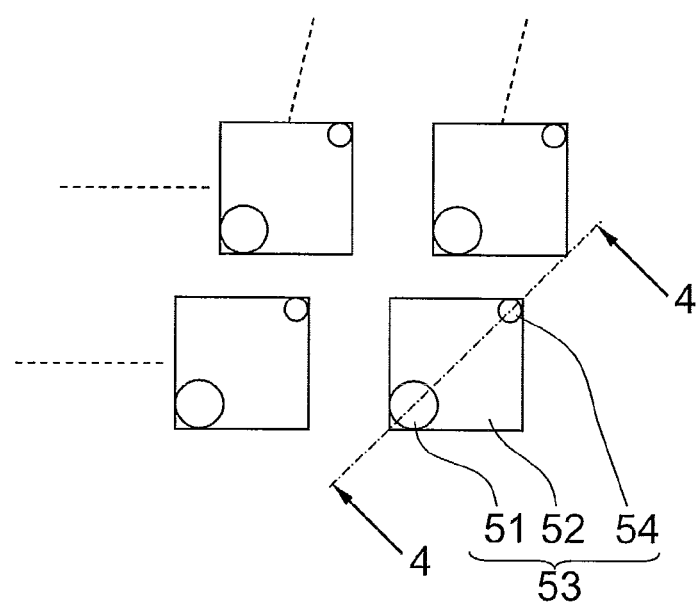

The heads 12K, 12C, 12M and 12Y of the print unit 12 are full line heads having a length corresponding to the maximum width of the recording paper 16 used with the inkjet recording apparatus 10, and comprising a plurality of nozzles for ejecting ink arranged on a nozzle face through a length exceeding at least one edge of the maximum-size recording medium (namely, the full width of the printable range) (see FIGS. 2A and 2B).

The print heads 12K, 12C, 12M and 12Y are arranged in color order (black (K), cyan (C), magenta (M), yellow (Y)) from the upstream side in the feed direction of the recording paper 16, and the respective heads 12K, 12C, 12M and 12Y are arranged to extend along a direction substantially perpendicular to the conveyance direction of the recording paper 16.

A color image can be formed on the recording paper 16 by ejecting inks of different colors from the heads 12K, 12C, 12M and 12Y, respectively, onto the recording paper 16 while the recording paper 16 is conveyed by the belt conveyance unit 22.

By adopting a configuration in which the full line heads 12K, 12C, 12M and 12Y having nozzle rows covering the full paper width are provided for the respective colors in this way, it is possible to record an image on the full surface of the recording paper 16 by performing just one operation of relatively moving the recording paper 16 and the print unit 12 in the paper conveyance direction (the sub-scanning direction), in other words, by means of a single sub-scanning action. It is possible for the image formation based on a single-pass system with such a full-line type (page-wide type) head to perform high speed printing, compared to the image formation based on a multi-pass system with a serial (shuttle) head reciprocating in a direction (main scanning direction) perpendicular to the conveyance direction (sub-scanning direction) of a recording medium, thereby improving printing productivity.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

A post-drying unit 42 is disposed following the print unit 12. The post-drying unit 42 is a device to dry the printed image surface, and includes a heating fan, for example. It is desirable to avoid contact with the printed surface until the printed ink dries, and a device that blows heated air onto the printed surface is desirable.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are desirably outputted separately. In the inkjet recording apparatus 10, a sorting device (not illustrated) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. Although not illustrated in FIG. 1, the paper output unit 26A for the target prints is provided with a sorter for collecting prints according to print orders. Moreover, the inkjet recording apparatus 10 is also provided with: a head maintenance unit for cleaning the heads 12K, 12C, 12M and 12Y (e.g., wiping of the nozzle surface, purging, and suction for the nozzles); sensors for determining the position of the recording paper 16 in the medium conveyance path, and the like; and temperature sensors for measuring temperature in the respective parts of the inkjet recording apparatus 10.

<Structure of the Head>

Next, the structure of a head will be described. The heads 12K, 12C, 12M and 12Y of the respective ink colors have the same structure, and a reference numeral 50 is hereinafter designated to any of the heads.

Figure 3:
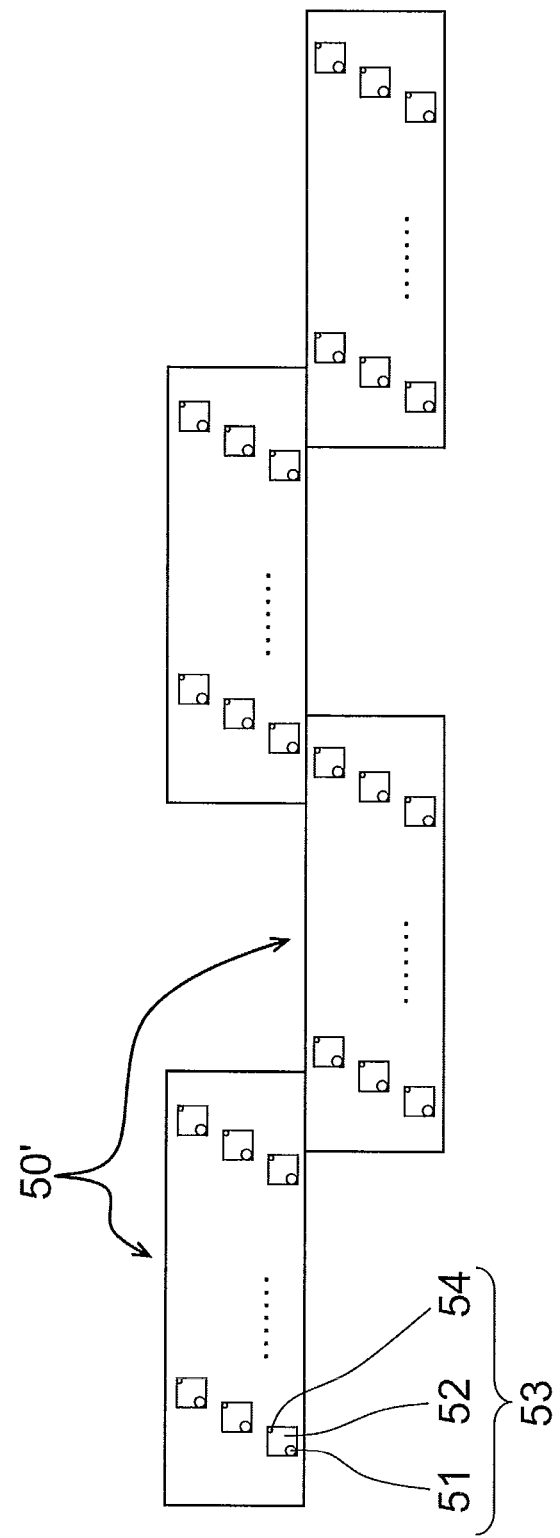
FIG. 3 is a plan view perspective diagram illustrating a further example of the composition of a full line head.
Figure 4:
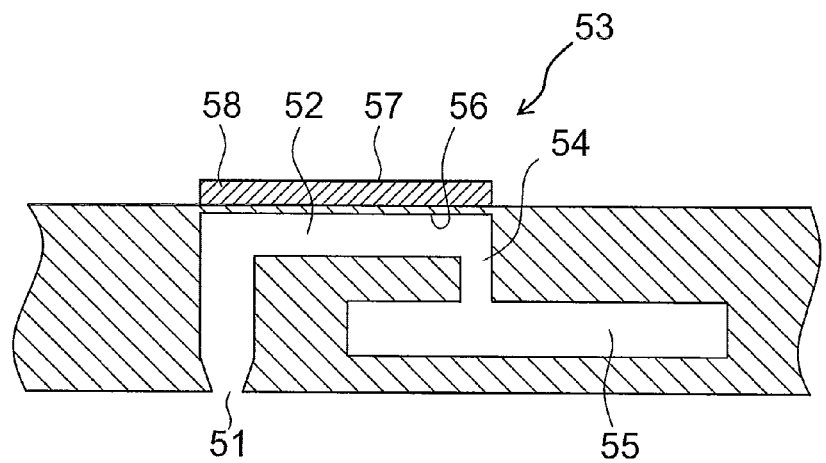
FIG. 4 is a cross-sectional view along line 4-4 in FIGS. 2A and 2B.

FIG. 2A is a plan view perspective diagram illustrating an example of the structure of a head 50, and FIG. 2B is an enlarged diagram of a portion of same. Furthermore, FIG. 3 is a plan view perspective diagram (a cross-sectional view along the line 4-4 in FIGS. 2A and 2B) illustrating another example of the structure of the head 50, and FIG. 4 is a cross-sectional diagram illustrating the composition of a liquid droplet ejection element corresponding to one which forms a unit recording element (namely, an ink chamber unit corresponding to one nozzle 51).

As illustrated in FIGS. 2A and 2B, the head 50 according to the present embodiment has a structure in which a plurality of ink chamber units (droplet ejection elements) 53, each comprising a nozzle 51 forming an ink ejection port, a pressure chamber 52 corresponding to the nozzle 51, and the like, are disposed two-dimensionally in the form of a staggered matrix, and hence the effective nozzle interval (the projected nozzle pitch) as projected (orthogonal projection) in the lengthwise direction of the head (the direction perpendicular to the paper conveyance direction) is reduced and high nozzle density is achieved.

The mode of forming nozzle rows with a length not less than a length corresponding to the entire width Wm of the recording paper 16 in a direction (the direction of arrow M; main-scanning direction) substantially perpendicular to the conveyance direction (the direction of arrow S; sub-scanning direction) of the recording paper 16 is not limited to the example described above. For example, instead of the configuration in FIG. 2A, as illustrated in FIG. 3, a line head having nozzle rows of a length corresponding to the entire width of the recording paper 16 can be formed by arranging and combining, in a staggered matrix, short head modules 50' having a plurality of nozzles 51 arrayed in a two-dimensional fashion.

As illustrated in FIGS. 2A and 2B, the planar shape of the pressure chamber 51 provided corresponding to each nozzle 52 is substantially a square shape, and an outlet port to the nozzle 51 is provided at one of the ends of a diagonal line of the planar shape, while an inlet port (supply port) 54 for supplying ink is provided at the other end thereof. The shape of the pressure chamber 52 is not limited to that of the present example and various modes are possible in which the planar shape is a quadrilateral shape (rhomb shape, rectangular shape, or the like), a pentagonal shape, a hexagonal shape, or other polygonal shape, or a circular shape, elliptical shape, or the like.

As illustrated in FIG. 4, each pressure chamber 52 is connected to a common channel 55 through the supply port 54. The common channel 55 is connected to an ink tank (not shown), which is a base tank that supplies ink, and the ink supplied from the ink tank is delivered through the common flow channel 55 to the pressure chambers 52.

An actuator 58 provided with an individual electrode 57 is bonded to a pressure plate (a diaphragm that also serves as a common electrode) 56 which forms the surface of one portion (in FIG. 4, the ceiling) of the pressure chambers 52. When a drive voltage is applied to the individual electrode 57 and the common electrode, the actuator 58 deforms, thereby changing the volume of the pressure chamber 52. This causes a pressure change which results in ink being ejected from the nozzle 51. For the actuator 58, it is possible to adopt a piezoelectric element using a piezoelectric body, such as lead zirconate titanate, barium titanate, or the like. When the displacement of the actuator 58 returns to its original position after ejecting ink, the pressure chamber 52 is replenished with new ink from the common channel 55 via the supply port 54.

By controlling the driving of the actuators 58 corresponding to the nozzles 51 in accordance with the dot arrangement data generated from the input image, it is possible to eject ink droplets from the nozzles 51. By controlling the ink ejection timing of the nozzles 51 in accordance with the speed of conveyance of the recording paper 16, while conveying the recording paper in the sub-scanning direction at a uniform speed, it is possible to record a desired image on the recording paper 16.

Figure 5:
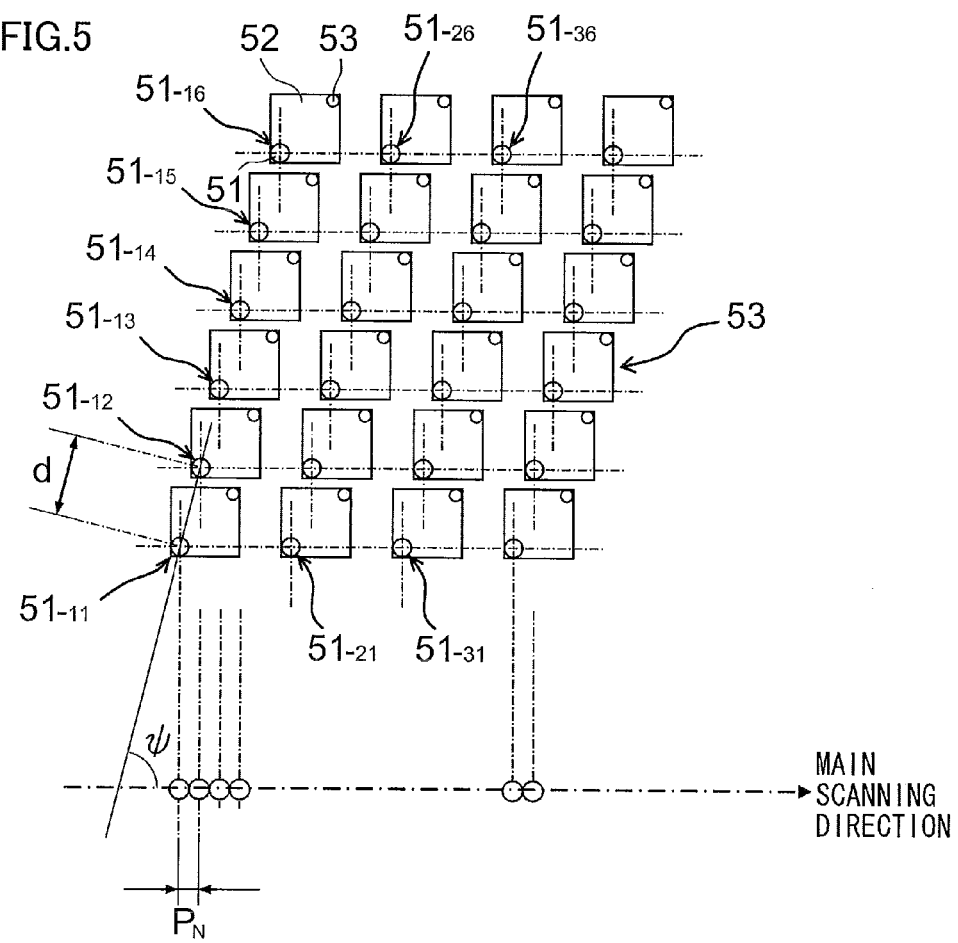
FIG. 5 is an enlarged diagram illustrating an example of the arrangement of nozzles in a head.

As illustrated in FIG. 5, the high-density nozzle head according to the present embodiment is achieved by arranging obliquely a plurality of ink chamber units 53 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a direction forming an angle of ψ with respect to the main scanning direction, the nozzles 51 can be regarded to be substantially equivalent to those arranged linearly at a fixed pitch $P_N = d \times \cos \psi$ along the main scanning direction.

When the nozzles 51 arranged in a matrix such as that illustrated in FIG. 5 are driven, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block; . . . ); and one line (a line formed of a row of dots, or a line formed of a plurality of rows of dots) is printed in the width direction of the recording paper 16 (the direction perpendicular to the conveyance direction of the recording paper) by sequentially driving the nozzles from one end toward the other end in each block (sequentially driving the nozzles 51-11, 51-12, . . . , 51-16) in accordance with the conveyance velocity of the recording paper 16.

The direction along the one line (or the lengthwise direction of a band-shaped region) printed by such the nozzle driving (main scanning) is referred to as the "main scanning direction", and it is referred to as the "sub-scanning" to perform printing of one line (a line formed of a row of dots, or a line formed of a plurality of rows of dots) formed by the main scanning, while moving the head and the recording paper 16 relatively to each other, repeatedly in the relative moving direction. In other words, in the present embodiment, the conveyance direction of the recording paper 16 is the sub-scanning direction, and the direction perpendicular to the sub-scanning direction is the main scanning direction.

The present embodiment applies the piezoelectric elements as ejection power generation devices to eject the ink from the nozzles 51 arranged in the head 50; however, the devices for generating pressure for ejection (ejection energy) are not limited to the piezoelectric elements, and it is possible to employ various devices and systems, such as actuators operated by heaters (heating elements) based on a thermal method, or actuators using another method.

In implementing the present invention, the mode of arrangement of the nozzles 51 in the head 250 is not limited to the examples shown in the drawings, and various difference nozzle arrangement structures can be employed. For example, instead of a matrix arrangement as described in FIGS. 2A and 2B, it is also possible to use a single linear arrangement, a V-shaped nozzle arrangement, or an undulating nozzle arrangement, such as zigzag configuration (W-shape arrangement), which repeats units of V-shaped nozzle arrangements.

<Description of Control System>

Figure 6:
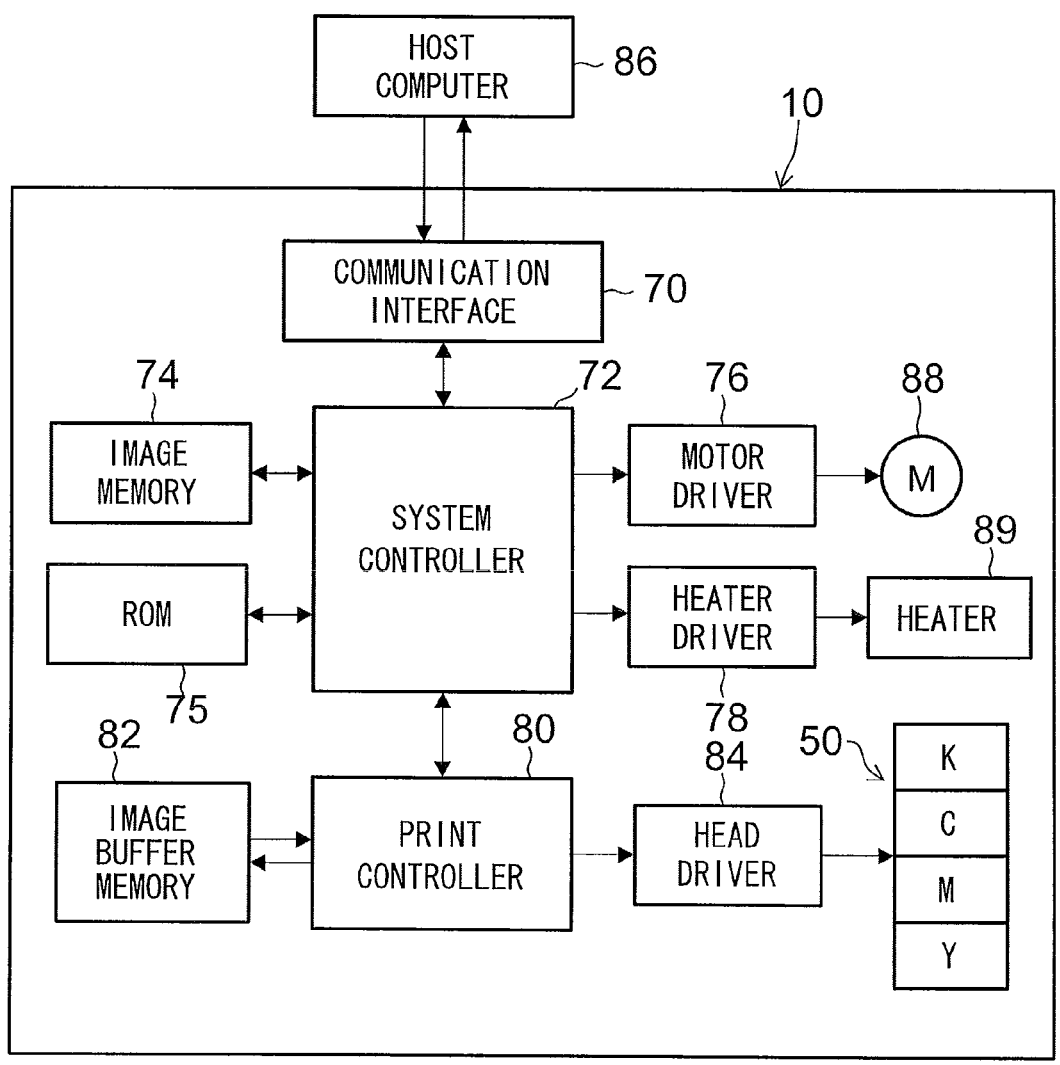
FIG. 6 is a block diagram illustrating a system composition of the inkjet recording apparatus.

FIG. 6 is a block diagram illustrating the system configuration of the inkjet recording apparatus 10. As illustrated in FIG. 6, the inkjet recording apparatus 10 includes: a communication interface 70, a system controller 72, an image memory 74, a ROM 75, a motor driver 76, a heater driver 78, a print controller 80, an image buffer memory 82, a head driver 84, and the like.

The communication interface 70 is an interface unit (image input unit) for receiving image data sent from a host computer 86. A serial interface such as USB (Universal Serial Bus), IEEE1394, Ethernet (registered trademark), wireless network, or a parallel interface such as a Centronics interface may be used as the communication interface 70. A buffer memory (not illustrated) may be mounted in this portion in order to increase the communication speed.

The image data sent from the host computer 86 is received by the inkjet recording apparatus 10 through the communication interface 70, and is stored temporarily in the image memory 74. The image memory 74 is a storage device for storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communication interface 70, image memory 74, motor driver 76, heater driver 78, and the like, as well as controlling communications with the host computer 86 and writing and reading to and from the image memory 74 and ROM 75, and it also generates control signals for controlling the motor 88 and heater 89 of the conveyance system.

Programs executed by the CPU of the system controller 72 and the various types of data which are required for control procedures are stored in the ROM 75. The ROM 75 may be a non-writeable storage device, or it may be a rewriteable storage device, such as an EEPROM. The image memory 74 is used as a temporary storage region for the image data, and it is also used as a program development region and a calculation work region for the CPU.

The motor driver (drive circuit) 76 drives the motor 88 of the conveyance system in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data (original image data) stored in the image memory 74 in accordance with commands from the system controller 72 so as to supply the generated print data (dot data) to the head driver 84.

The print controller 80 is provided with the image buffer memory 82; and image data, parameters, and other data are temporarily stored in the image buffer memory 82 when image data is processed in the print controller 80. The aspect illustrated in FIG. 6 is one in which the image buffer memory 82 accompanies the print controller 80; however, the image memory 74 may also serve as the image buffer memory 82. Also possible is an aspect in which the print controller 80 and the system controller 72 are integrated to form a single processor.

To give a general description of the sequence of processing from image input to print output, image data to be printed (original image data) is input from an external source via a communications interface 70, and is accumulated in the image memory 74. At this stage, RGB image data is stored in the image memory 74, for example.

In this inkjet recording apparatus 10, an image which appears to have a continuous tonal graduation to the human eye is formed by changing the droplet ejection density and the dot size of fine dots created by ink (coloring material), and therefore, it is necessary to convert the input digital image into a dot pattern which reproduces the tonal gradations of the image (namely, the light and shade toning of the image) as faithfully as possible. Therefore, original image data (RGB data) stored in the image memory 74 is sent to the print controller 80 through the system controller 72, and is converted to the dot data for each ink color by a half-toning technique, using a threshold value matrix, error diffusion, or the like, in the print controller 80.

In other words, the print controller 80 performs processing for converting the input RGB image data into dot data for the four colors of K, C, M and Y. The dot data generated by the print controller 180 in this way is stored in the image buffer memory 82.

The head driver 84 outputs a drive signal for driving the actuators 58 corresponding to the nozzles 51 of the head 50, on the basis of print data (in other words, dot data stored in the image buffer memory 82) supplied by the print controller 80. A feedback control system for maintaining constant drive conditions in the head may be included in the head driver 84.

By supplying the drive signal output by the head driver 84 to the head 50, ink is ejected from the corresponding nozzles 51. By controlling ink ejection from the print heads 50 in synchronization with the conveyance speed of the recording paper 16, an image is formed on the recording paper 16.

As described above, the ejection volume and the ejection timing of the ink droplets from the respective nozzles are controlled via the head driver 84, on the basis of the dot data generated by implementing prescribed signal processing in the print controller 80, and the drive signal waveform. By this means, desired dot sizes and dot positions can be achieved.

Furthermore, the print controller 80 carries out various corrections with respect to the head 50, on the basis of information on the dot positions acquired by the dot position measurement method described below, and furthermore, it implements control for carrying out cleaning operations (nozzle restoration operations), such as preliminary ejection or nozzle suctioning, or wiping, according to requirements.

Explanation of Dot Position Measurement Method

The dot position measurement method according to the present embodiment will be described in detail hereinafter.

Figure 7:
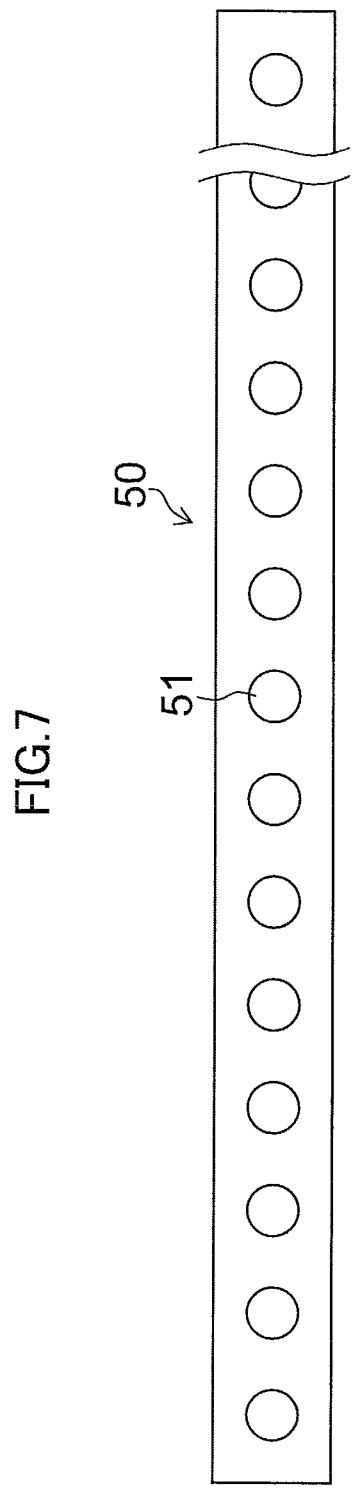
FIG. 7 is a schematic drawing illustrating a full line type of head.
Figure 8A:
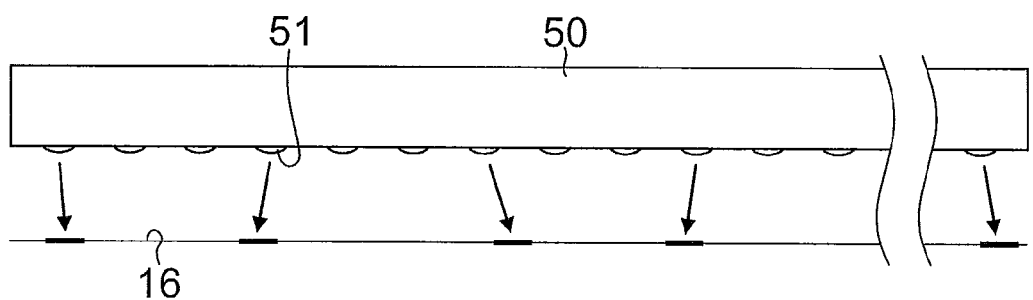
FIGS. 8A to 8C are explanatory diagrams of ejection characteristics of a print head, and lines recorded by the print head.
Figure 8B:
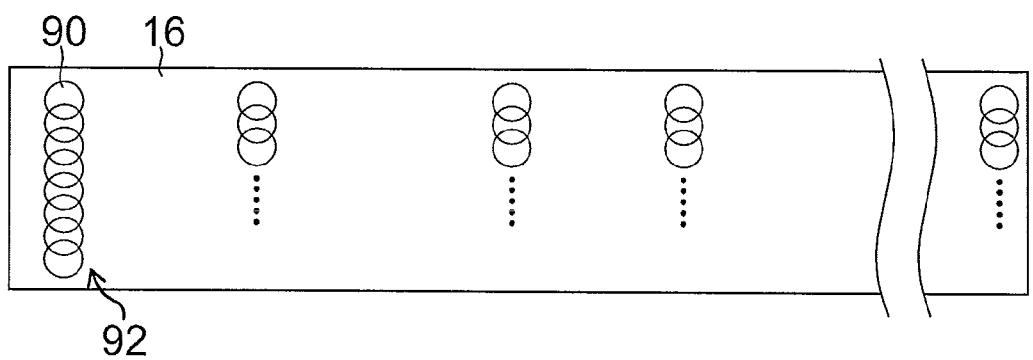
Figure 8C:
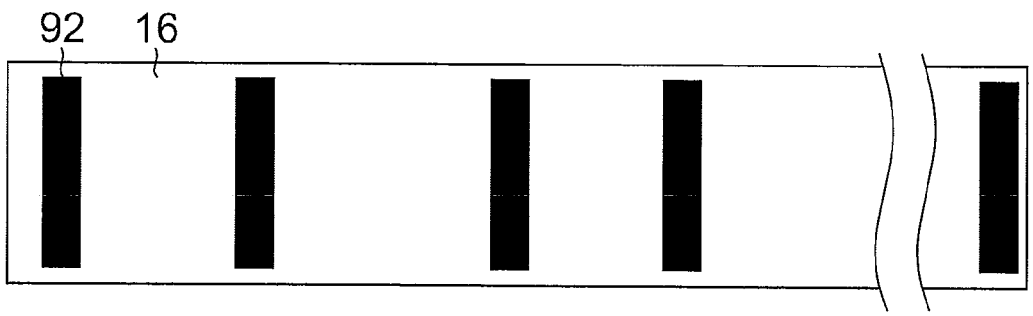

FIG. 7 is a schematic drawing illustrating a full line head. In order to simplify the illustration, FIG. 7 illustrates a head 50 with a plurality of nozzles 51 in a single row. However, as illustrated in FIGS. 2A to 5, a matrix head with a plurality of nozzles arranged in two dimensions is of course also applicable. That is, in light of a substantial nozzle row obtained by orthogonally projecting a nozzle group in a two-dimensional array on a straight line in the main scanning direction, such a nozzle group in a two-dimensional array can be treated so as to be substantially equivalent to one nozzle row FIG. 8A illustrates an aspect in which the deposition position varies with respect to an ideal position, due to inconsistency in the ejection direction of ink droplets ejected by the nozzles in a line head. FIG. 8B is an example for when a print head 50 with the characteristics illustrated in FIG. 8A is used to draw a line on recording paper 16, in the sub-scanning direction. When the recording paper 16 is conveyed while droplets are ejected toward the recording paper 16 from the nozzles 51 of the head 50, the ink droplets deposition on the recording paper 16, and, as illustrated in FIG. 8B, a dot row (line 92) in which a row of dots 90 caused by the ink droplets deposited from the nozzles 51 stand in a line, is formed. FIG. 8C illustrates line 92 in FIG. 8B in simplified form. Hereinafter, the line 92 formed by a row of deposited dots caused by continuously ejected droplets, will be described using FIG. 8C to facilitate the illustration.

As illustrated in FIGS. 8B and 8C, each of the lines 92 is formed by continuous droplets from a single nozzle 51. When a line head of high recording density is used, because there is a partial overlap between the dots of adjacent nozzles when ejection is performed simultaneously from all the nozzles, a line comprising a single dot row is not formed. In order to prevent a mutual overlap between the lines 92, there is desirably at least one nozzle, and desirably three or more nozzles between the simultaneously ejecting nozzles at a distance therefrom. Note that FIGS. 8A to 8C illustrate an aspect in which there is a two-nozzle interval between the simultaneously ejecting nozzles for illustrative purposes.

As can be seen from FIGS. 8A to 8C, the line position changes according to the dot deposition position, based on the characteristics of the print head. In other words, it is clear that measuring the deposition position of each nozzle is the same thing as measuring the positions of the lines.

<Example of a Dot Position Measurement Line Pattern>

Figure 9:
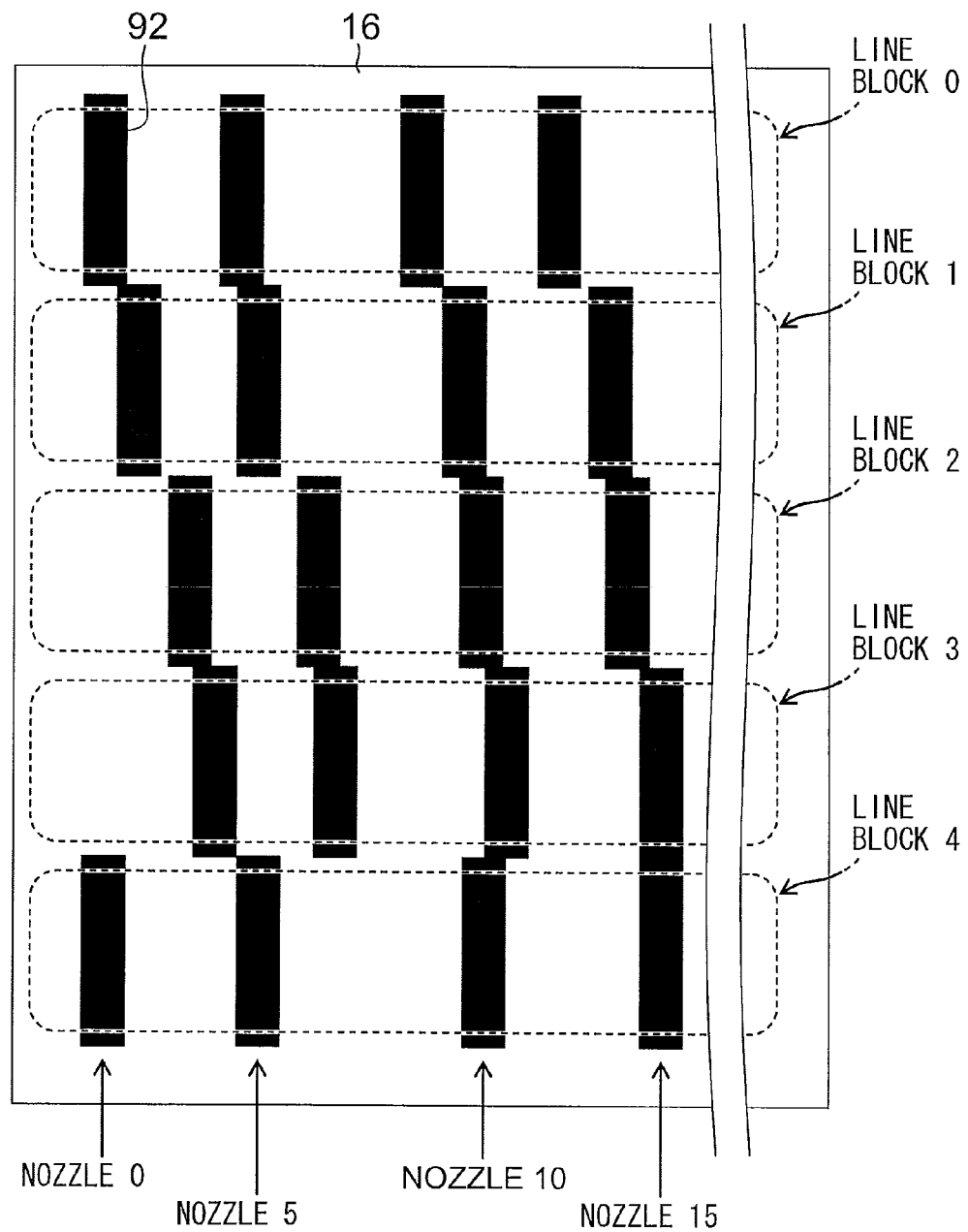
FIG. 9 illustrates an example of a dot position measurement line pattern.

FIG. 9 provides an overall view of a dot position measurement line pattern that is used in an embodiment of the present invention. In order to obtain lines from all the nozzles 51 in the head 50, for example, a sample chart (measurement chart) for the line pattern as indicated in FIG. 9, is formed.

The illustrated chart includes a plurality of line blocks (here, line blocks 0 to 4 in five stages are illustrated). The line blocks are blocks having a plurality of lines (line group) for which lines are drawn using nozzles at fixed intervals.

The nozzle numbers are taken to be 0, 1, 2, 3, and so on, in sequence from the left-hand end of the line head in FIG. 8A. The line block 0 shown in FIG. 9 is a line block formed by the nozzles with the nozzle numbers "4N+0" (where N is an integer equal to or greater than 0), such as the nozzle numbers 0, 4 and 8 (a block of a group of lines formed by the nozzles with the nozzle numbers of multiples of 4). The line block 1 is a line block formed by the nozzles with the nozzle numbers "4N+1", such as nozzle numbers 1, 5, 9, and so on. The line block 2 is a line block formed by the nozzles with the nozzle numbers "4N+2", and the line block 3 is a line block formed by the nozzles with the nozzle numbers "4N+3". The line block 4 is a reference line block, and is formed by the nozzles with the nozzle numbers which are the same as those in the line blocks 0 to 3, in substantially even fashion.

The line block 4 in the present embodiment is formed by the nozzles with the nozzle numbers "5N+0" (nozzle numbers 0, 5, 10, 15, 20, ... ). Between the line block 0 and the line block 4, the nozzle numbers 0, 20, 40, 60, ... are the common nozzle numbers. Between the line block 1 and the line block 4, the nozzle numbers 5, 25, 45, 65, ... are the common nozzle numbers. Between the line block 2 and the line block 4, the nozzle numbers 10, 30, 50, 70, ... are the common nozzle numbers. Between the line block 3 and the line block 4, the nozzle numbers 15, 35, 55, 75, ... are the common nozzle numbers. In this way, the lines are formed at separate positions by droplets ejected from the same nozzles. Using the line positions of these nozzle numbers which are common to the line block 0 and the line block 4, the rotation angle when reading the line pattern is corrected.

Using the line measurement positions of the nozzle numbers which are the common in the line block 0 and the line block 4 (reference line block) (the nozzle numbers 0, 20, 40, 60, ... ), a correction function for correcting the measurement position of the line block 0 is determined, and the measurement position of the line block 0 is converted by the correction function for correcting the measurement position of the line block 0 thus determined. Using the line measurement positions of the nozzle numbers which are the common in the line block 1 and the line block 4 (reference line block) (the nozzle numbers 5, 25, 45, 65, ... ), a correction function for correcting the measurement position of the line block 1 is determined, and the measurement position of the line block 1 is converted by the correction function for correcting the measurement position of the line block 1 thus determined. Similar correction (conversion) is carried out in respect of the line block 2 and the line block 3 as well (description thereof is omitted here).

An example of 4N+M (M=0, 1, 2, 3) is described in the present embodiment, but is not limited to multiples of four. AN+B (B=0, 1, ..., A−1) where A is an integer of two or more may be adapted.

The reference line block corresponding to the line block 4 has a format of CN+D (where C≠A; C and A do not have a common divisor apart from 1; and D can be any one of 0, 1, or C−1) and has a period corresponding to the nozzle numbers which have a common value for A×C.

In the example in FIG. 9, the lines corresponding to all the nozzles of one head are formed from the line blocks 0 to 3.

In other words, in the line head, when nozzle numbers are assigned in order starting from the end, in the main scanning direction, to the nozzles constituting a nozzle row (a substantial nozzle row obtained through orthogonal projection) that stands in one row substantially in the main scanning direction, the ejection timing for each of the groups (blocks) of nozzle numbers, 4N+0, 4N+1, 4N+2, and 4N+3, for example, is changed, thereby forming line groups (so-called "1 ON n OFF" type line patterns).

Consequently, as illustrated in FIG. 9, adjacent lines do not overlap within the same block and independent lines can be formed for all the nozzles (so-called "1 ON n OFF" type line pattern). A line block group as illustrated in FIG. 9 is formed for each of the heads corresponding to the respective ink colors CMYK.

<Reading of Measurement Line Pattern in the Present Embodiment>

Figure 10:
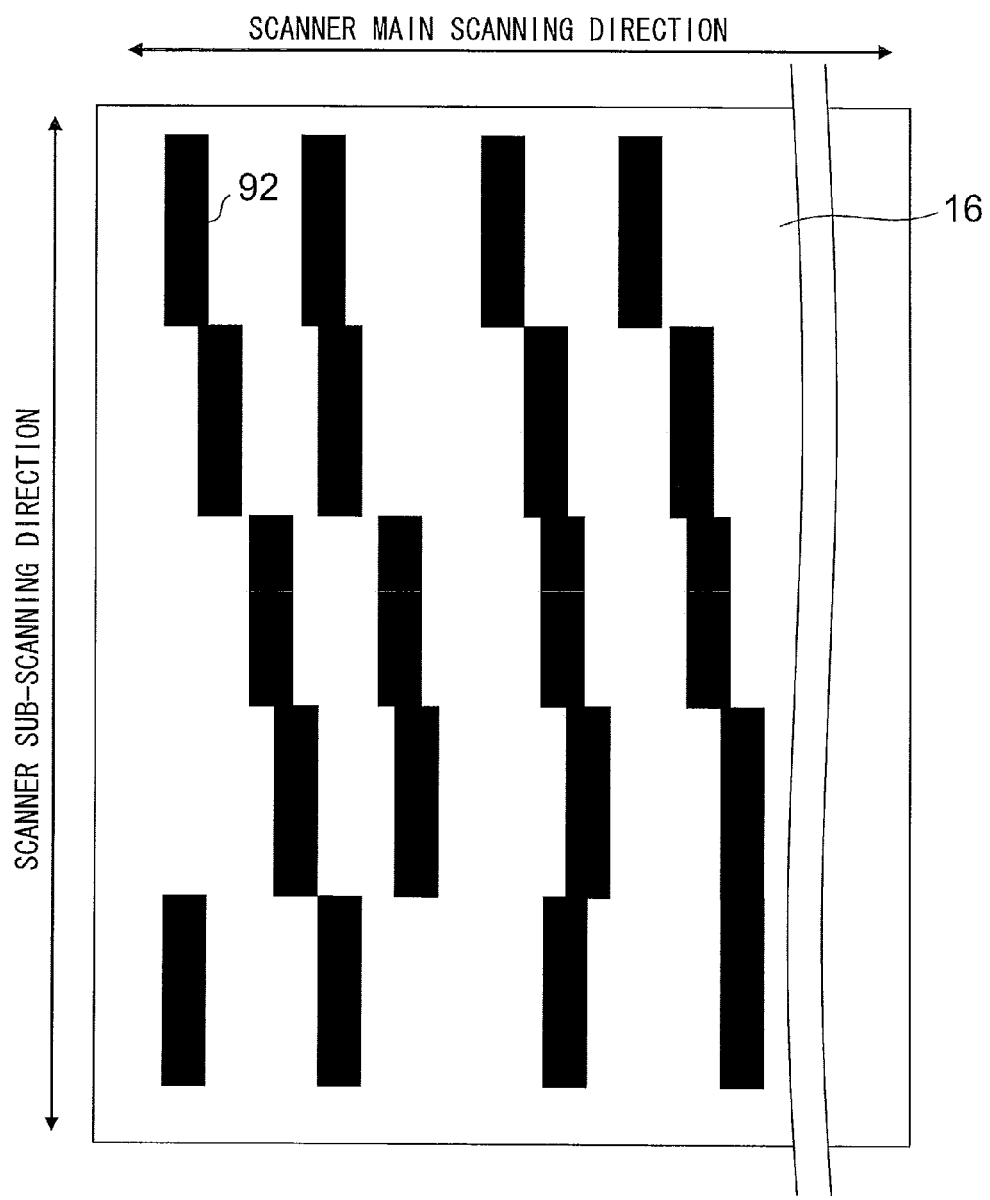
FIG. 10 is an explanatory diagram illustrating the relationship between a dot position measurement line pattern, and a main scanning direction and a sub-scanning direction of a scanner.

FIG. 10 illustrates a relationship in the scanner main scanning direction and sub-scanning direction when the dot position measurement line pattern is read with the scanner. As illustrated in FIG. 10, the direction in which the lines 92 are arranged within the line block is matched to the scanner main scanning direction, and the longitudinal direction (lengthwise direction) of the lines 92 is matched to the scanner sub-scanning direction, in order to read the dot position measurement line pattern.

Figure 11:
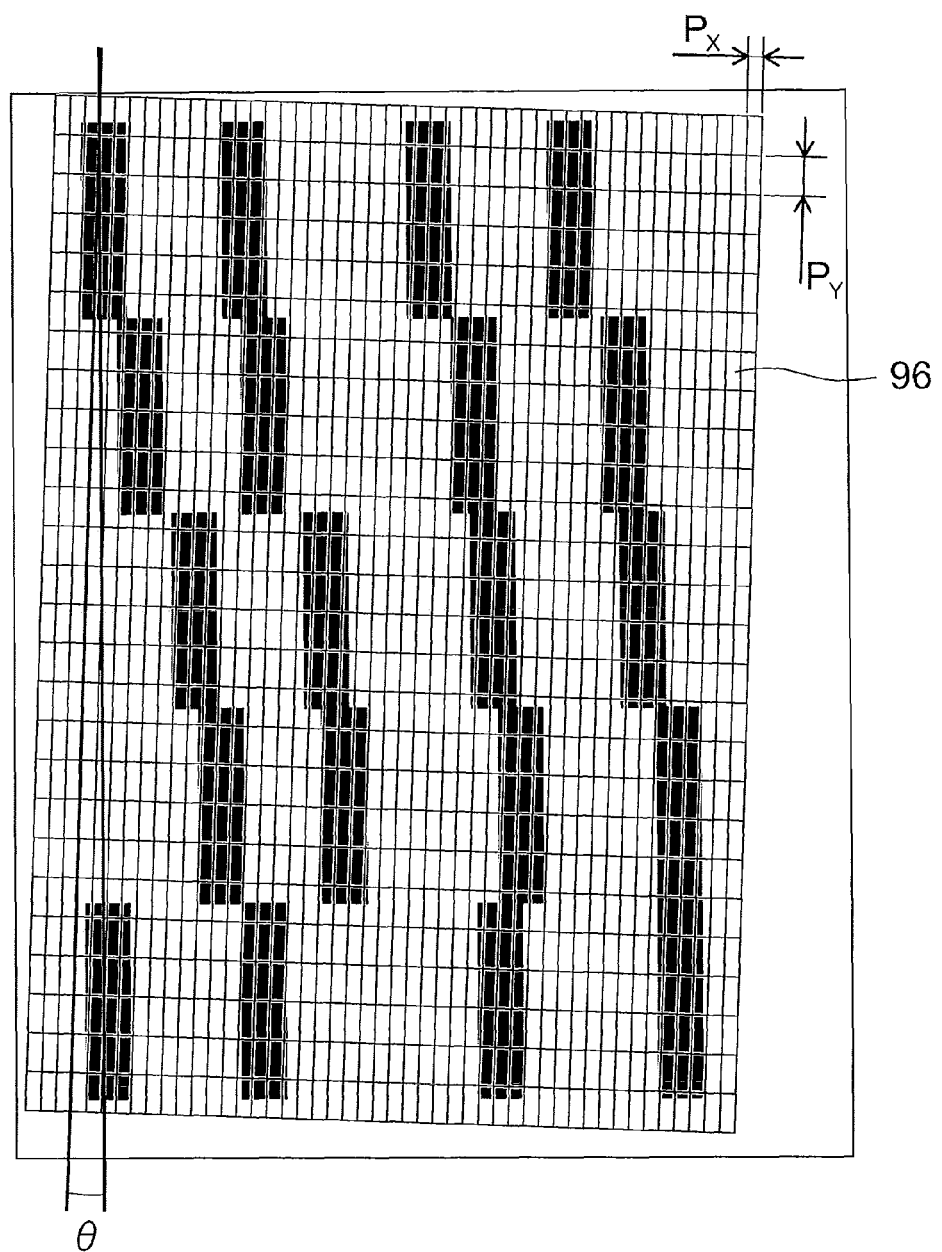
FIG. 11 is an explanatory diagram illustrating the relationship between a scanner coordinate system (reading coordinate system), and a dot position measurement line pattern.

FIG. 11 illustrates a relationship between the scanner coordinate system (reading coordinate system) and the dot position measurement line pattern. The scanner performs reading with a setting of a high resolution (high accuracy) in the scanner main scanning direction and a low resolution in the scanner sub-scanning direction. For example, when the recording resolution of the image forming apparatus is 1200 DPI, the main scanning resolution of the scanner is, according to the sampling theorem, desirably 2400 DPI or more, while the sub-scanning resolution is desirably a much lower resolution of 200 DPI or less. The lower limit of the sub-scanning resolution varies, based on the line length and the setting of A in AN+B mentioned earlier, but may be 100 DPI or 50 DPI, as long as the lower limit falls within the operating range of the scanner.

The desirable conditions for the reading resolution of the scanner is a reading resolution in the sub-scanning direction of within a range not more than one-tenth of the reading resolution in the main scanning direction but not less than one-sixtieth of the reading resolution in the main scanning direction.

When the printer apparatus has a recording resolution of 1200 DPI, the reading resolution is desirably 2400 DPI in the main scanning direction, while the sub-scanning resolution is desirably 50 to 200 DPI.

The main scanning resolution varies depending on the required measurement accuracy. For example, when the margin of error $\sigma \leq 0.4$ (μm), the main scanning resolution desirably corresponds to 2400 DPI and the sub-scanning resolution is desirably not more than 200 DPI. The lower limit of the resolution is determined based on the number of 1 ON N OFF stages (N+1 stages) in the sampling chart and on the conditions that the line length L per stage is read based on NL pixels.

Note, as a constraint, that the (N+1 stages) in the sample chart should fit onto a single sheet of recording paper and be readable in a single reading operation.

In other words, it is required to satisfy the following conditions (1) and (2):

$$(N+1) \times L > (N+1) \times NL / (\text{Sub-scanning resolution}); \text{ and} \quad (1)$$

$$(\text{Longitudinal length of an A3-size to A4-size paper sheet}) > (N+1) \times L. \quad (2)$$

In the above expressions (1) and (2), NL is determined by the pixel count in the Y direction of the image averaging regions ROI, described subsequently, the number of ROI, and the shift amount in the Y direction of each ROI, and therefore NL is found by:

$$NL=\text{(Pixel count in } Y \text{ direction of ROI)}+\text{(ROI number}-1)\times\text{(ROI shift amount)}. \quad (3)$$

If (pixel count in Y direction of ROI)=10 pixels, (number of ROI (i.e., the above ROI number))=4, and (ROI shift amount)= 2 pixels, then NL=10+(4−1)×2=16 (pixels), based on the above Expression 3.

If N=4 and L=2 (inches), then "the sub-scanning resolution>{(N+1)×NL}/{(N+1)×L}" is obtained based on Expression 1, ant therefore, the sub-scanning resolution>(NL/L)= 16/2=8 (DPI).

As a further example, if N is 16, then L is 0.6 (inch) and the sub-scanning resolution>16/0.6≈26 (DPI).

The cells (denoted with reference numeral 96) in the scanner coordinate lattice illustrated in FIG. 11 represent regions (single-pixel aperture) occupied by a single read pixel of the scanner. For illustrative purposes in FIG. 11, these cells have been drawn as rectangles proportioned such that the scanner sub-scanning pixel size ($P_Y$) is approximately twice the scanner main scanning pixel size ($P_X$); however, the actual pixel aspect ratio mirrors the relationship between the main scanning resolution and the sub-scanning resolution of the scanner.

Note that even when a print of a dot position measurement line pattern to be read is carefully placed in the scanner (more specifically, on the flat bed of the scanner), it is unavoidable to form a rotation angle (θ) between the dot position measurement line pattern and the scanner reading coordinate system.

When this rotation angle is not corrected, a certain error arises between the line blocks in accordance with the height of the line pattern. Hence, processing to correct the rotation angle is carried out in the present embodiment. Details on the rotation angle correction will be provided subsequently (step S108 in FIG. 13).

Figure 12:
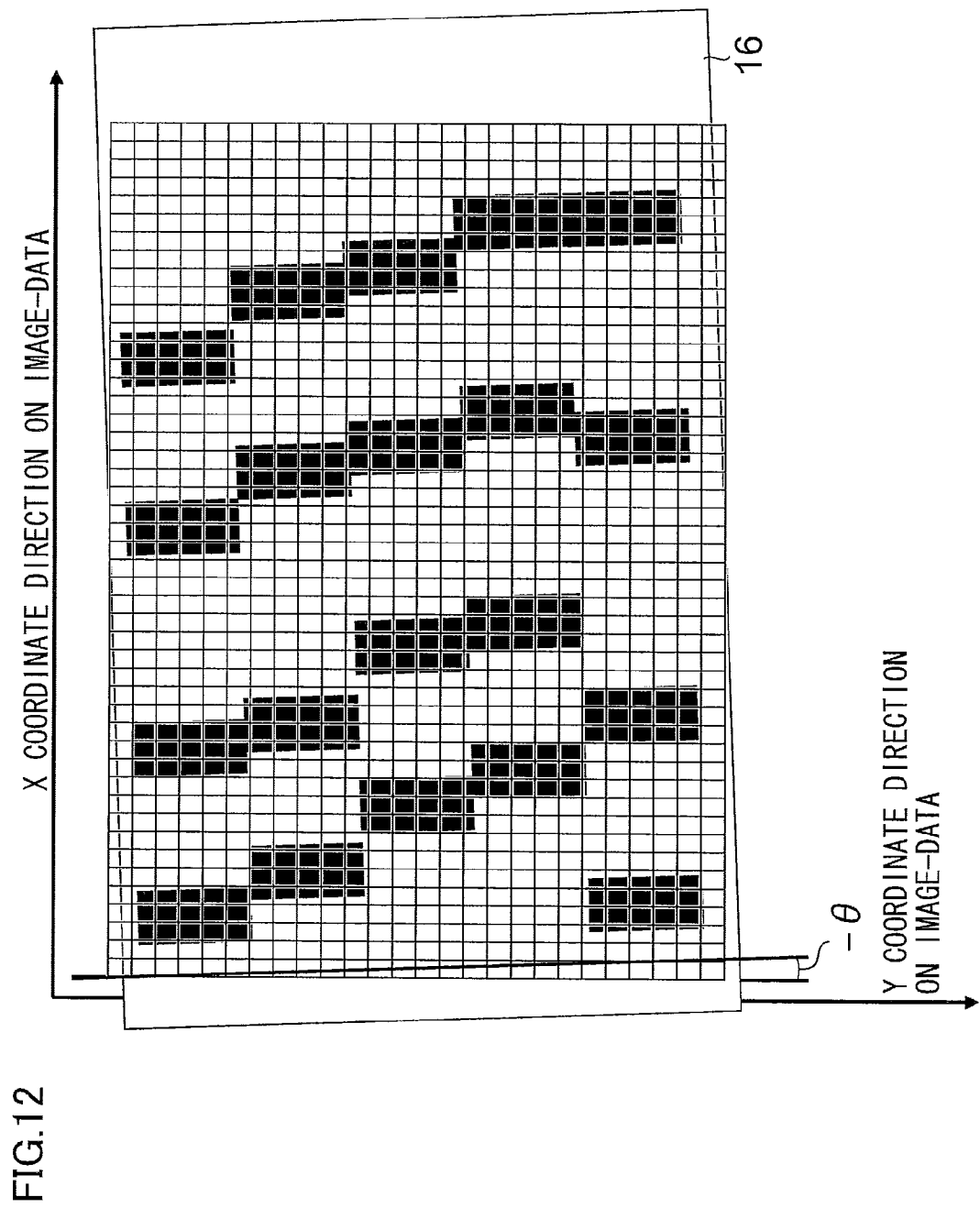
FIG. 12 illustrates a dot position measurement line pattern on a read image read with the scanner.

FIG. 12 illustrates a dot position measurement line pattern on an image read with the scanner (where the scanner pixels are represented as squares). The X coordinate of the image data is plotted in the scanner main scanning direction, and the Y coordinate of the image data is plotted in the scanner sub-scanning direction.

<Analysis of Read Image Data>

Figure 13:
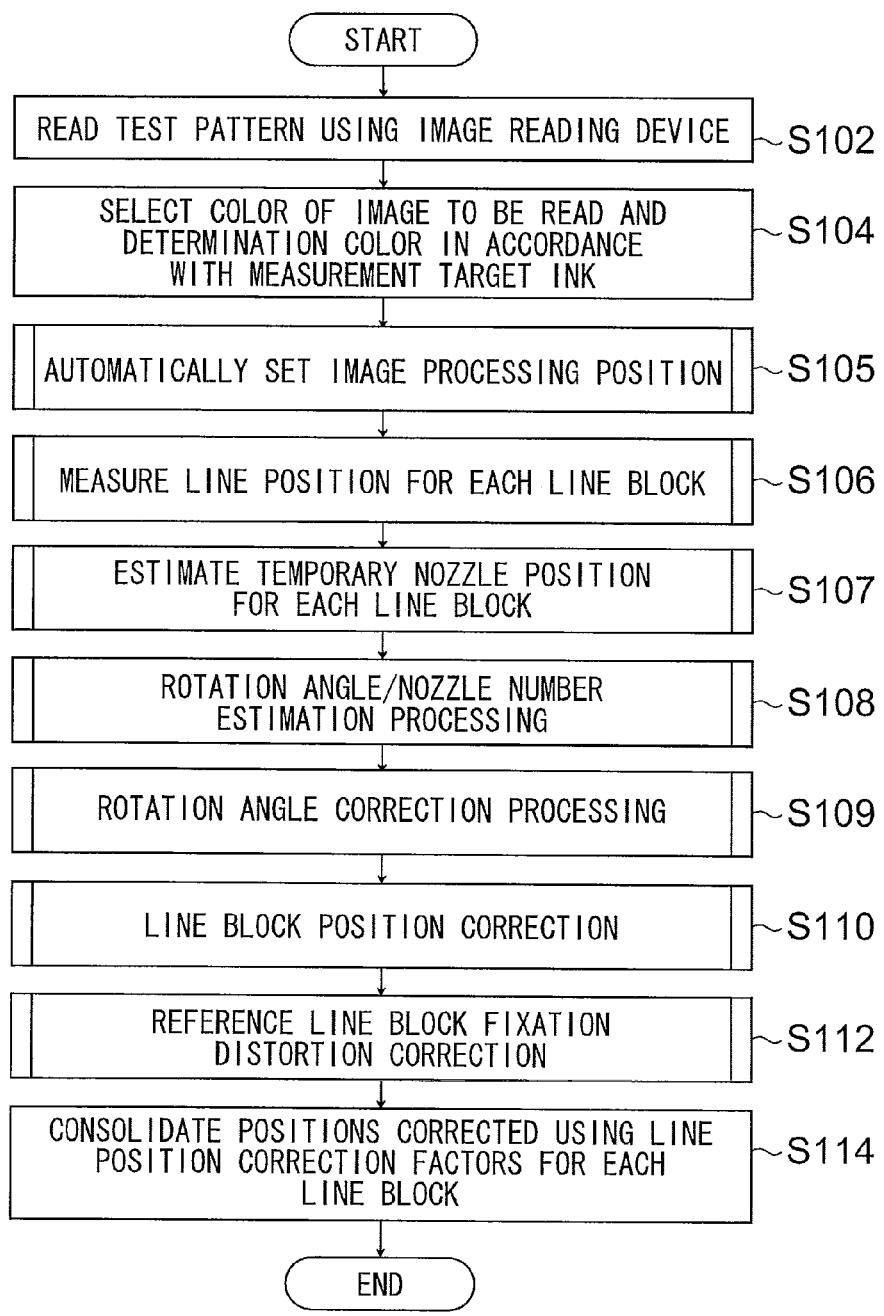
FIG. 13 is a flowchart showing the overall process flow of the dot position measurement.

FIG. 13 is a flowchart showing the process flow of the dot position measurement. Prior to the start of the measurement flow of FIG. 13, ink droplets to be measured is ejected and deposited onto the recording paper 16 from each nozzle of the inkjet head while moving the recording paper 16 and the head 50 relatively to each other, so that a line pattern of dot rows corresponding to the respective nozzles is thus formed on the recording paper 16 from the ink ejected from each nozzle 51, as illustrated in FIG. 9. In other words, a sample chart (measurement chart), on which a line pattern is formed, is formed using the ink to be measured.

The line pattern thus obtained is then read using an image reading apparatus (scanner) (step S102 in FIG. 13). Here, as is illustrated in FIG. 10, with the line lengthwise direction oriented in the sub-scanning direction of the scanner, and the line row direction oriented in the main scanning direction of the scanner, the line pattern is imaged such that the resolution is high in the main scanning direction and low in the sub-scanning direction. Note that the scanner (not illustrated) includes a 3-line sensor (so-called "RGB line sensor") with a light-receiving element array for each of the colors R (red), G (green), and B (blue) with a color filter for each of RGB colors, and the whole surface (all the line blocks) of the sample chart are captured as electronic image data.

Next, a color of an image to be read and a determination color are selected in accordance with a measurement target ink (step S104 in FIG. 13). In other words, a color channel for a captured image and a color channel for color determination are set in accordance with the ink on a line pattern.

When the ink color is cyan (C), a red (R) channel is used as the color of an image to be read, and a green (G) channel is used as the determination color.

Because the R channel cannot distinguish between cyan and black, the G channel is used for determining whether the color is cyan or black. The density of the black ink can be detected by both the R channel and the G channel, and the density of the cyan ink is detected only by the R channel but is not output to the G channel. Thus, the both channels tend to have different output characteristics depending on the color of the ink, and such difference can be used for distinguishing the colors of the ink.

When the ink color is magenta (M), the G channel is used as the color of the image to be read, and the R channel is used as the determination color. Because the magenta ink is not output to the R channel, there is no correlation between the outputs of both channels (no correlation between the color of the image to be read and the determination color). Therefore, the magenta ink can be identified.

When the ink color is yellow (Y), the blue (B) channel is used as the color of the image to be read, and the R channel is used as the determination color. Because there is no correlation between the outputs of both channels (no correlation between the color of the image to be read and the determination color), the yellow ink can be identified.

Although it is preferable that the G channel is used when the ink color is black, the R channel may be also be used. In the case of other secondary color ink or special color ink, the channel, out of the color channels of the scanner, which can read an image with high contrast when capturing the measurement target ink, selected based on the spectral reflectivity of the ink recorded on the recording paper 16 and the relationship in spectral sensitivities among the color channels. On the other hand, it is preferable that the determination color is discriminated with a channel different from the color of the image to be read and with a logic different from other ink (the presence/absence of the correlation).

Next, the step proceeds to step S105 in FIG. 13, to automatically set an image processing position. This processing is for analyzing the image to be read, to determine an optimum position for a computation target region of each line block (ROI: Region of Interest). The tilt of the image to be read is determined at this moment, and when the tilt is greater than a predetermined value (predetermined acceptable value) the sample chart on the scanner is reset at a correct position/posture, and reading is carried out again.

Figure 14:
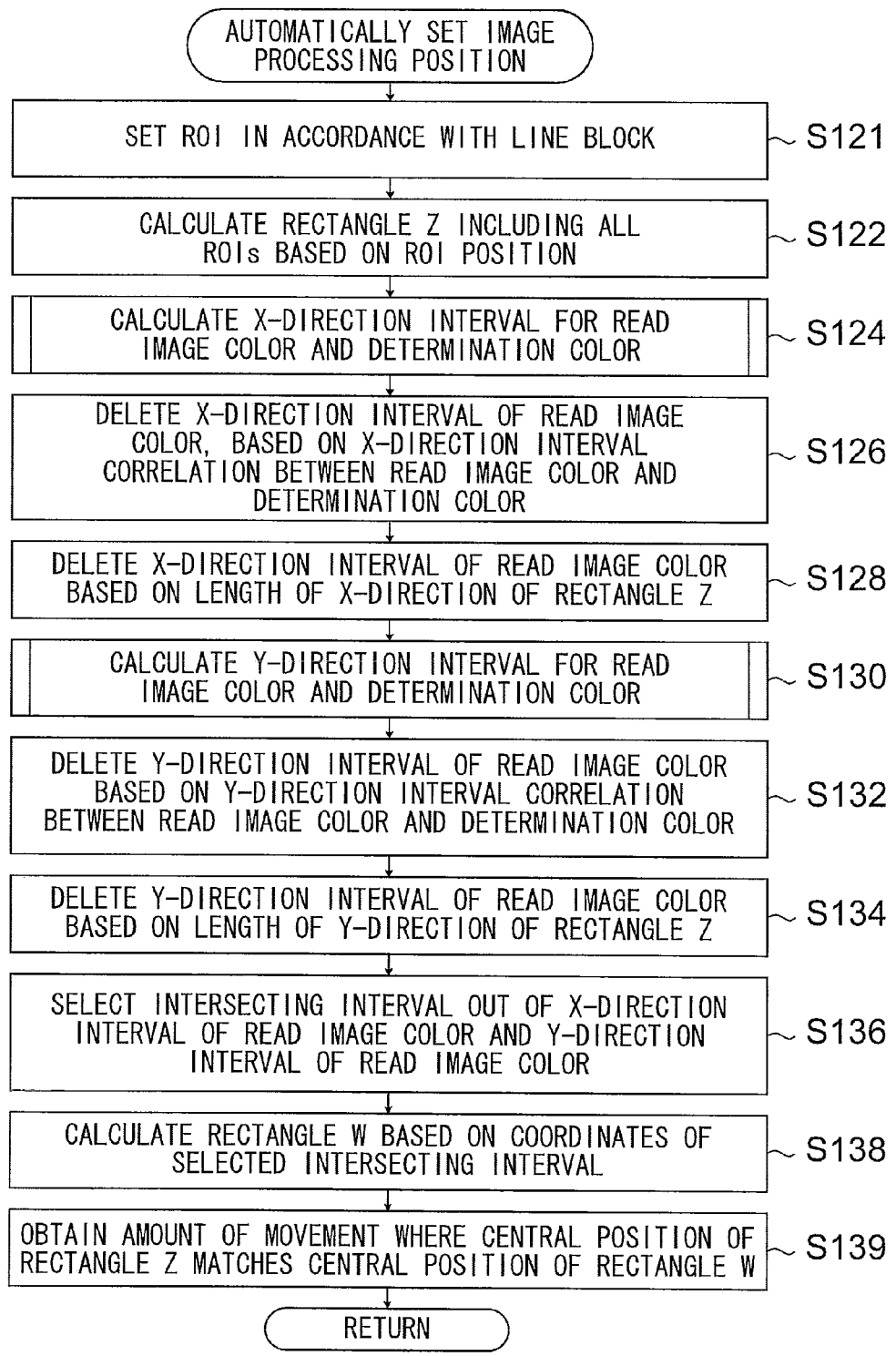
FIG. 14 is a flowchart showing the details of automatic position setting processing.

FIG. 14 shows an automatic position setting processing flow performed in step S105.

<Image Processing Position Automatic Setting Processing>

Once the automatic position setting processing flow shown in FIG. 14 is started, the target ROI for determining the amount of parallel movement is set automatically for each line block (step S121). The ROI is for specifying a predetermined shape of region (rectangular shape in FIG. 15) obtained by cutting a part of a line block, which is the computation target. In this processing, a plurality of ROIs are set with respect to a plurality of line blocks. The positions of the ROIs that are set here are determined according to the default setting obtained by defining appropriate positions beforehand, from a line pattern. Each ROI is a rectangular region that is perpendicular to the coordinates of a read image.

Hence, when the angle (tilt) of the image is large when the sample chart is read, it is assumed that the line block does not fit in the ROI. In this processing flow, whether the re-reading needs to be carried out or not can be determined by determining this angle.

Figure 15:
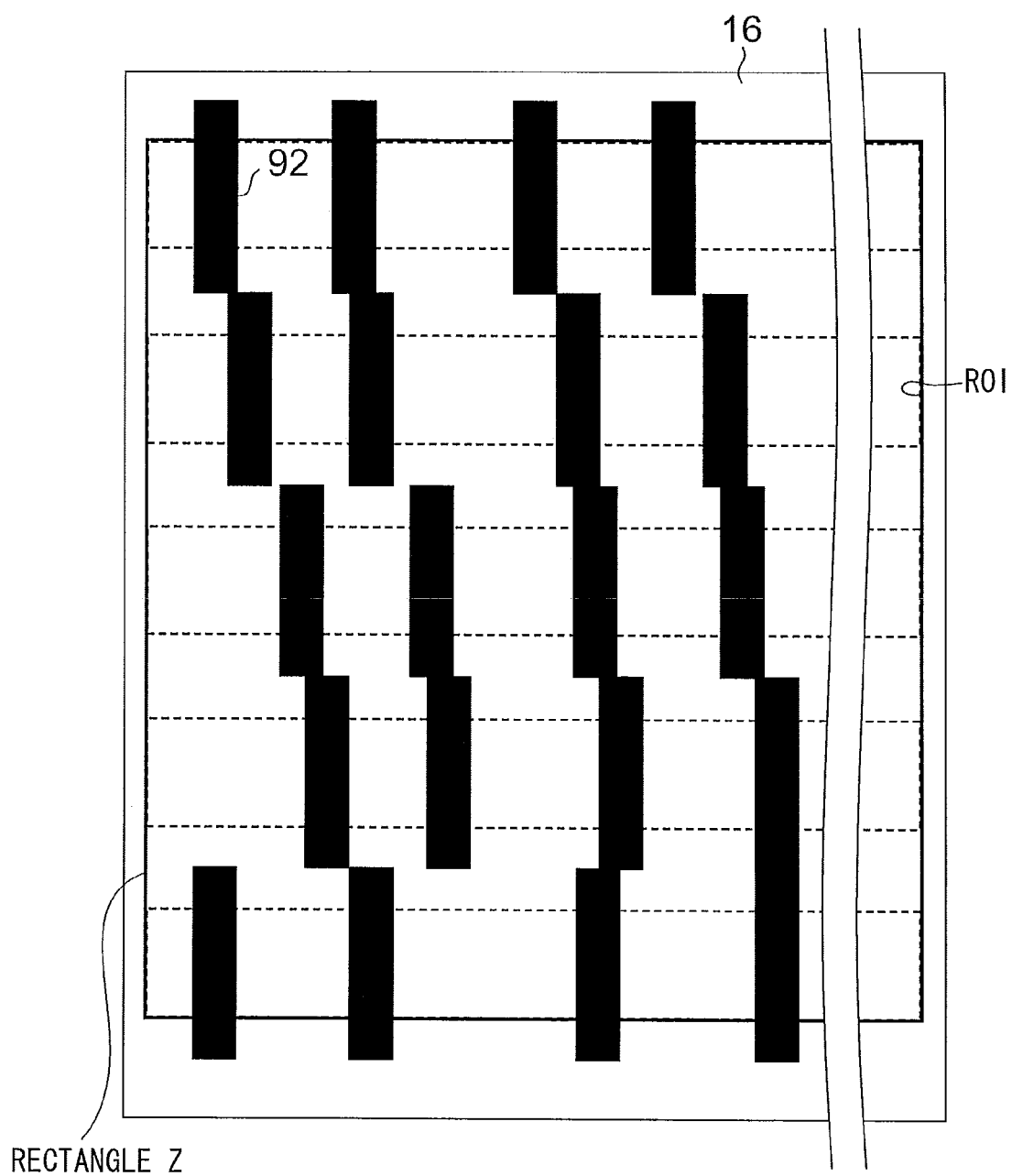
FIG. 15 is an explanatory diagram of a rectangular region, which is a computation target when automatically setting an image process position.

Next, the step proceeds to step S122 in FIG. 14, to obtain the minimum rectangle Z having all of the ROIs, based on the set position of each ROI (see FIG. 15).

Next, an X-direction (scanner main scanning direction) interval is calculated for the color of the image to be read and the determination color (step S124 in FIG. 14). For example, in the case of the cyan ink, the color of the image to be read is the R channel and the determination color is the G channel. The X-direction interval described hereinafter is calculated with respect to these two color images.

Figure 16:
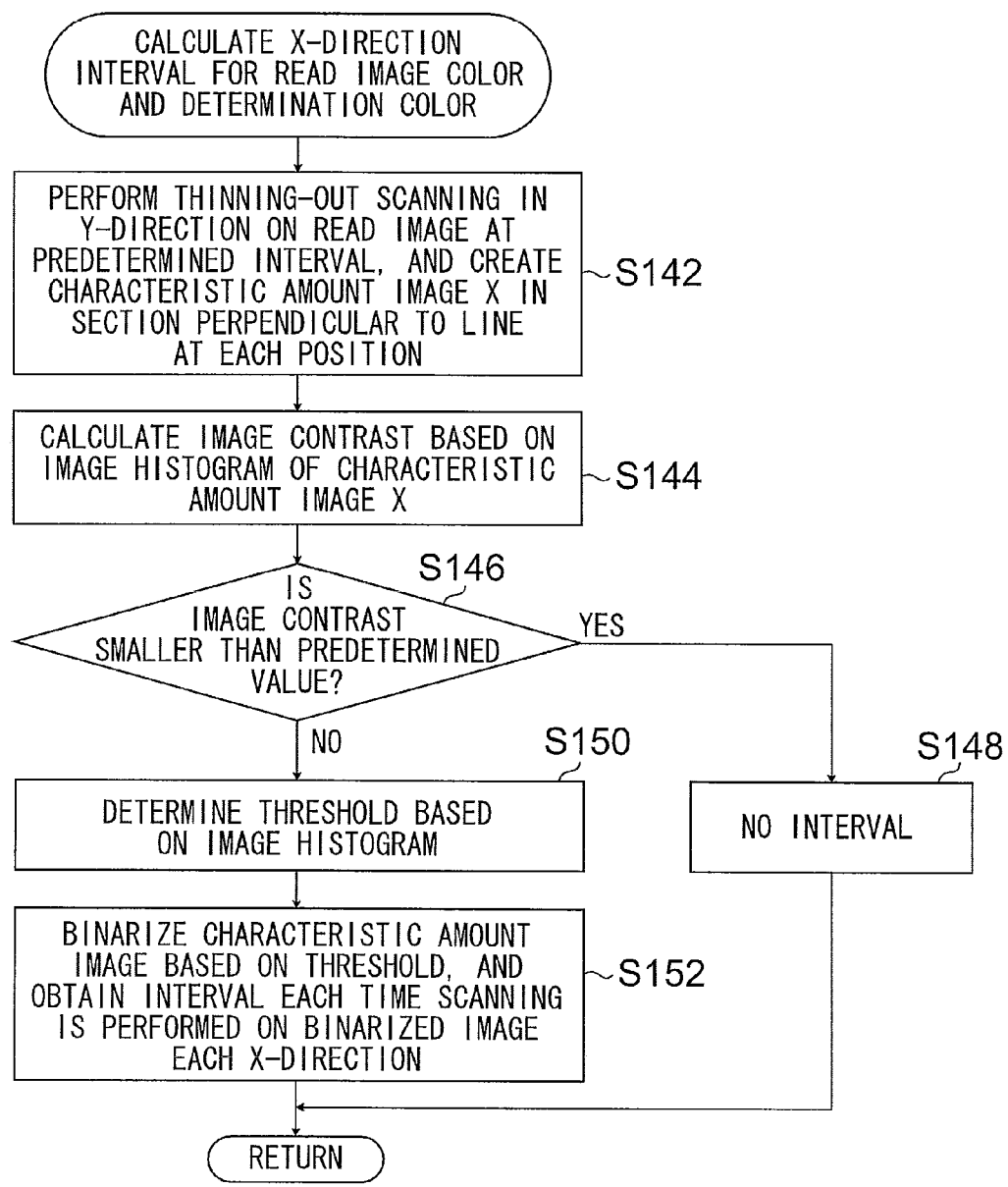
FIG. 16 is a flowchart showing an X-direction interval calculation procedure.

FIG. 16 shows a flow of the X-direction interval calculation performed in step S124, and FIGS. 17A to 17C show schematic drawings of the details of this processing.

Once the X-direction interval calculation flow shown in FIG. 16 is started, first, thinning-out scanning (coarse scanning) is performed at a predetermined interval in a Y-direction (sub-scanning direction) on the read image (see an X-direction arrow shown in FIG. 17A), to create a characteristic quantity image X in a section perpendicular to the line in each position (step S142 in FIG. 16).

In this thinning-out scanning, it is desired that the line blocks are scanned at least once. In this one scanning, as shown in the upper portion of FIG. 17A, windows 101 with a predetermined width Wx are set in the X-direction with respect to the image processing position, to obtain the characteristic amount within each of the windows 101. The windows 101 are set such that overlaps are made in part of them in the X-direction and the overlapping sides are displaced from each other. The characteristic amount of each window 101 is output as a value of the image processing position.

Image data (an image signal) of the read image has a value that is low at the part with the ink (the part drawn with the ink) and a value that is high at a part with no ink (the blank area of the recording paper).

When the image signal of the ink to be obtained is smaller than the image signal of the paper whiteness, the minimum value within each window 101 is used as the image characteristic amount. When the image signal of the ink to be obtained is greater than the image signal of the paper whiteness, the maximum value within the window is used as the image characteristic amount.

FIG. 17B shows the result of the one scanning. As described above, the image characteristic amount of the region in which a group of lines of each line block exists becomes a small value, and the image characteristic amount of the region outside the group of lines (the margin without the group of lines) becomes a large value. The similar image characteristic amount is acquired for all scanning, and the characteristic amount image X is generated as a result of these scanning activities.

Subsequently, by using this characteristic amount image X, an image histogram of the characteristic amount image X is calculated in order to determine whether an ink image to be obtained exists or not, and an image contrast is calculated based on this image histogram (step S144 in FIG. 16).

Thereafter, the obtained image contrast is compared with a predetermined determination criterion value (step S146), and the presence/absence of the ink image to be obtained is determined based on the difference therebetween. In other words, when the image contrast is smaller than the predetermined value (YES in step S146), it is determined that the ink image does not exist, and the absence of the interval is output (step S148).

When, on the other hand, the image contrast is not smaller than the predetermined value in step S146 (the result of the determination is NO), a binarization threshold for binarizing the characteristic amount image X is determined based on the image histogram in order to specify the position of the ink image (step S150). As a method of determining this binarization threshold, for example, a discriminant analysis method, the intermediate value between the minimum value and the maximum value of the histogram, or a 50-percent point can be used.

Next, the characteristic amount image X is binarized based on the obtained binarization threshold to obtain an interval each time when the binarized image is scanned in each X-direction (see FIG. 17C) (step S152 in FIG. 16).

Figure 18B:
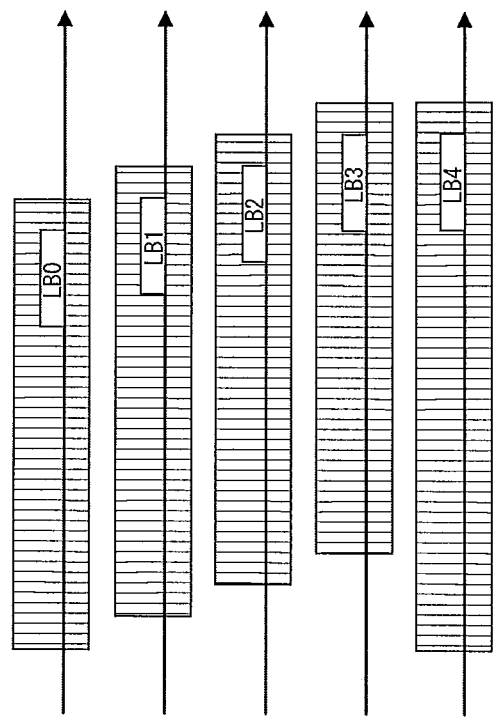
FIGS. 18A and 18B are explanatory diagrams of an X-direction interval.
Figure 18A:
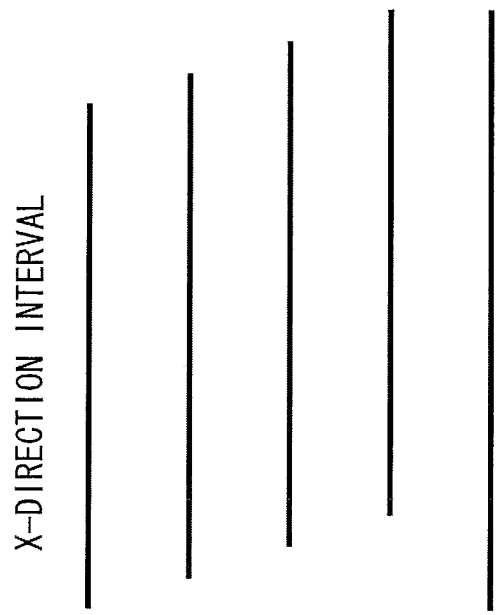

Once the intervals are obtained by performing all the scanning activities, a pattern of line segments representing the X-direction intervals corresponding to the scanning activities is obtained, as shown in FIG. 18A.

Once the X-direction interval calculation flow in FIG. 16 is ended, the subroutine shown in the same diagram is exited to return to the automatic position setting processing flow in FIG. 14, and the step proceeds to step S126 in FIG. 14.

In step S126, the X-direction interval obtained from the image data of the color of the read image, and the X-direction interval obtained from the image data of the determination color are used, and the presence/absence of the correlation therebetween is used for deleting the X-direction interval of the color of the read image, for each interval.

The correlation between the intervals is defined as the ratio at which the intervals of the determination color are the same as the intervals of the image to be read, on the pixels of the intervals. The intervals of the color of the image to be read are extracted one by one, and whether the same coordinates of a determination interval are included in the intervals at the coordinates of each interval is counted. Thus obtained result is divided by the number of pixels (the length of the X-direction) of one interval of the color of the image to be read, to obtain the ratio. When this ratio (correlation) is higher than the predetermined determination criterion value (predetermined value), it is determined that the correlation is high. When the ratio is lower than the predetermined value, it is determined that the correlation is low.

For example, the cyan ink is adopted when there is no correlation (or deleted when the correlation exists). Thus, when the correlation is higher than the predetermined value, one of the intervals of the color of the image to be read is deleted. In this manner, the intervals of the color of the image to be read are gradually deleted based on the correlation thereof with the intervals of the determination color.

Next, the intervals of the color of the image to be read are deleted based on the size of the rectangle Z in the X-direction, which includes the ROIs calculated previously (step S128 in FIG. 14). The intervals that are contained in a predetermined range (similar in size) in relation to the size of the rectangle Z in the X-direction are adopted, and the intervals outside the predetermined range (small or large in size) are deleted.

In other words, filter is conducted in terms of the size of each of the intervals, and only the intervals contained in a range of a certain size remain, while the intervals that are not prescribed are not adopted and therefore deleted.

Figure 19:
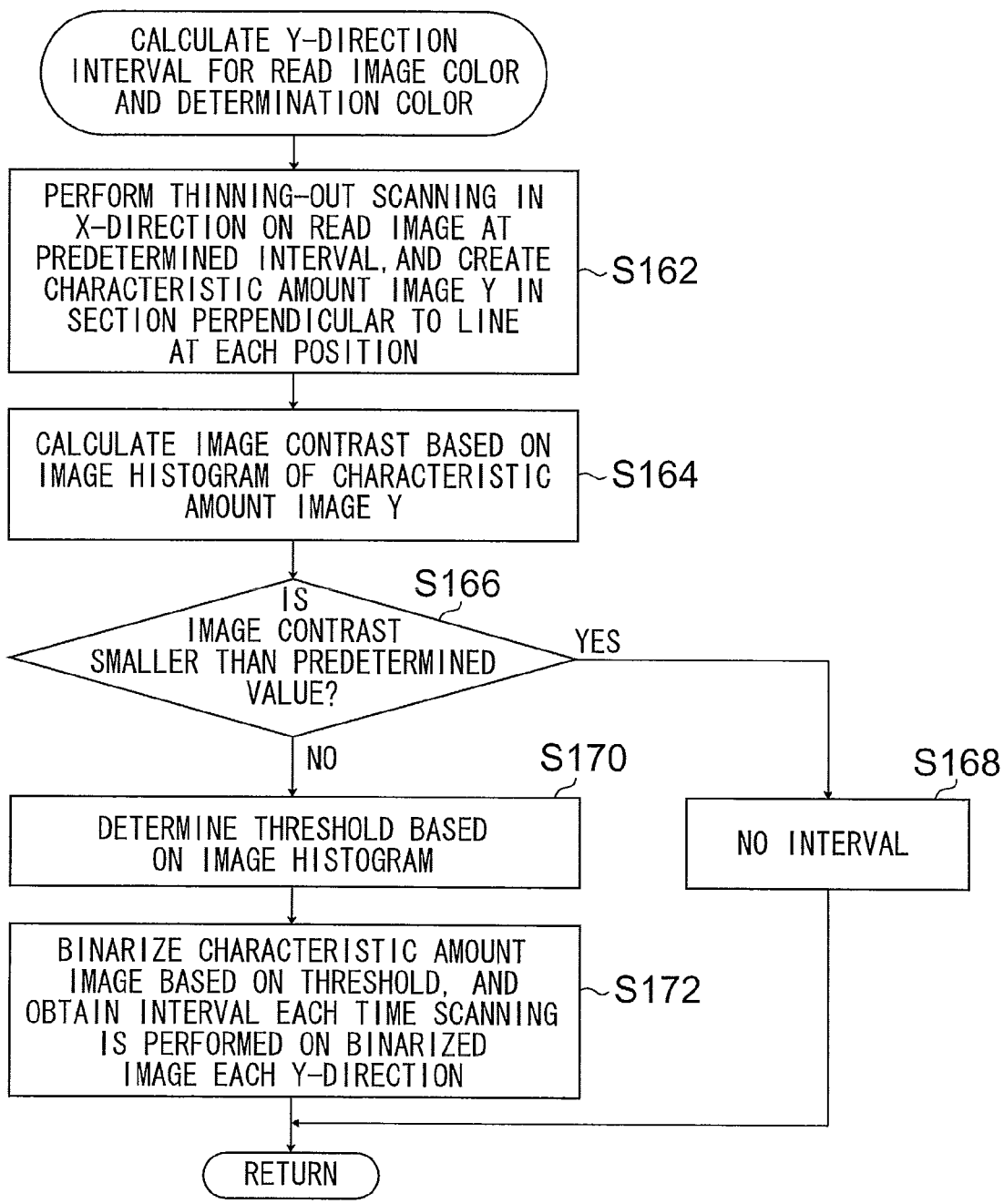
FIG. 19 is a flowchart showing a Y-direction interval calculation procedure.

A Y-direction interval is calculated in a similar manner (steps S130 to S134 in FIG. 14). FIG. 19 shows a flow of Y-direction interval calculation performed in step S130, and FIGS. 20A to 20C show schematic drawings of the details of this processing.

The difference between the Y-direction interval and the X-direction interval is the scanning direction and the positional relationship in a window 102, as shown in FIG. 20A. Because the window for calculating the characteristic amount needs to be set at a direction substantially perpendicular to a line image within the image, the window 101 in the X-direction is used for calculating the X-direction intervals described with reference to FIGS. 17A to 17C (the line image extends in the Y-direction in FIG. 17A), and the window 102 in the Y-direction is used for calculating Y-direction intervals, as shown in FIGS. 20A to 20C.

Other computation methods are the same as those used in the X-direction intervals, thus the explanation of steps S130 to 5134 in FIG. 14 is omitted.

As shown in FIG. 20B, by simply binarizing the result of one scanning, a discontinuous part is generated in a short section ΔW, depending on the presence/absence of the group of lines. When such a discontinuous part is generated in the section ΔW shorter than this fixed value, filtering processing for ignoring the discontinuity is performed to regard the discontinuous part as a continuous part, whereby one continuous line (interval) is obtained as shown in FIG. 20C.

Figure 21A:
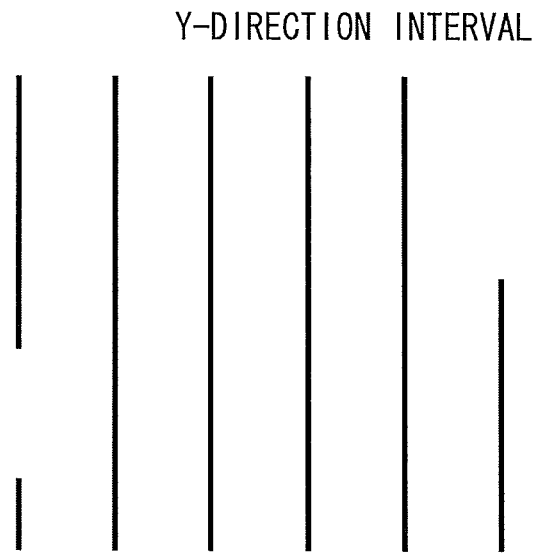
FIGS. 21A and 21B are explanatory diagrams of a Y-direction interval.
Figure 21B:
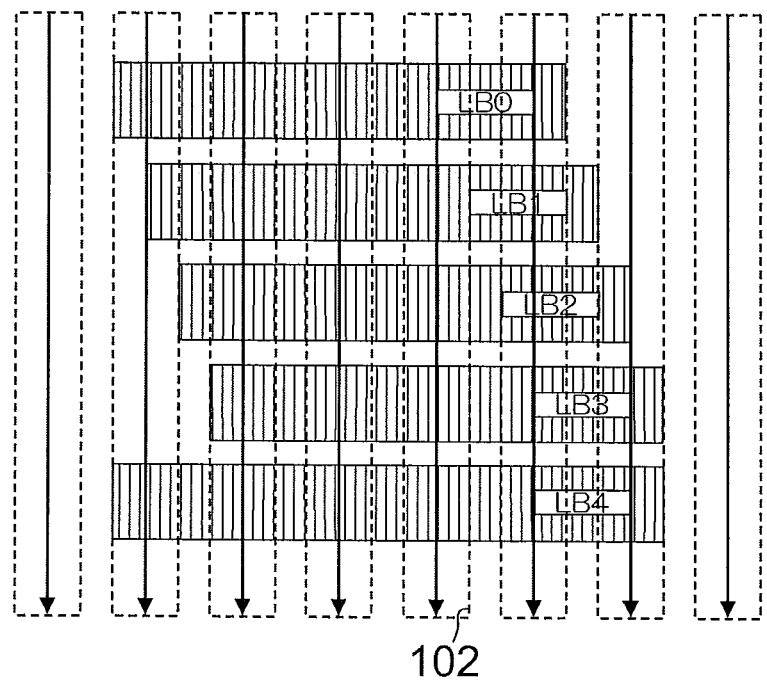

A pattern of line segments representing the Y-direction intervals corresponding to the scanning activities is obtained in step S162 of FIG. 19 and is shown in FIG. 21B.

Thus, the X-direction intervals (see FIG. 18A) and the Y-direction intervals (see FIG. 21A) are obtained.

The rectangular region to be obtained always partially includes the line segments of these intervals. Therefore, the X-direction intervals (line segments in the horizontal direction) and the Y-direction intervals (line segments in the vertical direction) are combined, and the step moves from step S134 to step S136 in FIG. 14, in order to calculate the rectangular region that is large enough to encompass the entire combination.

Figure 22A:
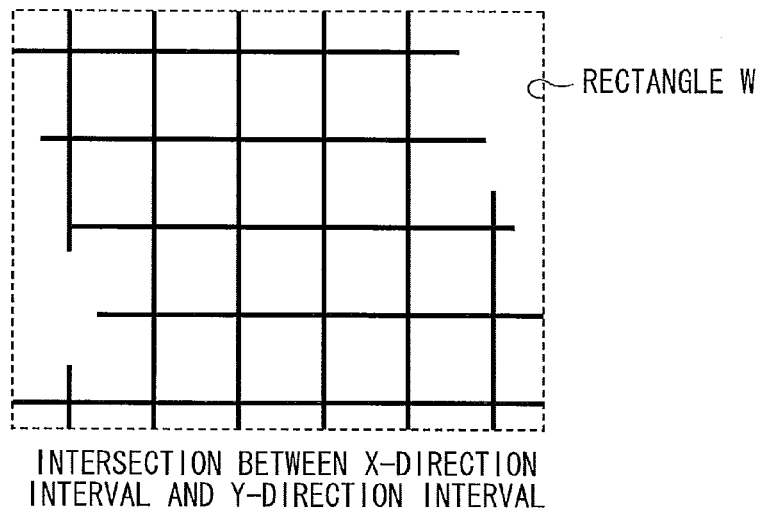
FIGS. 22A and 22B are explanatory diagrams of processing for obtaining the rectangular region from the intersection between the X-direction interval and the Y-direction interval.

In step S136, the X-direction interval and the Y-direction interval are combined as shown in FIG. 22A, in order to determine a rectangle W in which the X-direction and Y-direction correspond to a predetermined size. The intersection between the X-direction interval and the Y-direction interval is determined. When the X-direction interval intersects with the Y-direction intervals, these intervals are determined and adopted as a part of the rectangle W (step S136 in FIG. 14).

The rectangle W containing all of these intersecting intervals is obtained based on the coordinates of the intersecting intervals that are selected in step S136 (step S138, see FIG. 22A).

Figure 22B:
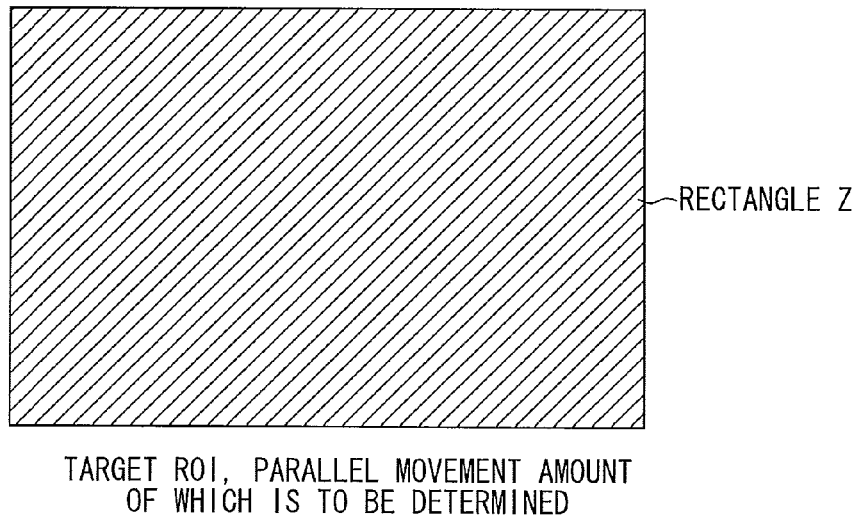

Next, the central position of the rectangle Z (the rectangle configuring the collection of ROIs described with reference to FIG. 15, see FIG. 22B) and the central position of the rectangle W are obtained in order to match the position of the rectangle Z with the position of the rectangle W, and the amount of parallel movement is obtained such that the central position of the rectangle Z coincides with the central position of the rectangle W (step S139 in FIG. 14).

Furthermore, in addition to the calculation of the amount of parallel movement, the tilt of a starting point of each interval (X-direction interval, Y-direction interval) is calculated. When the entire image is tilted with respect to the grid of pixels of the scanner, the positions of the starting points of the intervals are tilted. The tilt of the starting point of the X-direction interval or the Y-direction interval is calculated, and when the average tilt angle is larger than a predetermined criterion (or is not within an acceptable range), it is determined that the image is tilted significantly. In this case, a warning indicating that there is a read error is output, to prompt an operator to reset the sample chart and perform the reading again.

Once the automatic position setting processing flow in FIG. 14 is ended, the subroutine shown in FIG. 14 is exited to return to the entire flow in FIG. 13, and the step proceeds to step S106 in FIG. 13.

In step S106, in accordance with the amount of parallel movement obtained in the automatic position setting processing of step S105 (FIG. 14), each ROI is moved parallel to an optimum position and set on the read image in each line block, and the line position is measured with respect to each line block (step S106). The process flow of the position measurement in a line block of step S106 is illustrated in FIG. 23.

<Position Measurement in Line Block>

Figure 23:
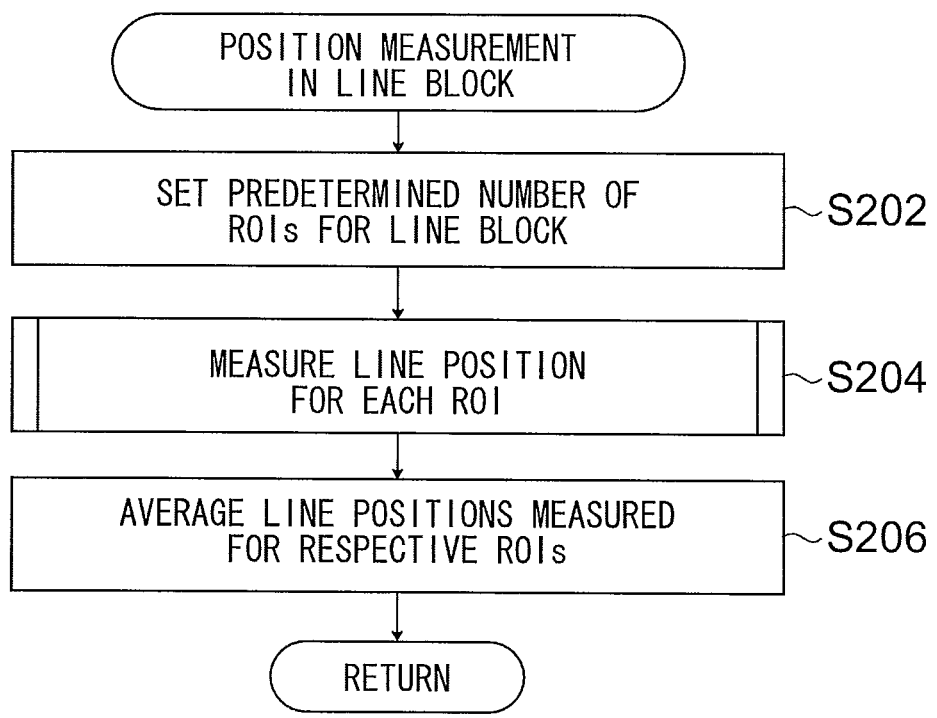
FIG. 23 is a flowchart showing the details of a position measurement processing in a line block.
Figure 24:
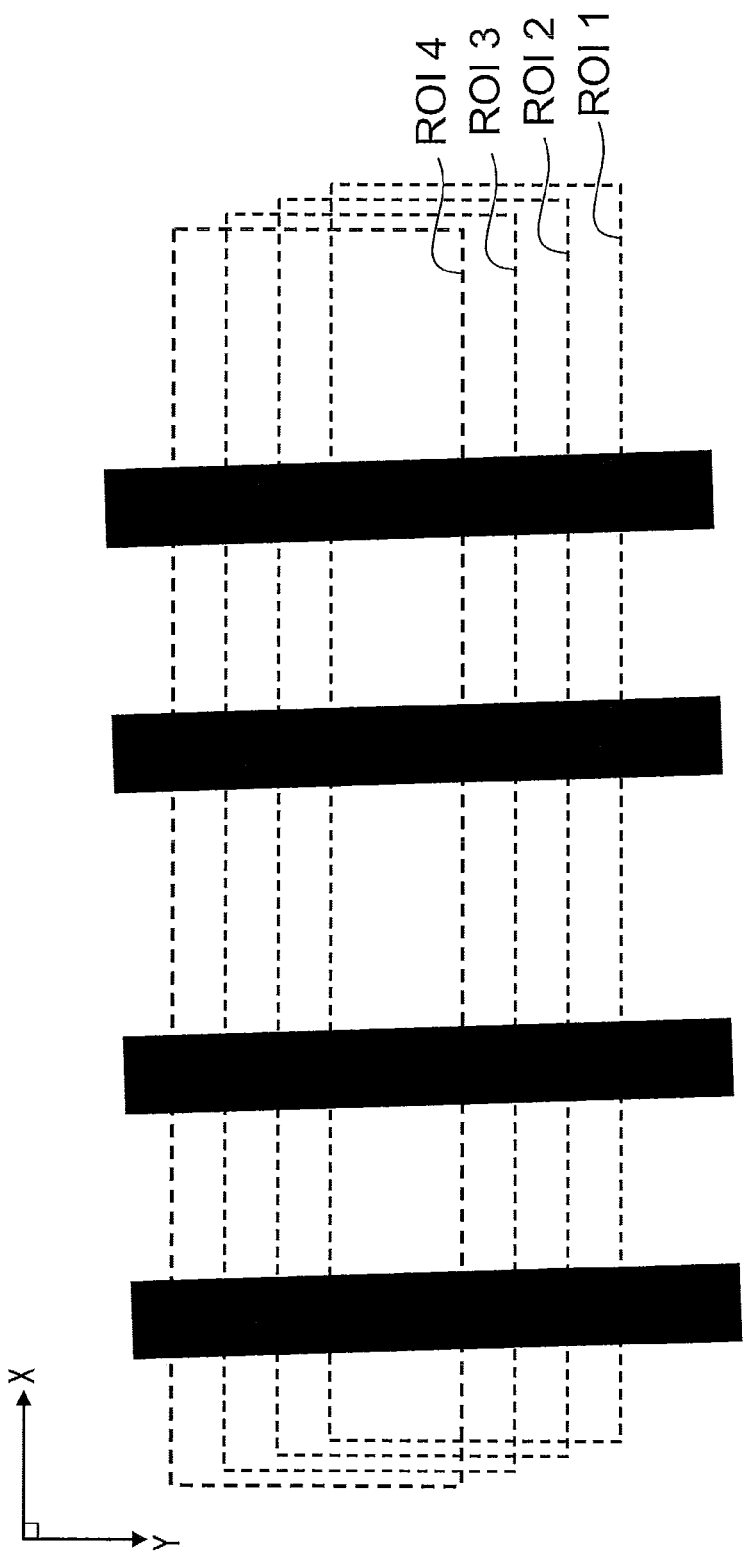
FIG. 24 illustrates an example of an explanatory diagram illustrating a configuration example of an image averaging region (ROI)

At the start of the position measurement process flow in a line block of FIG. 23, a prescribed number of image averaging regions ROI (Region Of Interest) are set for each line block (step S202). In other words, as illustrated in FIG. 24, a plurality of ROIs are set for one line block. FIG. 24 illustrates an example in which four regions ROI 1, ROI 2, ROI 3, and ROI 4 are set. Here, the ROIs are displaced relatively to one another with a certain pitch in a Y direction. For example, when the ROIs are displaced at a regular pitch of two pixels, ROI 2 is displaced two (2) pixels from ROI 1, ROI 3 is displaced four (4) pixels from ROI 1, and ROI 4 is displaced six (6) pixels from ROI 1, in the Y direction. In an X direction, provided that lines are not removed from the ROIs, the ROIs need not to be displaced. However, in FIG. 24, the ROI 1 to ROI 4 are displaced with a regular pitch in the X direction also to avoid an overlap therebetween to make the illustration clearer.

The ROIs described with reference to FIG. 14 are the same with the ROIs 1 to 4 shown in FIG. 24, and the flow in FIG. 14 determines the positions analyzed by the ROIs 1 to 4 in FIG. 24, by means of image analysis. Therefore, the rectangle Z described with reference to FIG. 14 is the smallest rectangle encompassing (inscribing) the ROIs 1 to 4.

The line positions are measured for the thus set respective ROIs (step S204 in FIG. 23). In other words, the X coordinates are determined according to the flowcharts shown in FIGS. 25 and 26. The center positions of the ROI 1 to ROI 4 in the Y direction are used for the Y coordinate. The line position (coordinates) of the line block is determined by averaging the thus measured line positions of the ROIS 1 to ROI 4.

Figure 25:
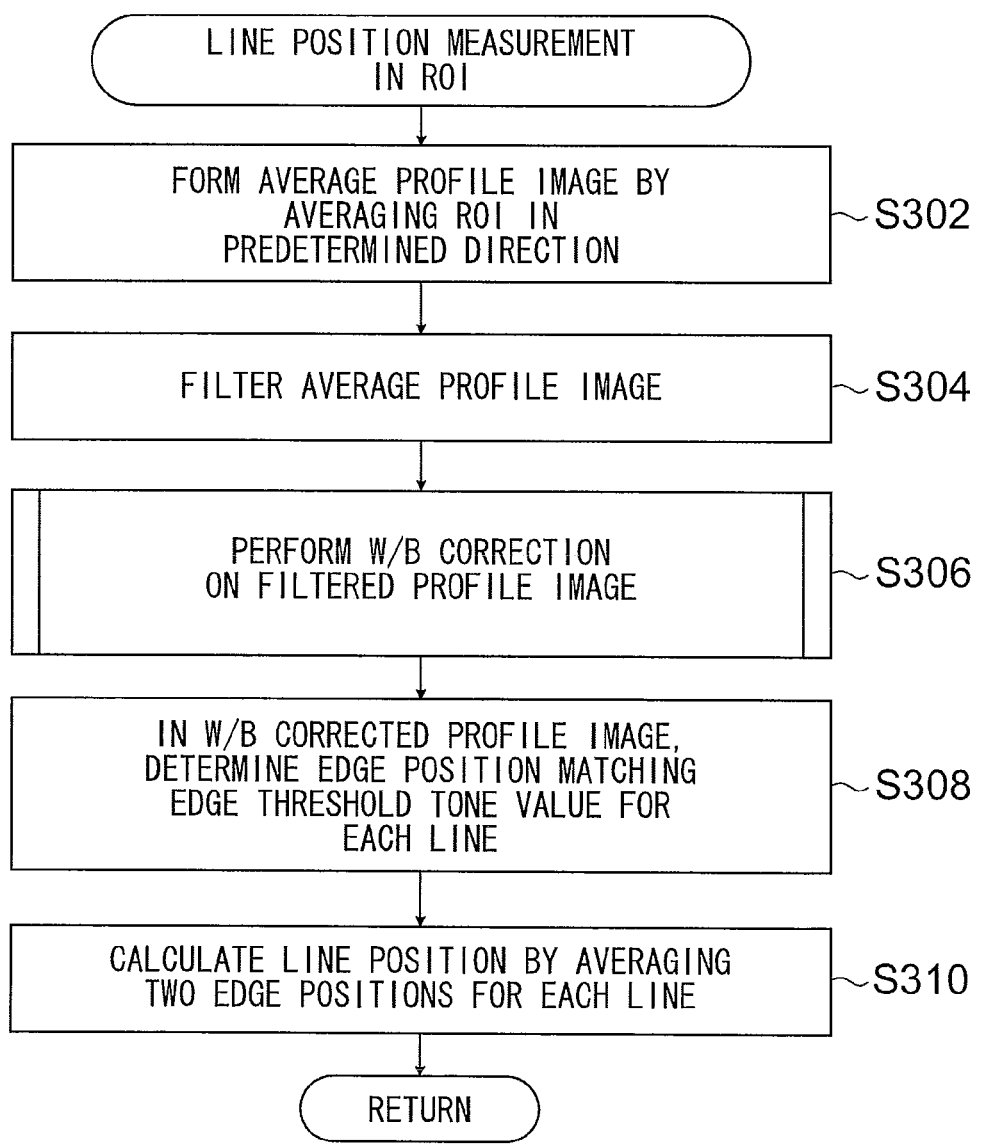
FIG. 25 is a flowchart showing the details of ROI line position measurement processing.

FIG. 25 illustrates the process flow of the line position measurement in the ROIs. At the start of the line block position measurement process flow in FIG. 25, average profile images are first created by averaging the image signal in the ROI in a predetermined direction, which is the scanner sub-scanning direction (Y coordinate direction) here (step S302).

Figure 27A:
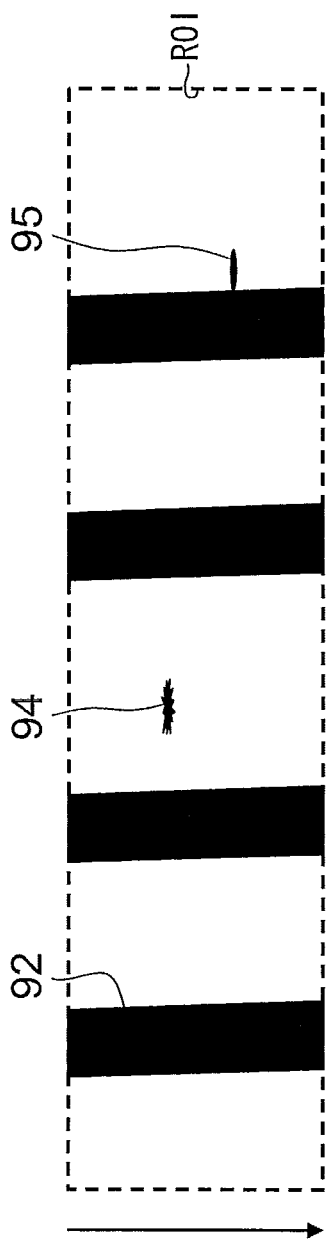
FIGS. 27A and 27B are explanatory diagrams illustrating an example of an average profile image calculated from the image averaging region (ROI)
Figure 27B:
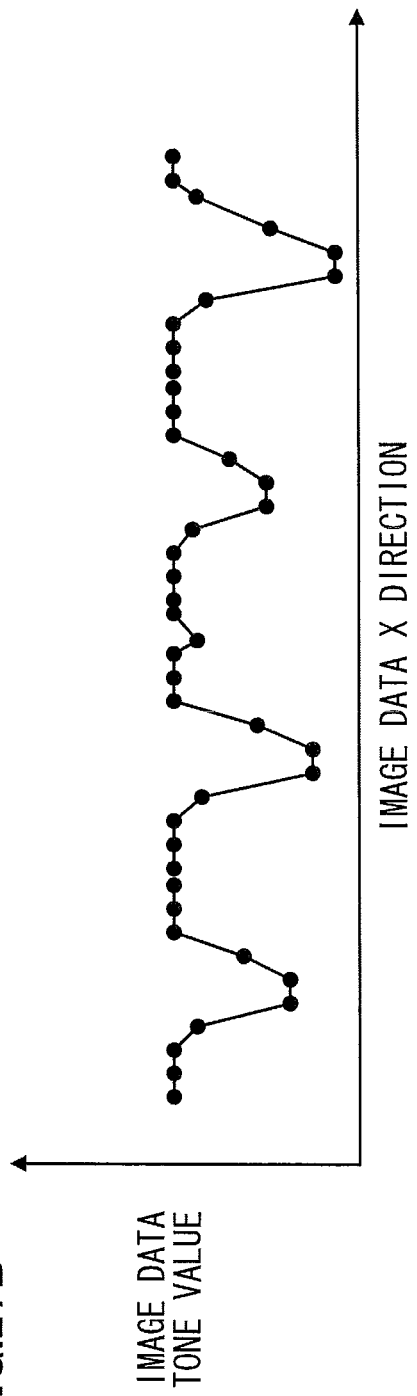

FIG. 27A is an example of one ROI to be computed, and FIG. 27B is an average profile image obtained from the ROI illustrated in FIG. 27A by averaging the image signal in terms of the line longitudinal direction (direction of the down arrow in the drawing). In FIG. 27B, the horizontal axis represents the position (pixel position) of the image data in the X direction, and the vertical axis represents the tone values of the image data thus read. Here, the higher the density of ink dots, the smaller the tone values; parts without dots (white ground parts of the recording paper 16) have large tone values.

Even when dirt 94 adheres to the dot position measurement line pattern as illustrated in FIG. 27A, or a satellite 95 (a sub-droplet known as a satellite droplet which separates from a main droplet during ink ejection is generated and this satellite droplet adheres to a different position on the recording paper 16 from the main droplet) is generated on the line 92, by performing averaging in the line longitudinal direction (direction of downward arrow in the drawing), the contrast of the dirt 94 decreases, and distortion of the profile images caused by the satellite 95 is reduced (see FIG. 27B).

Figure 28:
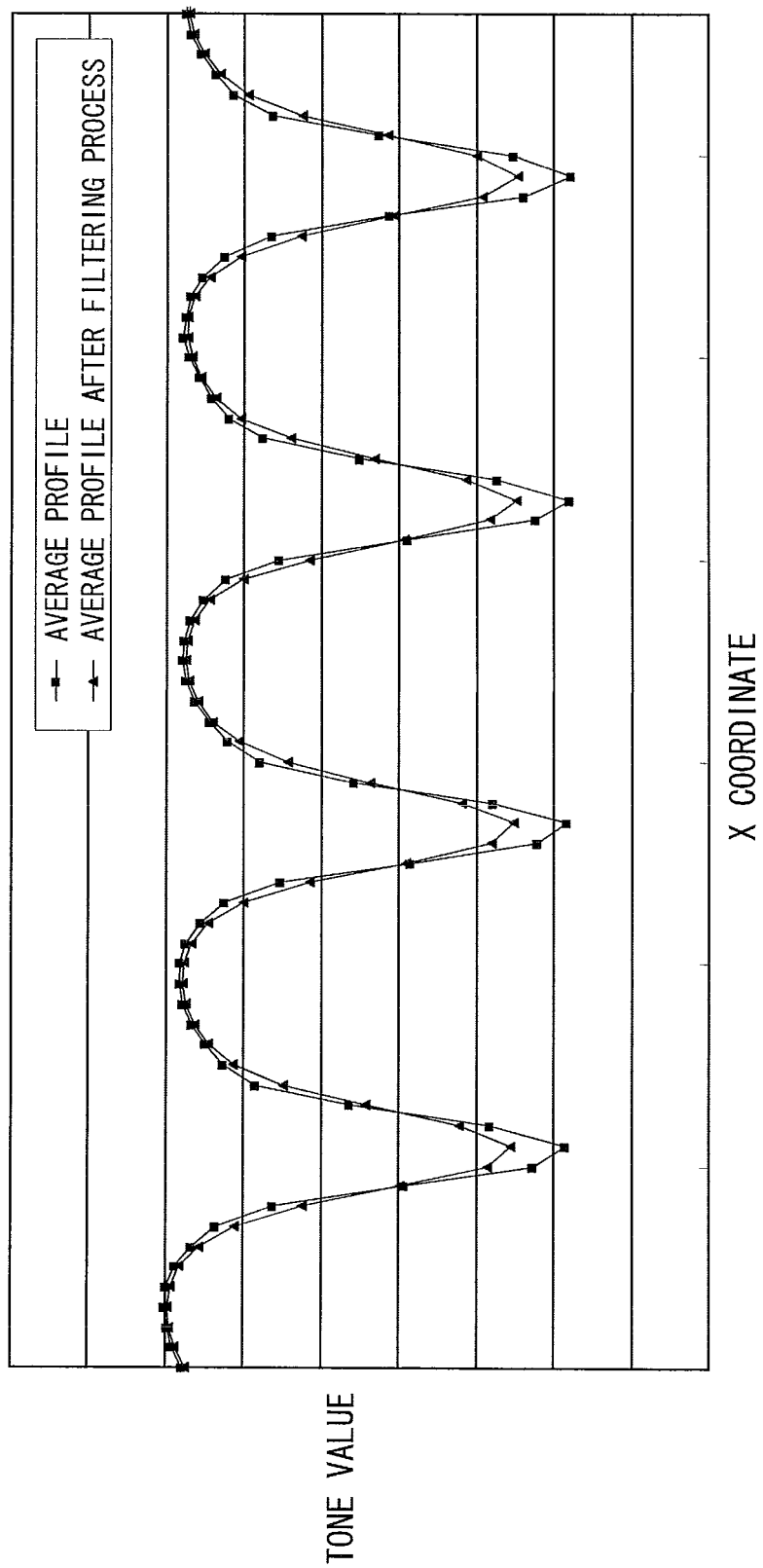
FIG. 28 is a graph showing results of a filtering process.

Subsequently, the average profile images thus created are smoothed by using a predetermined filter to create filtered profile images (X coordinate direction) (step S304 in FIG. 25). FIG. 28 shows the result of performing filtering of the averaged profile images, further lowering the dirt contrast, and reducing the distortion caused by the satellite. A linear filter with symmetry of about 5 to 9 taps is desirable from the standpoint of the processing speed and effects.

Figure 29:
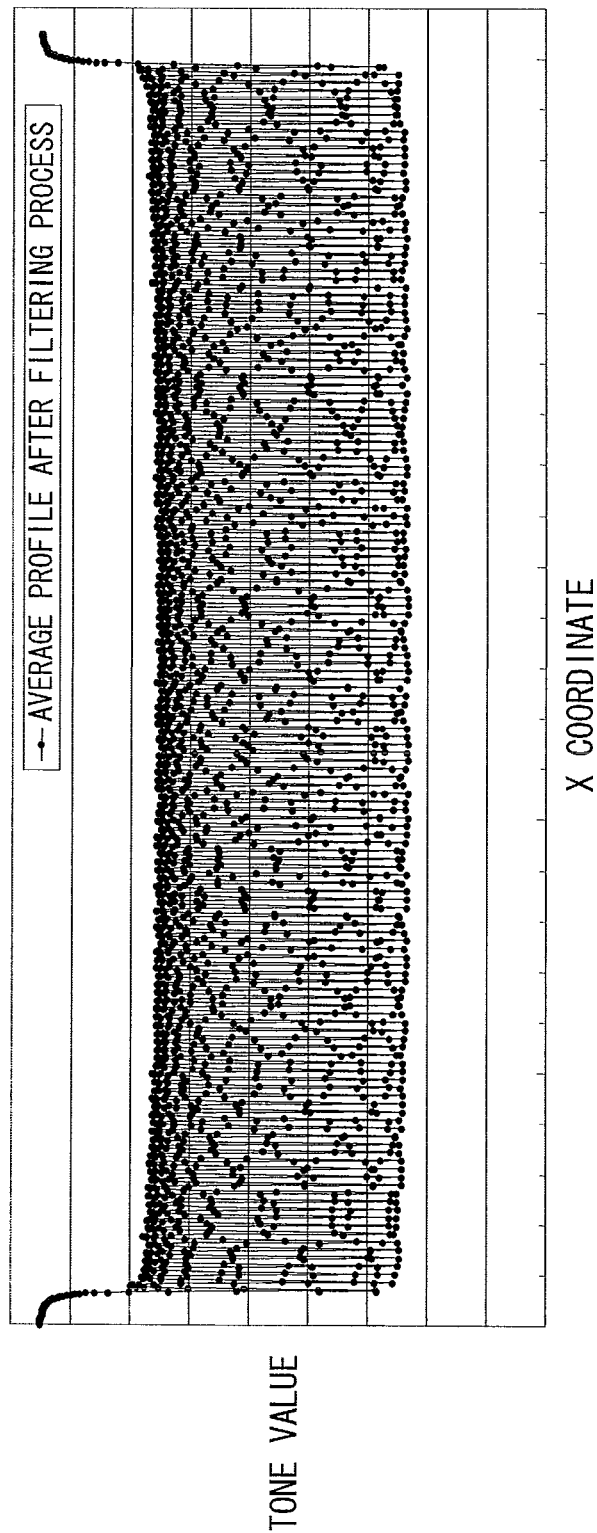
FIG. 29 is a graph showing fluctuations in the W/B level.

Although short-term distortion is corrected as a result of the filtering, variations in the long-term tone values due to shading (variations in the lighting brightness and the like) during the scanner reading, still remain as illustrated in FIG. 29. Such shading is a major cause of positional errors when using an algorithm to determine line positions from tone values. Hence, following the aforementioned filtering process (step S304 in FIG. 25), the filtered average profile images are subjected to W (white, white background)/B (black, ink) correction (step S306 in FIG. 25).

Figure 26:
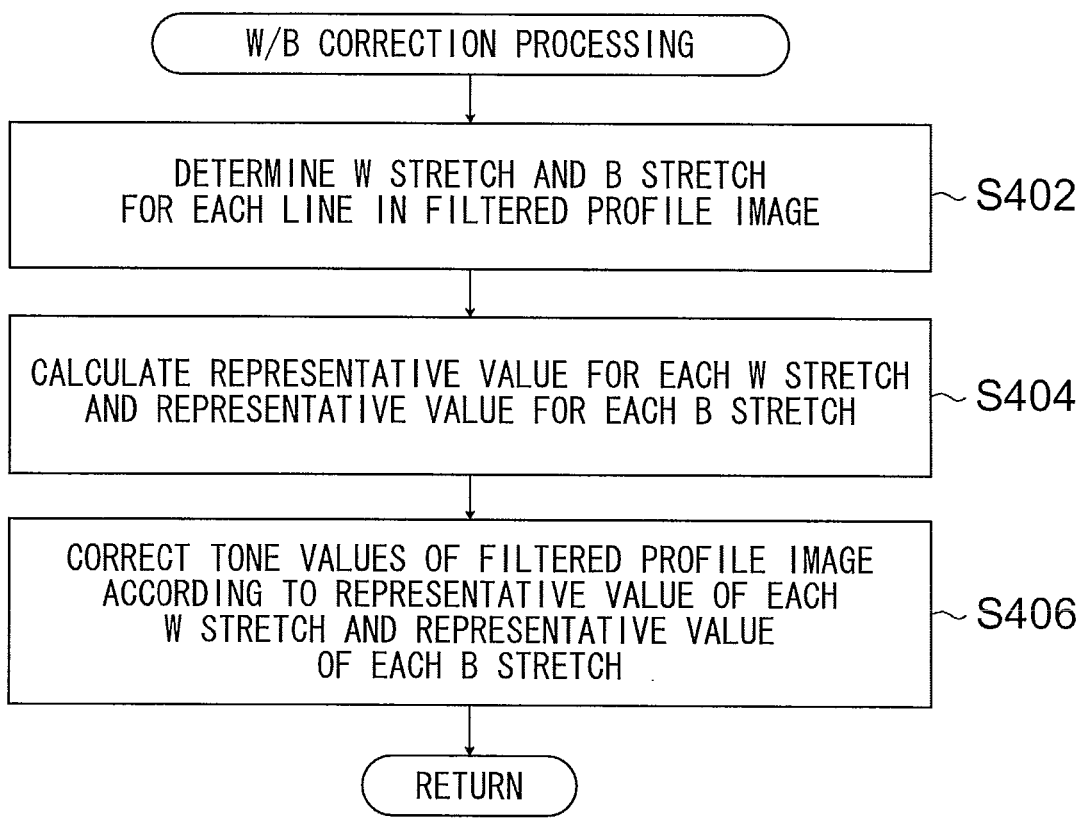
FIG. 26 is a flowchart showing the details of W(white, white ground)/B(black, ink) correction processing.

FIG. 26 shows the process flow for W/B correction processing. At the start of the W/B correction process flow in FIG. 26, W (white, white background) stretches and B (black, ink) stretches are set for each line in the filtered profile images (step S402), and representative values are determined for each of the W stretches and B stretches (step S404).

Figure 30:
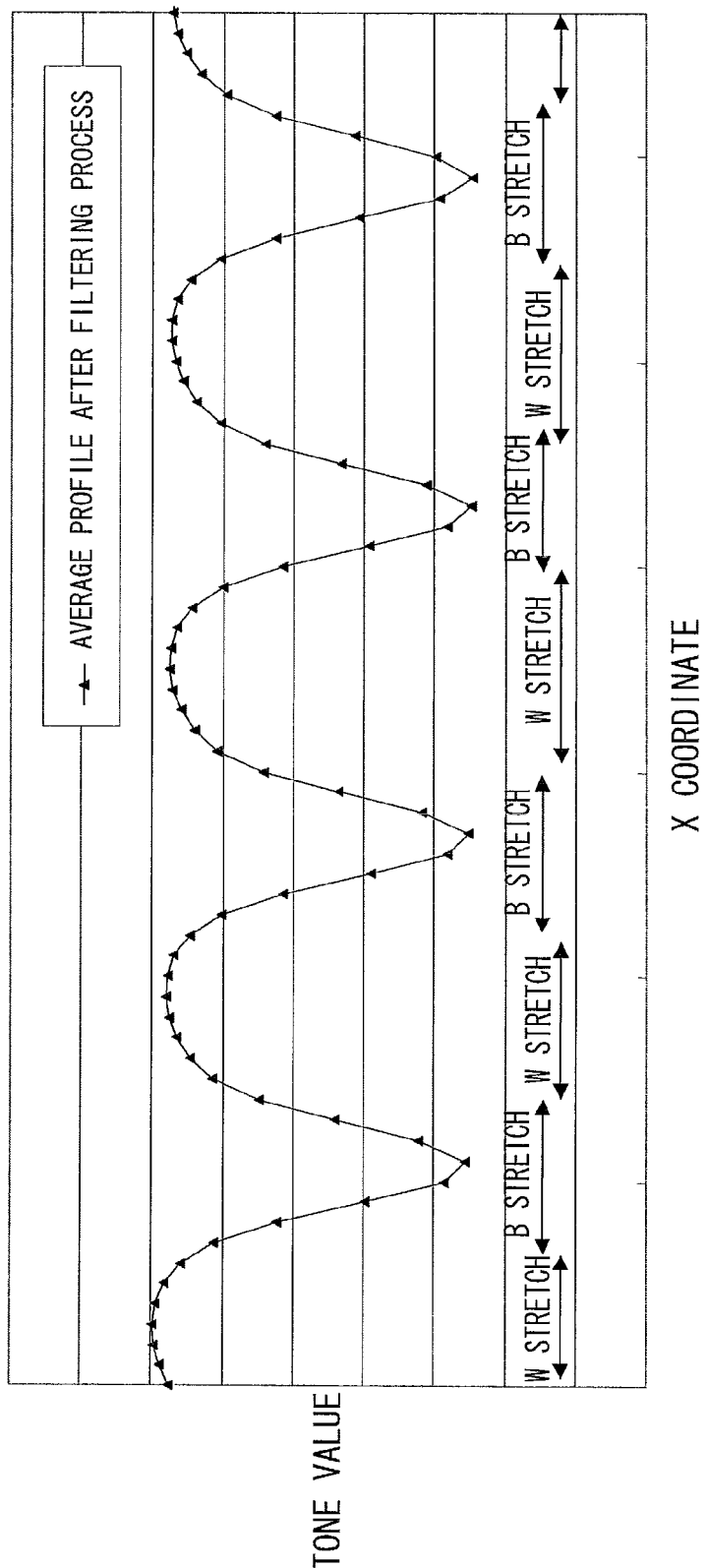
FIG. 30 is an explanatory diagram of W/B level correction.

FIG. 30 illustrates an aspect in which W (white, white background) stretches and B (black, ink) stretches are set for a filtered profile image. The W stretches and B stretches are laid on binarization processing based on a profile graph using a discrimination analysis method, and the result based on the binarization processing is further subjected to morphology processing (expansion is performed a predetermined number of times, and thinning is performed the same number of times), whereupon the results are set with the black pixels in the B stretches and white pixels in the W stretches. The B stretches thus occupy profile image dips (minimum values), and the W stretches occupy the profile image peaks (maximum values). An increase in black pixels by approximately a predetermined number of pixels may be set as a B stretch, while an increase in white pixels by approximately a predetermined number of pixels may be set as a W stretch.

For the W stretches determined in this way, tone values and positions representing the W stretches are found for the filtered profile images. A representative value is the maximum value in a W stretch, for example. The position of a W stretch is found using the center position of the W stretch. A representative tone value $W_{Li}$ and position $W_{Xi}$ are determined for each of the W stretches, $W_I$ (i=0, 1, 2, ... ).

Likewise, for the B stretches, the tone value and position to represent a B stretch are determined for the filtered profile images. The minimum value in the B stretch may be used as a representative value, for example. The position of a B stretch is found using the center position of the B stretch. A representative tone value $B_{Li}$ and position $B_{Xi}$ are determined for each of the B stretches $B_i$ (i=0, 1, 2, ... ).

The tone values of the filtered profile images are corrected on the basis of the representative values for the W and B stretches thus determined (step S406 in FIG. 26). Note that W stretch corresponds to a "non-recording region", and B stretch corresponds to "recording region".

<W/B Correction Processing>

Each position X and tone value L are corrected for the filtered profile images as follows. In other words, an estimate value $W_L$ is found for an optional X by performing linear interpolation on the representative values $W_{Li}$ and $W_{Xi}$ in the determined W stretch. An estimate value $B_L$ is found for an optional X by performing linear interpolation on the representative values $B_{Li}$ and $B_{Xi}$ of the determined B stretch.

Supposing that the white tone value after W/B correction is $W_0$ and the black tone value is $B_0$, then L'=correction coefficient K $(L-B_L)+B_0$ correction coefficient K=$(W_0-B_0)/(W_L-B_L)$, in other words, a linear transform is performed so that when the input value is $W_L$, the output value is $W_0$, and when the input value is $B_L$, the output value is $B_0$.

Once the processing to correct the W/B level in this manner (step S406) ends, a subroutine of FIG. 26 is completed and the processing return to the ROI line position measurement process flow of FIG. 25, and the processing advances to step S308 in FIG. 25. In step S308, in the W/B corrected profile image, an edge position (X coordinate) which matches a predetermined tone value (edge threshold tone value) is determined at two points (left and right) for each line.

Figure 31:
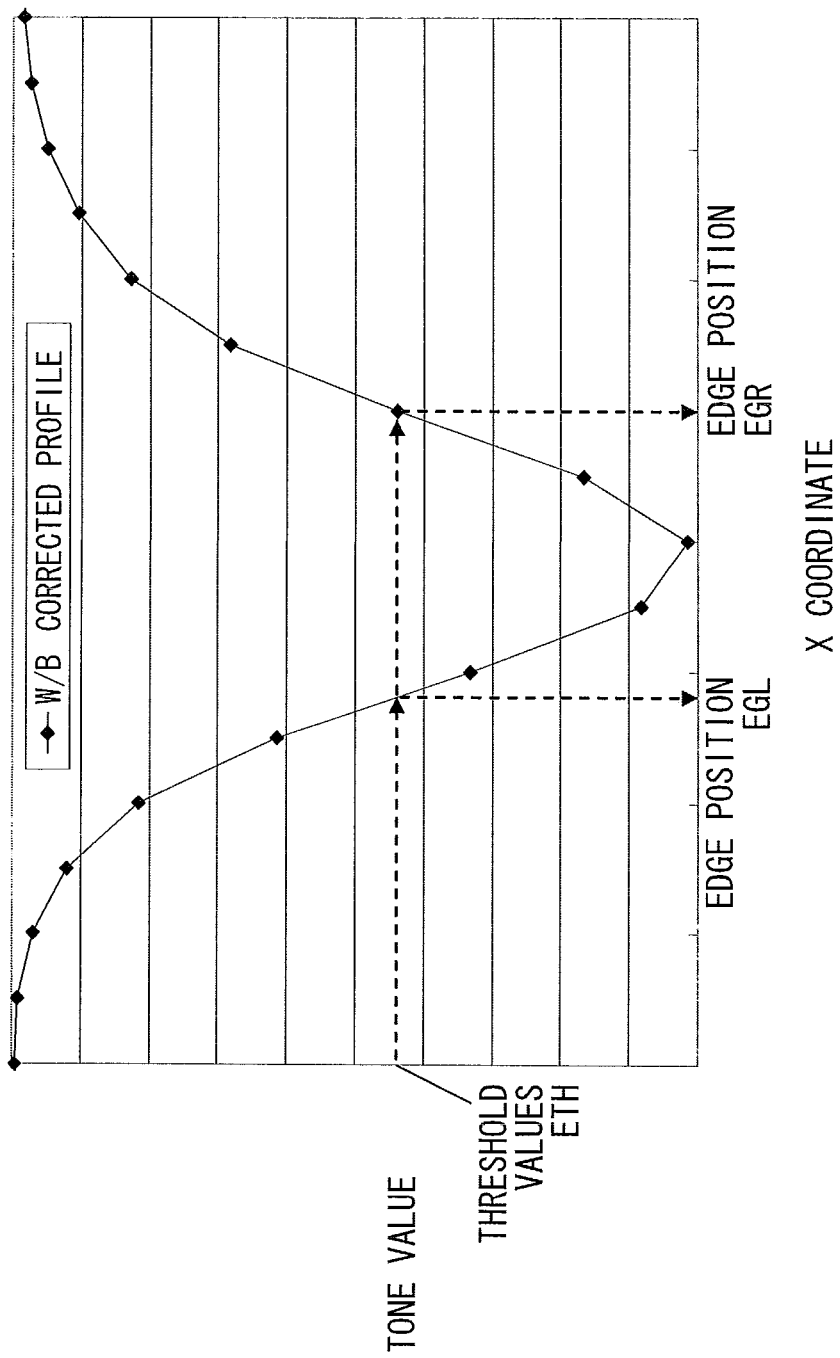
FIG. 31 is an explanatory diagram of an edge position determination method.

FIG. 31 illustrates an aspect in which, in the W/B corrected profile image, positions serving as threshold values ETH for defining the edges are determined with respect to the line at two forward and rear points (an edge position EGL on the left in FIG. 31 and an edge position EGR on the right).

In cases where W/B corrected profile image and the threshold values ETH do not accurately match, the edge positions can be determined using a publicly known interpolation algorithm. Linear or spline interpolation or cubic interpolation may be adopted as the publicly known interpolation algorithm.

The edge positions determined at two points of each line are then averaged for each line and the average value is determined as the line position (X coordinate) (step S310 of FIG. 25). The center position of the ROI in the Y coordinate direction is also determined as the Y coordinate of the line position. In other words, the Y coordinate is found using the center position of each ROI in the Y direction.

After the line positions corresponding to the ROI have been thus determined, a subroutine in FIG. 25 is completed, the processing returns to the position measurement process flow in a line block in FIG. 23 and the processing advances to step S206 of FIG. 23. In step S206, a position found by averaging the line positions measured for each of a plurality of ROIs (ROI 1 to ROI 4) is determined as the line position (X coordinate, Y coordinate) corresponding to the line block. The same or similar processing is performed for each line block to measure the line positions for each line block.

The method of identifying the line positions is not limited to a method which determines on the basis of the respective edge positions as described above, and it is also possible to employ other calculation methods, such as determining the line positions on the basis of the peak value of a profile image, for instance.

<Meaning of Averaging Line Positions Measured Based on Plurality of ROIs>

Figure 32:
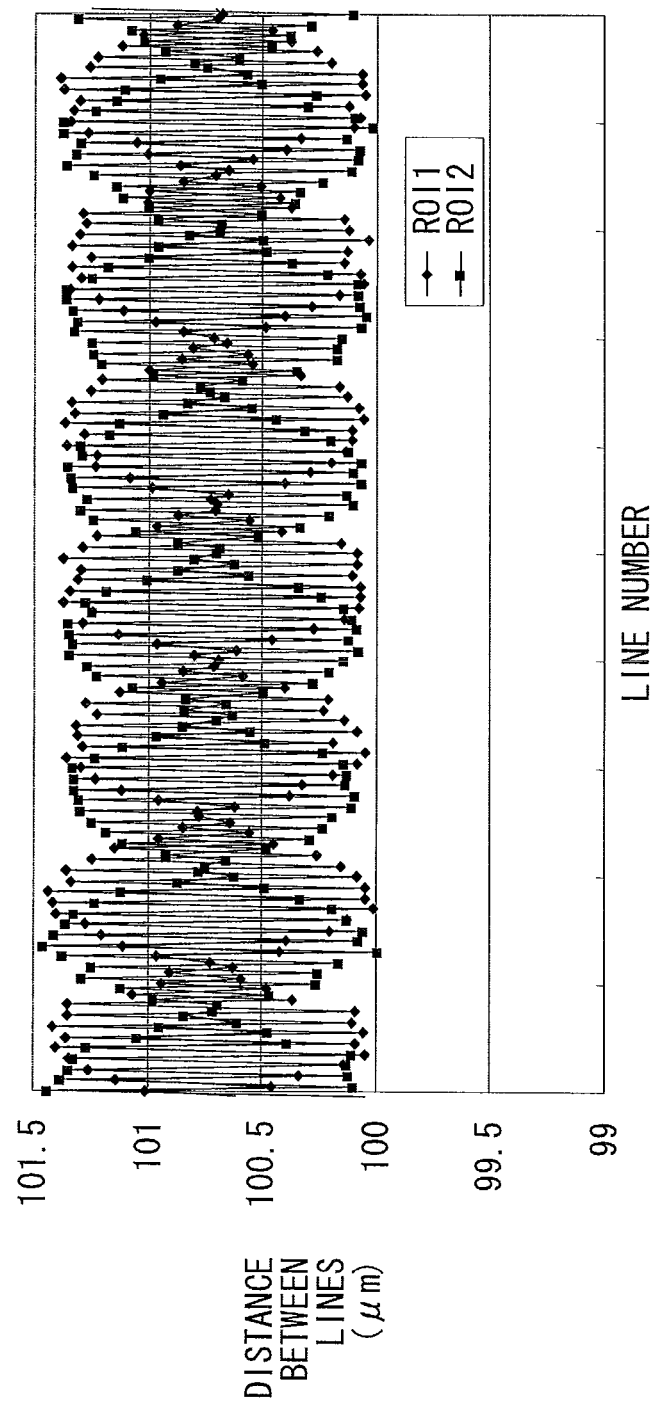
FIG. 32 is a graph showing line position measurement accuracy in each ROI.

FIG. 32 shows a result obtained by reading a revision line block that is produced accurately at a space of 100 μm and converting the line positions (X coordinates) determined by the ROI 1 and ROI 2 to a line space. The reason that a center value is slightly shifted from 100 μm is because the rotation angle of the line block is not corrected.

Figure 33:
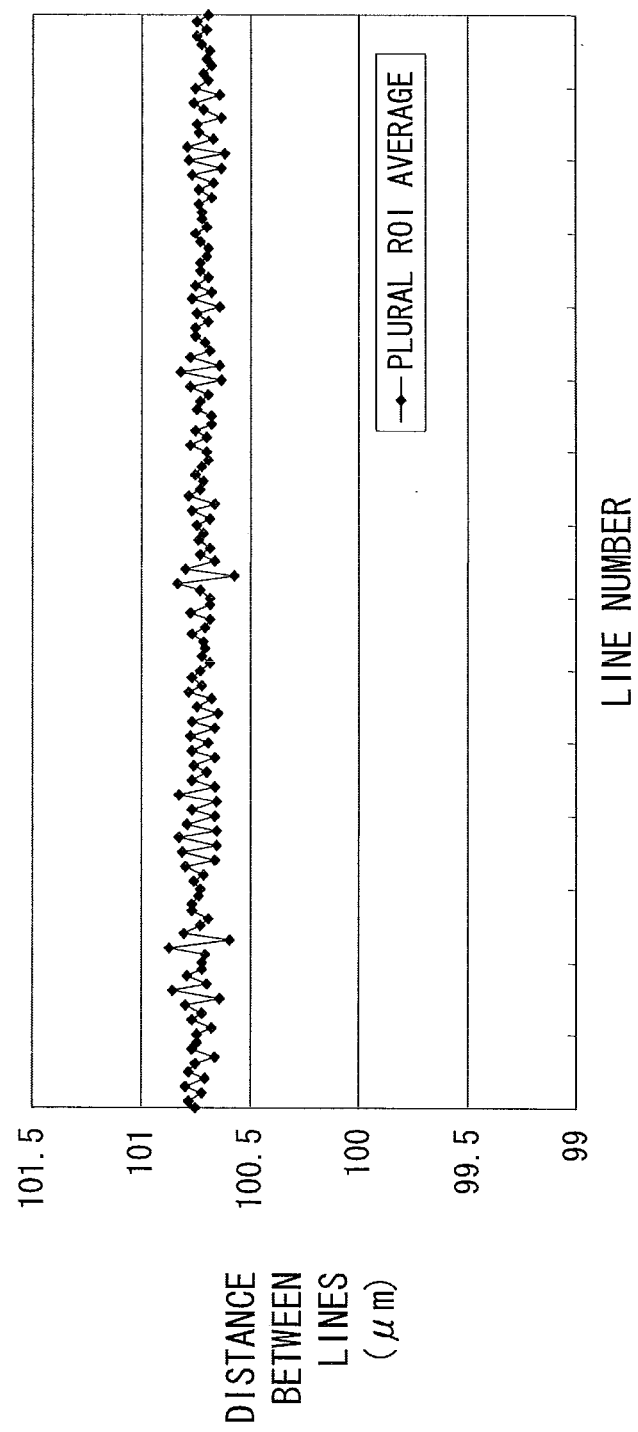
FIG. 33 is a graph showing measurement accuracy when a plurality of ROIs are averaged.

FIG. 33 shows a result obtained by reading a revision line block that is produced accurately at a space of 100 μm, in a similar manner as in FIG. 32, and converting the line position (X coordinate) obtained by averaging the ROI 1 to ROI 4 to a line space. As is clear by comparing FIG. 33 with FIG. 32, it is understood that the fluctuation of the line space is reduced and the space is close to a fixed value, in FIG. 33. In other words, FIG. 33 shows an excellent effect of averaging the line positions that are determined by the plurality of ROIs that are spaced apart regularly.

Therefore, in the present embodiment, the line positions measured by the plurality of ROIs are averaged with respect to each line block, to obtain the line position of each line block, as described with reference to FIG. 24.

As described above, the line positions measured by the plurality of ROIs are averaged to determine the line position of each line block, and the process of step S206 shown in FIG. 23 is ended. Thereafter, the subroutine of FIG. 23 is exited to return to the main flow of FIG. 13, and the step proceeds to step S107 shown in FIG. 13.

<Temporary Nozzle Position Estimation Processing Flow>

Figure 34:
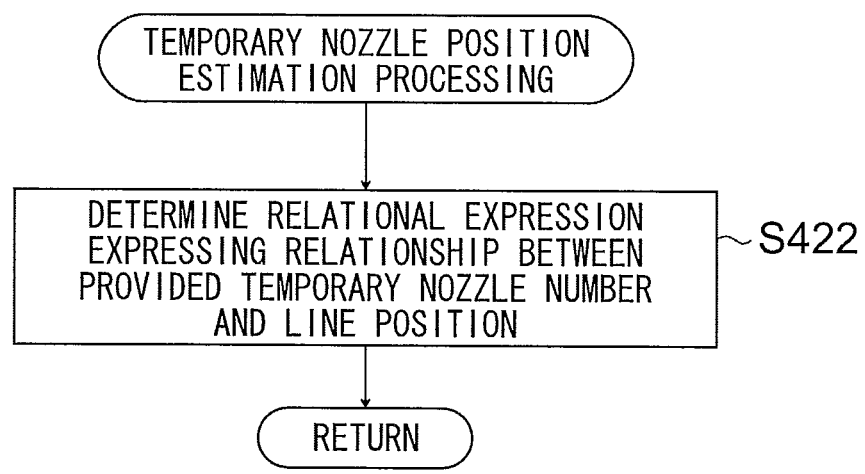
FIG. 34 is a flowchart showing the details of temporary nozzle position estimation processing.

FIG. 34 shows a flowchart of a temporary nozzle position estimation processing of step S107 in FIG. 13. Once the temporary nozzle position estimation processing flow of FIG. 34 is started, temporary nozzle numbers are provided, starting from an end of each line position that is measured based on the corresponding line block included in the line pattern, and a relational expression that expresses the relationship between the measured line position and the corresponding temporary nozzle number is determined (step S422).

When a non-discharging nozzle does not exist, no problem occurs by allocating nozzle numbers successively from the end of the group of lines as described above. However, when the non-discharging nozzle exists at a left-hand end, for example, the front nozzle numbers mismatch, which causes a problem in the subsequent processing.

In the present embodiment, in order to detect such a non-discharging nozzle at the left-hand end, the temporary nozzle numbers are introduced to a line block 0 to a line block 4, and the relationship of the temporary nozzle numbers with the measured line positions are determined using a predetermined approximate equation (FIG. 34). The term "temporary" in the temporary nozzle numbers is used to mean that the position at the left-hand end is temporarily regarded as a prescribed nozzle number.

In the present embodiment, the temporary nozzle numbers are provided, starting from the left-hand side, with reference to the line block at the left-hand end, but may be provided with reference to the right-hand end.

Moreover, prior to the processing for detecting the non-discharging nozzle at the left-hand end, it is necessary to specify the position of the non-discharging nozzle other than that of the left-hand end, from the abnormality of the line space within the line block, and then to appropriately obtain the temporary nozzle number and line position corresponding to this specified non-discharging position. The following countermeasures are taken for the non-discharging nozzle other than that at the left-hand end.

In the case where the line space measured from the read image is equal to or greater than an average line pitch in accordance with the fact that the space between the lines contained in a line block in which the ink droplets are deposited normally without causing the non-discharging nozzle is approximately a fixed value, it is determined that there exists the non-discharging nozzle between the two lines, and the non-discharging nozzle is inserted based on the line space/ "average line pitch".

In other words, the temporary nozzle numbers are shifted by a required number of nozzles, non-discharge attributes are provided to these nozzles, and a position obtained by dividing the space between the two lines equally is obtained as the nozzle position. Then, the relationship of the temporary nozzle numbers obtained subsequently with the line positions is shifted by the number of inserted nozzles.

When, on the other hand, the line space measured from the read image is equal to or lower than "average line pitch"× "overlapping line detection coefficient", there is a possibility that there is a line formed with satellites. Then, the adjacent line is considered the overlapping line and therefore deleted, and the relationship of the temporary nozzle numbers with the line positions is obtained.

The reason why the value obtained by multiplying the overlapping line detection coefficient by the average line pitch is used as the determination criterion value when determining the presence of the non-discharging nozzle and the overlapping line is to tolerate a certain degree of error from the exact average line pitch in consideration of a fluctuation in droplet positions of the nozzles.

<Example of Calculating the Relational Expression Expressing the Relationship of the Temporary Nozzle Numbers with the Line Positions (Nozzle Positions)>

Next is described an example of calculating the relational expression that expresses the relationship of the temporary nozzle numbers with the line positions (nozzle positions) in the temporary nozzle position estimation processing flow shown in FIG. 34.

Suppose that the temporary nozzle number included in a line block 0 is $N_i@LB_0$ and that the nozzle position is $(X_i@LB_0, Y_i@LB_0)$. Similarly, suppose that the temporary nozzle number included in a line block 1 is $N_i@LB_1$ and that the nozzle position is $(X_i@LB_1, Yi@LB_1)$. Suppose that the temporary nozzle number included in a line block 2 is $N_i@LB_2$ and that the nozzle position is $(X_i@LB_2, Y_i@LB_2)$. Suppose that the temporary nozzle number included in the line block 3 is $N_i@LB_3$ and that the nozzle position is $(X_i@LB_3, Y_i@LB_3)$. Supposed that the temporary nozzle number included in the line block 4 is $N_i@LB_4$ and that the nozzle position is $(X_i@LB_4, Y_i@LB_4)$.

Because the line block 0 is a group of lines in which the ink is dropped by the nozzle having a nozzle number expressed as 4N+0 (N is an integer of at least 0), the temporary nozzle numbers $N_i@LB_0$ is allocated from the left-hand end to the line positions of the group of lines belonging to the line block 0 of the read image in a manner of $\{0, 4, 8, 12, 16, \ldots\}$.

Similarly, because the line block 1 is a group of lines in which the ink is dropped by the nozzle having a nozzle number expressed as 4N+1 (N is an integer of at least 0), the temporary nozzle numbers $N_i@LB_1$ is allocated in a manner of $\{1, 5, 9, 13, 17, \ldots\}$. The temporary nozzle number $N_i@LB_2$ of the line block 2 is allocated in a manner of $\{2, 6, 10, 14, 18, \ldots\}$. The temporary nozzle number $N_i@LB_3$ of the line block 3 is allocated in a manner of $\{3, 7, 11, 15, 19, \ldots\}$. The temporary nozzle number $N_i@LB_4$ of the line block 4 is allocated in a manner of $\{0, 5, 10, 15, 20, \ldots\}$.

Next, the relationship of the temporary nozzle number included in the line block 0 with the nozzle position is obtained by using a predetermined approximate equation (a polynomial or a piecewise polynomial):

$X=GLB_0(N)$, where X is the nozzle position, and N is the temporary nozzle number.

Similarly, an approximate equation $X=GLB_1(N)$ of the line block 1 is obtained. Furthermore, approximate equations $X=GLB_2(N)$, $X=GLB_3(N)$ and $X=GLB_4(N)$ for the line block 2, the line block 3 and the line block 4, respectively, are obtained.

The approximate functions $GLB_0(N)$, $GLB_1(N)$, $GLB_2(N)$, $GLB_3(N)$ and $GLB_4(N)$ that express the relationship of the temporary nozzle numbers with the nozzle positions in the respective line blocks are obtained.

The positional data measured from each of the line blocks 0 to 3 is data that shows that a set of four nozzles is positioned in a scattered manner. The line block 4 is data that shows that a set of five nozzles is positioned in a scattered manner. Rough characteristics (approximate functions) of the temporary nozzle numbers and line positions are obtained from these data items. By using the approximate functions, the positions of nozzle numbers that do not exist in an actual line block can be estimated.

Once the processing of step S422 in FIG. 34 is ended in a manner described above, the subroutine in FIG. 34 is exited to return to the main flow in FIG. 13, and the step proceeds to step S108 in FIG. 13.

<Rotation Angle/Nozzle Number Estimation Processing Flow>

Figure 35:
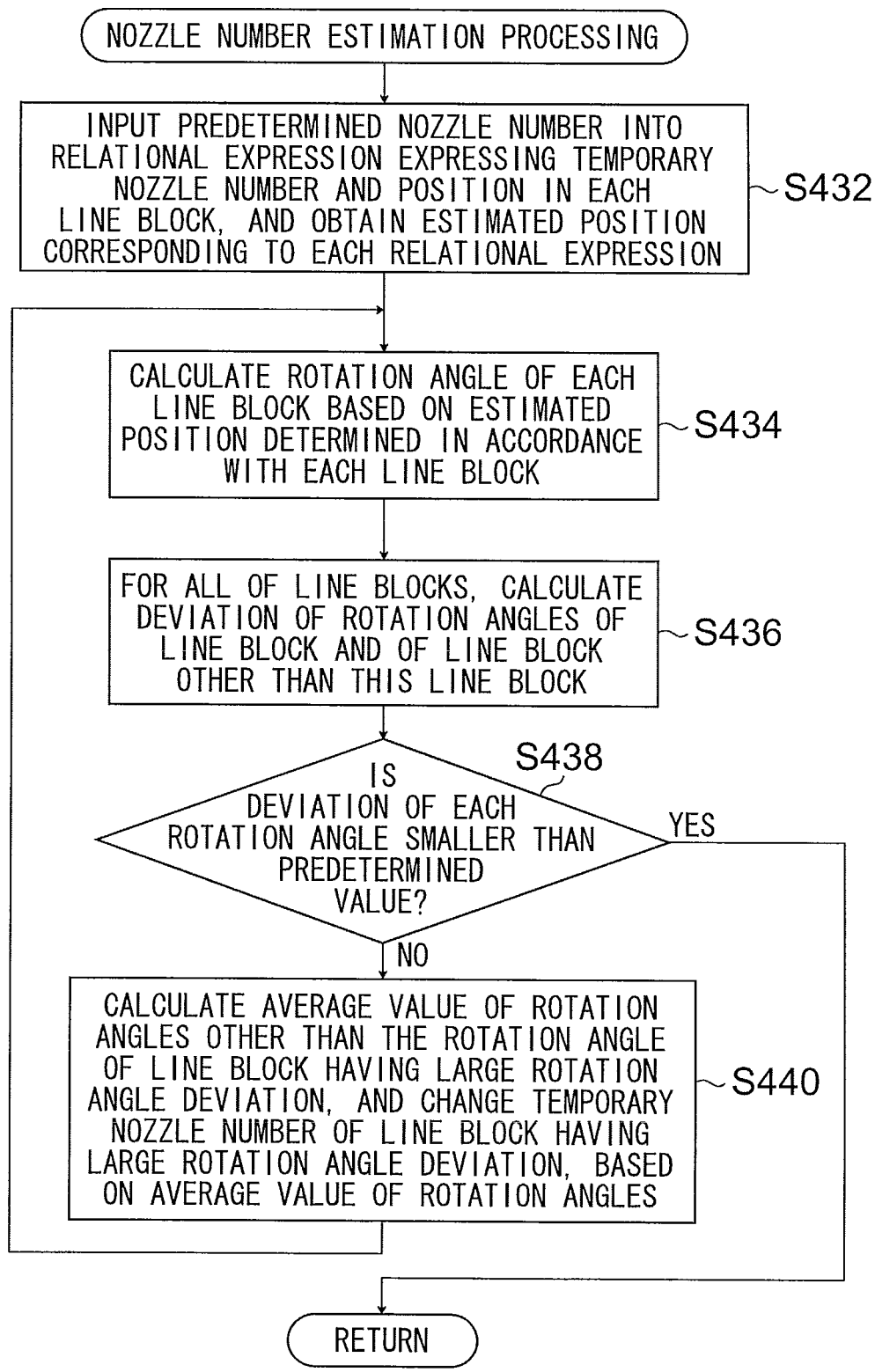
FIG. 35 is a flowchart showing the details of rotation angle/ nozzle number estimation processing.

Once the flow of the rotation angle/nozzle number estimation processing is started using the flowchart of rotation angle/nozzle number estimation processing in FIG. 35, a predetermined nozzle number is input to the relational expression that expresses the relationship between the temporary nozzle number and the position in each line block, to obtain an estimated position corresponding to the relational expression (step S432).

Next, the rotation angle of each of the line blocks is calculated based on the estimated position determined for each line block (step S434).

In the case of, for example, the approximate functions $GLB_0(N)$, $GLB_1(N)$, $GLB_2(N)$, $GLB_3(N)$ and $GLB_4(N)$, a collection of the same nozzle numbers $M=\{N_0, N_1, N_2, N_3, N_4, \ldots\}$ is substituted with these approximate functions, to obtain the estimated positions corresponding to the same nozzle numbers, from the approximate functions.

Thereafter, the rotation angle of each of the line blocks is calculated from the collection of the estimated positions corresponding to the same nozzle numbers, the estimated positions being determined from the approximate functions of the line blocks. In so doing, the average of output values of the respective approximate functions corresponding to the estimated positions is calculated as a representative value of the estimated positions of the respective line blocks.

Specifically, the collection of the same nozzle numbers $M=\{N_0, N_1, N_2, N_3, N_4, \ldots\}$ is substituted with each of the approximate functions $GLB_0(N)$, $GLB_1(N)$, $GLB_2(N)$, $GLB_3(N)$ and $GLB_4(N)$, to calculate the average of the output values of these approximate functions.

The obtained averages of the output values of the approximate functions are expressed as $X@LB_0$, $X@LB_1$, $X@LB_2$, $X@LB_3$ and $X@LB_4$.

In the case where the positions of the line blocks in the Y-direction belong to the same line block, the position of each line block in the Y-direction has the same coordinates. Therefore, the positions of the line blocks in the Y-direction are taken as $Y@LB_0$, $Y@LB_1$, $Y@LB_2$, $Y@LB_3$ and $Y@LB_4$.

The tilt between the line blocks is obtained by calculating the tilt of a straight line that connects two points selected from among the coordinates $(X@LB_0, Y@LB_0)$, $(X@LB_1, Y@LB_1)$, $(X@LB_2, Y@LB_2)$, $(X@LB_3, Y@LB_3)$ and $(X@LB_4, Y@LB_4)$ that represent the positions of the representative points corresponding to the respective line blocks.

FIG. 36 is a matrix for calculating the tilt angle between the line blocks. The tilt angle $\theta_{jk}$ (where j, k represent a combination of integers satisfying $0 \leq j \leq k \leq 4$) between two different line blocks is obtained (ten tilt angles) with respect to the line blocks 0 to 4 ($LB_0$ to $LB_4$).

If the relationship between the temporary nozzle number and the nozzle position of each of all of the line blocks is correct, the tilt angle of the position between the different line blocks is constant regardless of the line blocks.

When there is an error in the relationship between the temporary nozzle number and the line position in a certain block, the tilt angle that is calculated for this line block changes. The line block in which such a tilt angle changes is specified (steps S436 to S438 in FIG. 35), and the temporary nozzle number of the specified line block is corrected based on the tilt angle between the line blocks other than the specified line block (step S440 in FIG. 35).

Figure 37B:
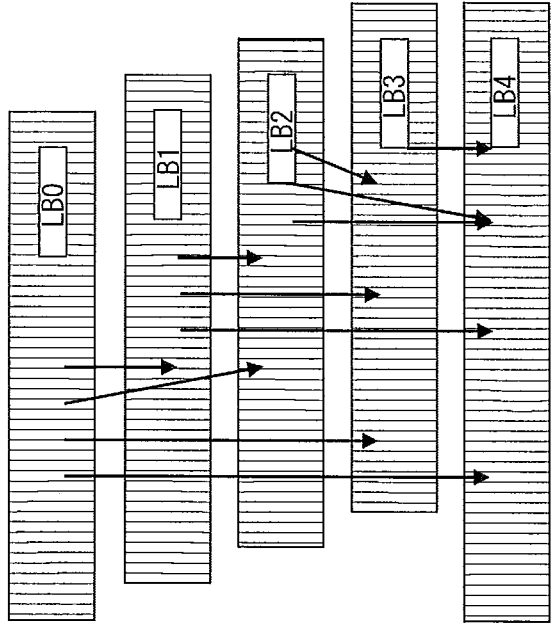
FIGS. 37A and 37B are explanatory diagrams showing a tilt angle between the line blocks in the case where an original document is not tilted when reading a test chart.
Figure 37A:
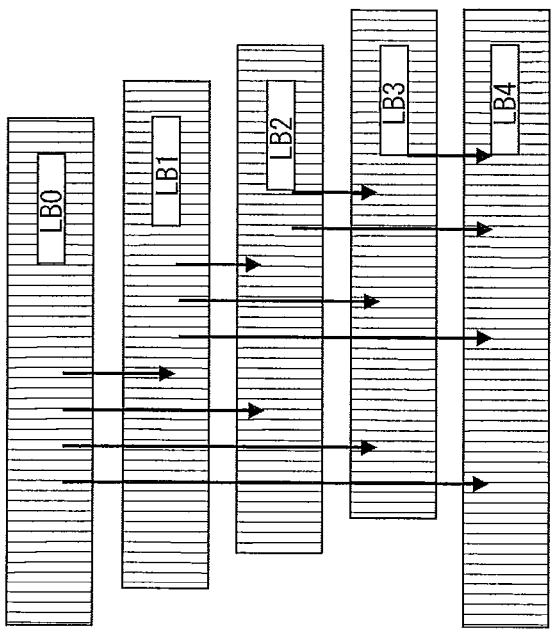

FIGS. 37A and 37B are diagrams illustrating the relationship between the tilt angle calculated in FIG. 36 and the line block.

Because the non-discharging nozzle does not exist at the left-hand end of each line block as shown in FIG. 37A, the tilt angle between the line blocks is constant regardless of the combination of the line blocks. In each of the line blocks the individual line image has a positional error; however, the result of averaging the output values with respect to the collection of the same nozzle numbers is taken as a coordinate value, thus the individual positional errors of the nozzle images can be ignored.

FIG. 37B shows a case in which a difference is generated in the temporary nozzle numbers due to the presence of the non-discharging nozzle at the left-hand end of the line block 2 ($LB_2$). In this case, due to the difference in the temporary nozzle numbers, the tilt angles ($\theta_{02}, \theta_{12}, \theta_{23}, \theta_{24}$) between the line block 2 ($LB_2$) and another line block combined therewith fluctuate more than the tilt angle between other line blocks ($\theta_{01}$ or the like). Such fluctuation is detected and determined, to correct the temporary nozzle numbers of the line blocks having such fluctuation (for example, $LB_2$ in the diagram), based on another constant tilt angle.

Figure 38A:
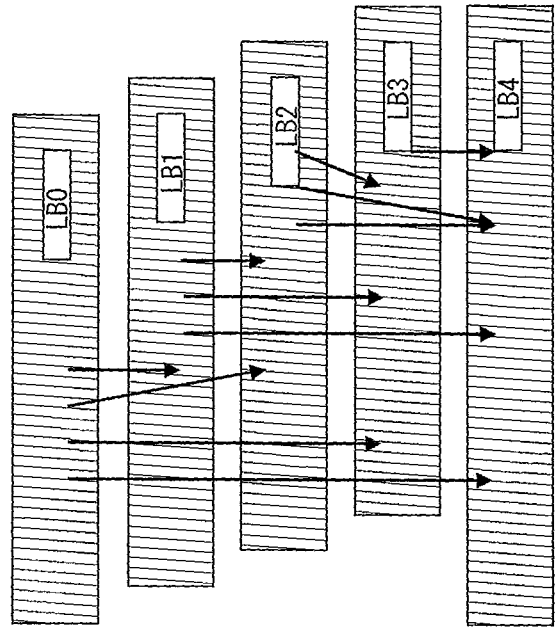
FIGS. 38A and 38B are explanatory diagrams showing the tilt angle between the line blocks in the case where the original document is tilted when the test chart is read.
Figure 38B:
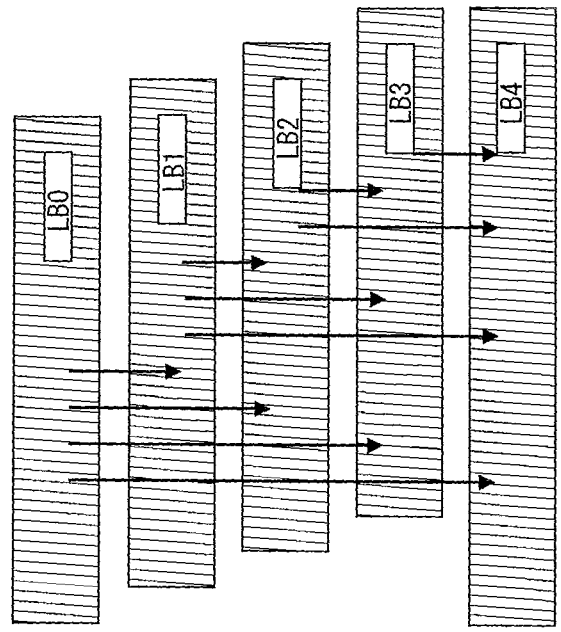

The tendency of the tilt angle between the line blocks is same with the case where the entire read image is tilted (see FIGS. 38A and 38B). As shown in FIGS. 38A and 38B, even when the entire image is tilted, the tilt angle between the line blocks is constant regardless of the combination of line blocks because the non-discharging nozzle does not exist at the left-hand end of each line block, in FIG. 38A. When, on the other hand, the non-discharging nozzle exists at the left-hand end of the line block 2 ($LB_2$) as shown in FIG. 38B, the characteristics of only the approximate function of the line block 2 are different from the characteristics of the approximate functions of the other line blocks due to the difference in the temporary nozzle numbers. Thus, the tilt angle between the line blocks that is calculated in combination with the line block 2 ($LB_2$) is significantly different from the tilt angle between the other line blocks.

As is clear by comparing FIG. 38B with FIG. 37B, when the entire read image is tilted (rotated), all the lines are rotated even though the rotation angle is constant. Thus, the tilt angle between the line blocks, which is calculated from FIG. 37B, and the tilt angle between the line blocks, which is calculated from FIG. 38B, are in a linear relationship. Therefore, the present embodiment is applicable even to the case where the entire read image is rotated.

As described above, from the difference in tilt angle between the line blocks, the error (the non-discharging nozzle at the left-hand end) can be detected in the temporary nozzle numbers. For the line block in which the error in the temporary nozzle numbers is detected, it is corrected by shifting the entire nozzle numbers so as to provide a nozzle number to the non-discharging nozzle existing at the left-hand end.

Note that as a method of detecting the tilt angle that has a peculiar tilt, from the tilt angles calculated for the line blocks (FIG. 36), a deviation of a collection of tilt angles that includes the line blocks of focus (a combination that includes the $LB_2$ in the examples shown in FIGS. 37B and 38B) can be used.

In addition, in the method of correcting the temporary nozzle numbers, based on another constant tilt angle (in the present embodiment, an average value of rotation angles excluding a line block having a large deviation) and the value of the coordinate of a correction target line block ($Y@LB_2$ in the example shown in the diagram), the value of $X'@LB$ ($X'@LB_2$ in the example shown in the diagram) is obtained based on the other constant tilt angle, and the amount of movement in the X-direction that corresponds to the difference between $X@LB$ and $X'@LB$ is converted and corrected to a nozzle number.

In the flowchart in FIG. 35, after the tilt angle between the line blocks is calculated (step S434), the deviation of the rotation angle (tilt angle) of a certain line block of focus and the deviation of the rotation angle of each of other line blocks are calculated for all of the line blocks (step S436). Thereafter, whether the deviation of each of the calculated rotation angles is smaller than the predetermined value (predetermined determination criterion value) or not (step S438). When there is a deviation exceeding the predetermined value (the result of the determination is NO), the step proceeds to step S440.

Step S440 calculates the average value of the rotation angles of the line blocks other than the line block, the rotation angle deviation of which is greater than the predetermined value, and changes the temporary nozzle number of the line block (the correction target line block), the rotation angle deviation of which is greater than the predetermined value, based on the average value of the rotation angles. Once the temporary nozzle number is corrected in this manner, the step returns to step S434.

In other words, the approximate expression (the approximate function $GLB_2(N)$ in the example shown in the diagram) is obtained again based on the corrected temporary nozzle number, the tilt angle between the line blocks is re-calculated (step S434), and whether the deviation of the rotation angle is smaller than the predetermined value or not is determined (steps S436 to S438).

When the deviation of the rotation angle is smaller than the predetermined value as a result of step S438 (the result of the determination is YES), the flow in FIG. 35 is exited to return to the main flow in FIG. 13.

As a result of the procedure described with reference to FIG. 35, the relationship between the nozzle number and the line position in each line block is corrected to a correct relationship.

As illustrated in FIGS. 37A to 38B, when there is the non-discharging nozzle at the left-hand end only in one line block ($LB_2$) out of the plurality of line blocks ($LB_0$ to $LB_4$), the difference in tendency between the tilt angles can be determined easily. The possibility that the non-discharging nozzles exist at the left-hand ends of two or more line blocks out of the plurality of blocks ($LB_0$ to $LB_4$) at the same time is considered low. However, if there exist the non-discharging nozzles at the left-hand ends of the two line blocks, the tendencies of the tilt angles of the remaining three normal line blocks are the same, thus the temporary nozzle numbers of the line blocks with peculiar tendencies are corrected with reference to a large number of line blocks having the same tendency (normal line blocks), so that the temporary nozzle numbers of the peculiar line blocks match.

When the non-discharging nozzles exist at the left-hand ends of all of the line blocks, the difference in tendency between the tilt angles cannot be discriminated. However, the possibility that the non-discharging nozzles exist at the left-hand ends of the three or more line blocks at the same time is extremely low. Moreover, the situation where a lot of non-discharging nozzles exist is not preferred in terms of image formation, thus such situation is handled/prevented using another non-discharging nozzle detection technology, nozzle recovery technology (cleaning technology), a non-discharge prevention technology, or an appropriate combination thereof.

<Preferred Embodiment of Test Chart>

In the case where the plurality of line blocks form one sequence (1 ON N off), a correction algorithm that uses the tilt angle between the line blocks cannot detect more than the maximum number (N+1) of the left-hand end non-discharging nozzles.

In other words, when the line block 4 ($LB_4$) is excluded in the examples shown in FIGS. 37A to 38B, four or more non-discharging nozzles specify only a residue of four.

However, when the line block has a plurality of sequence (1 ON N off, 1 ON M off) as shown in FIGS. 37A to 38B, the correction range can be expanded by correcting the algorithm as follows.

First, the tilt angles among the line blocks $LB_0$ to $LB_3$ are obtained, and the correction processing is executed. The deviation of the tilt angles $\theta_1$ among the line blocks $LB_0$ to $LB_3$ is smaller than the predetermined value.

Next, $LB_4$ (the line bock in a different sequence) is added, one of the line blocks $LB_0$ to $LB_3$ is taken as a representative line block ($LB_2$, for example), and then the tilt angle $\theta_2$ between the two line blocks $LB_2$ and $LB_4$ is calculated. When the difference between $\theta_1$ and $\theta_2$ is smaller than the predetermined value, it is considered that the non-discharging nozzle no longer exists, and the processing is ended.

On the other hand, when the difference between $\theta_1$ and $\theta_2$ is larger than the predetermined value, the non-discharging nozzle needs to be estimated. In so doing, when the non-discharging nozzle exists between $LB_0$ to $LB_3$, the number of non-discharging nozzles becomes a factor of four. However, when the non-discharging nozzles exist in $LB_4$, the number of non-discharging nozzles becomes a factor of five. By using a condition that the tilt angle is $\theta_1$ by right, the non-discharging nozzles of $LB_4$ are estimated such that $\theta_2$ becomes equal to $\theta_1$.

At this moment, when the non-discharging nozzles exist more on the $LB_4$ side than the $LB_0$ side, the nozzle numbers of $LB_4$ protrude beyond the original nozzle number range. When the nozzle numbers of $LB_4$ protrude beyond the original nozzle number range as described above, the nozzle numbers of all of the line blocks $LB_0$ to $LB_4$ are corrected so that the nozzle numbers of $LB_4$ match the original nozzle numbers.

As mentioned above, by using the test chart that includes a plurality of sequences (1 ON N off, 1 ON M off) of line blocks, the correction range increases up to (N+1)×(M+1). In the examples shown in FIGS. 37A to 38B, N=3 and M=4 are established, thus up to twenty nozzles can be corrected.

In other words, when a sequence in which the difference in progression between the temporary nozzle numbers (common difference in arithmetic progression) is included, the nozzle numbers can be corrected within a range that corresponds to the common multiple of the sequence having such difference. To describe an example other than those shown in FIGS. 37A to 38B, for example, the in so-called 1 ON 15 OFF line blocks 0 to 15, the ink is dropped at the nozzle numbers of 16N+A (where A=0, . . . , 15), and the difference in progression between the temporary nozzle numbers in each line block is 16. In addition to these blocks 0 to 15, when the line blocks in which the ink is dropped at the nozzle number 17N are combined as the line block 16, the difference in progression between the temporary nozzle numbers for this line block 16 is 17. When the line blocks in a series having the difference (common difference) are combined as described above, the nozzle numbers can be corrected within the range where the common multiple is 16×17=272.

After correcting the relationship between the nozzle number and the line position as above, the rotation angle obtained when reading the line pattern (the rotation angle of the line pattern in relation to the scanner read coordinates) is obtained, and rotational correction is performed based on this rotation angle (step S109 shown in FIG. 13).

<Physical Value Conversion>

Information on the line positions determined in step S106 in FIG. 13 corresponds to the pixel positions of the scanner coordinate system, and therefore these pixel positions are converted to physical units (for example, micrometers ($\mu$m)). In other words, the line positions are converted into physical values by multiplying these values by coefficients corresponding to the main scanning resolution and the sub-scanning resolution.

In a case where the main scanning read resolution is 2400 DPI, for example, the coefficient is 25400/2400 ($\mu$m/dots). When the sub-scanning read resolution is 200 DPI, the coefficient is then 25400/200 ($\mu$m/dots). Computation to convert the pixel positions into physical values in $\mu$m units is performed by using these coefficients.

This physical value conversion is carried out in order to correct the difference between the main scanning resolutions and the sub-scanning resolutions before rotational correction is performed in step S109 of FIG. 13.

Note that the conversion from a coordinate system for pixels of image data to a coordinate system on an actual recording medium is defined by a conversion expression using the aforementioned coefficients. Hence, which coordinate system is used in the computation and at which stage of the computation the coordinate conversion is performed, are optional.

<Rotation Angle Correction>

Figure 39:
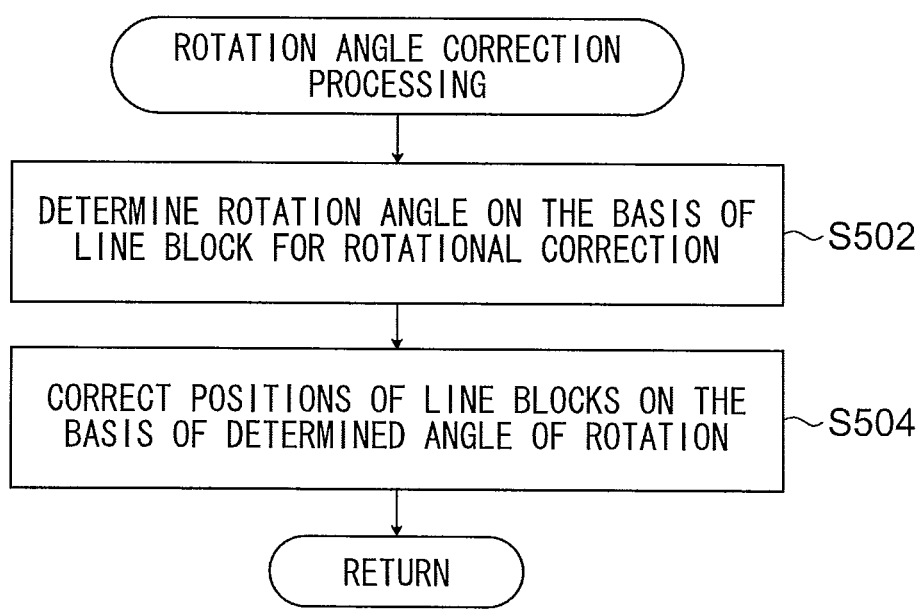
FIG. 39 is a flowchart showing the details of rotation angle correction processing.

FIG. 39 illustrates a flowchart of the rotation angle correction processing in step S109.

When the rotation angle correction procedure in FIG. 39 starts, the rotation angle is determined on the basis of line blocks used for rotational correction (step S502). In other words, the rotation angle ($\theta$ in FIG. 11) between the line pattern and the scanner reading coordinate is determined on the basis of the position coordinates (the line position (X coordinate, Y coordinate) determined in the process of step S106) of a line which is formed by the same nozzle but which belong to different line blocks, among the line positions of the line blocks included in the measurement chart. Rotational correction is then performed on each line block position (that is, each line position) on the basis of the rotation angle ($\theta$) thus found (step S504).

<Calculation of Rotation Angle and Rotation Angle Correction>

In this embodiment, the line blocks 0 and 4 in FIG. 9 are used as rotational correction line blocks. After determining the line positions for line blocks 0 to 4 as is described in step S206 of FIG. 23, the positional coordinates of lines created by the same nozzle are found in the line blocks 0 and 4.

Since, in this example, the lines are created in the line blocks 0 and 4 by the common nozzles with the nozzle numbers 0, 20, 40, 60, . . . , the line positions corresponding to these common nozzle numbers can be utilized.

Suppose that the line position of the nozzle number 0 belonging to the line block 0 is $P_0@LB_0=(x_0\_LB_0, y_0\_LB_0)$ and the line position of the nozzle number 0 belonging to the line block 4 is $P_0@LB_4=(x_0\_LB_4, y_0\_LB_4)$.

The angle $\theta_0$ between the two positions can be determined from the relationship $\tan \theta_0 = \Delta Y/\Delta X$, where $\Delta Y_0 = y_0\_LB_4 - y_0\_LB_0$, $\Delta X_0 = x_0\_LB_4 - x_0\_LB_0$.

The angles $\theta_{20}$, $\theta_{40}$, $\theta_{60}$, . . . , are likewise found for other nozzle numbers, namely, nozzle 20, nozzle 40, nozzle 60, . . . , and the average value of these angles is determined as the rotation angle $\theta$. Rotational correction is performed using the rotation angle $\theta$ thus determined.

Each line position (x, y) for the line blocks 0 to 3 is converted using rotation matrix $R(-\theta)$ to find a line position (x', y') with the rotation angle canceled out.

After processing for correcting the rotation angle as described above, the procedure exits the sub-routine in FIG. 39, returns to the general sequence in FIG. 13 and proceeds to step S110 in FIG. 13.

Figure 40:
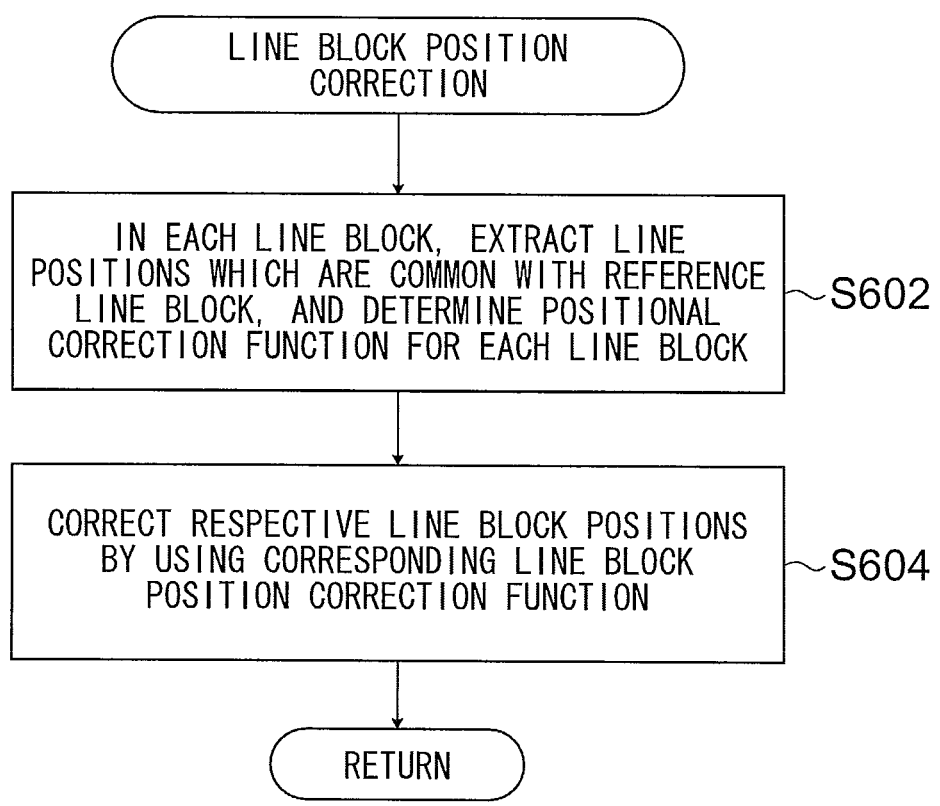
FIG. 40 is a flowchart showing the details of line block position correction processing.
Figure 53:
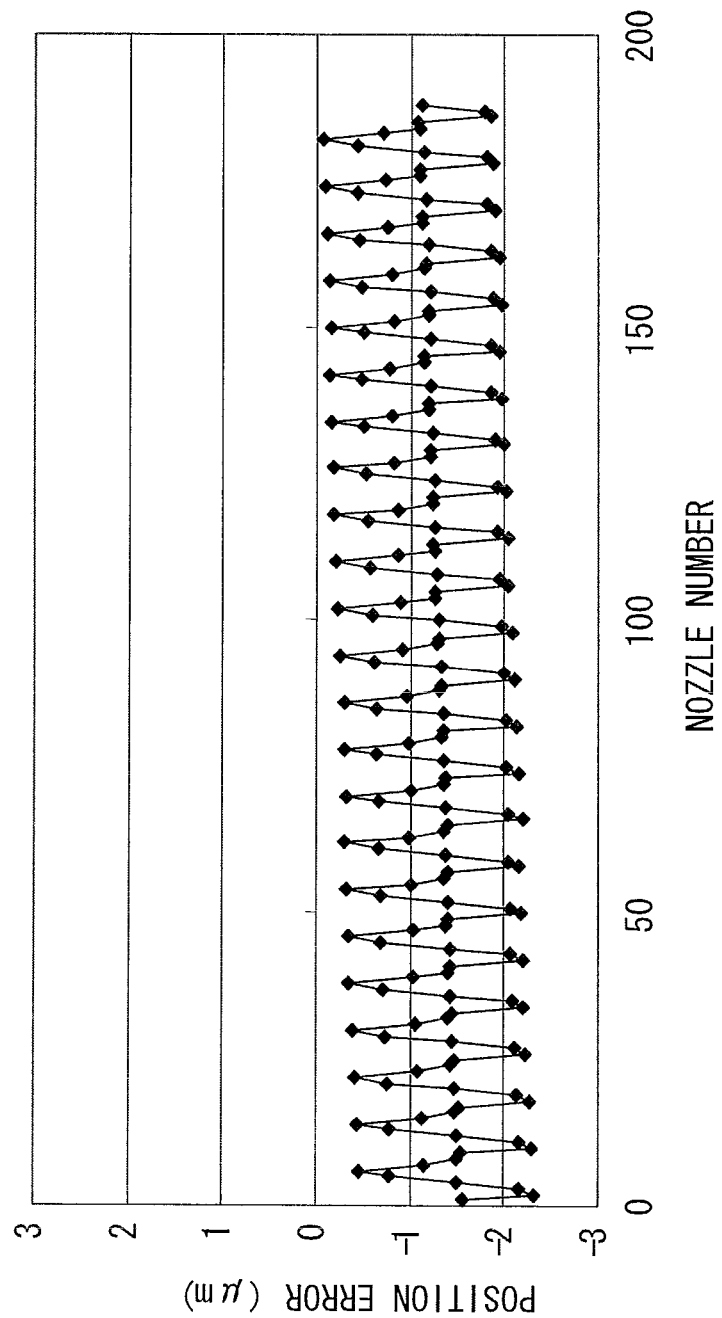
FIG. 53 is a diagram showing an example of the measurement results of dot position error corresponding to the respective nozzles (after rotation angle correction) in the related art.

Even after correction of the rotation angle, the measurement values still contain offset error caused by the scanner, or other factors (see FIG. 53). Hence, at step S110 in FIG. 13, processing for positional correction between the line blocks is carried out. FIG. 40 shows a flowchart of this line block position correction processing (step S110).

When the line block position correction processing procedure in FIG. 40 starts, firstly, the lines formed by nozzles which are common with the reference line block are extracted respectively for each line block, and in respect of each of the extracted lines, a correction function in which the output value is the measurement position (X coordinate) of the reference line block and the input value is each line block measurement position (X coordinate) is determined, for each of the line blocks (step S602). As described below with reference to FIG. 42, the correction function is determined as a piecewise polynomial expression, by a least-squares method. In this way, a correction function is obtained for each of the line blocks.

Thereupon, all of the measurement positions (X coordinates) of the respective line blocks are converted using the corresponding correction function (piecewise polynomial expression) thus determined (step S604).

<Correction of Line Block Positions>

A specific example of positional correction between line blocks is described here. The positions of the line block 0 to the line block 3 are corrected respectively, and here a description relating to the line block 0 is given.

The line measurement positions (nozzle numbers 0, 20, 40, 60, 80, . . . ) of the nozzle numbers which are common to the line block 0 and the line block 4 (reference line block) are extracted.

The measurement positions (X coordinates) of the line block 0 are $lb_0\_x_0$, $lb_0\_x_4$, $lb_0\_x_8$, and so on.

The measurement positions (X coordinates) of the line block 4 are $lb_4\_x_0$, $lb_4\_x_5$, $lb_4\_x_{10}$, $lb_4\_x_{15}$, $lb_4\_x_{20}$, and son on.

The measurement positions of the nozzle numbers common to both blocks are as follows $X = \{lb_0\_x_0, lb_0\_x_{20}, lb_0\_x_{40}, lb_0\_x_{60}, \ldots \}$; and
$Y = \{lb_4\_x_0, lb_4\_x_{20}, lb_4\_x_{40}, lb_4\_x_{60}, \ldots \}$.

A correction function $f_0$ giving $y = f_0(x)$ is specified using the positions of these common nozzle numbers.

In the correction functions, if the variation factors relating to the scanner are a cause of offset only, then $a_0$ can be specified by a least-squares method for $Y = X + a_0$ (zeroth-order function), and if slight rotation of the carriage is a problem, then $a_0$ and $a_1$ are specified by a least-squares method for $Y = a_1 \times X + a_0$ (first-order function). In respect of paper deformation, a correction function for the deformation can be used. If the paper deformation and the scanner factors are combined, then a paper deformation model×scanner deformation model can be chosen for the correction function.

In general, it is possible to use a polynomial expression, $Y = \Sigma a_i \times X\hat{\ }i$ (i=0, . . . , n), where the "^" symbol represents a power calculation.

<Problems when using a High-Order Polynomial Expression>

Figure 41:
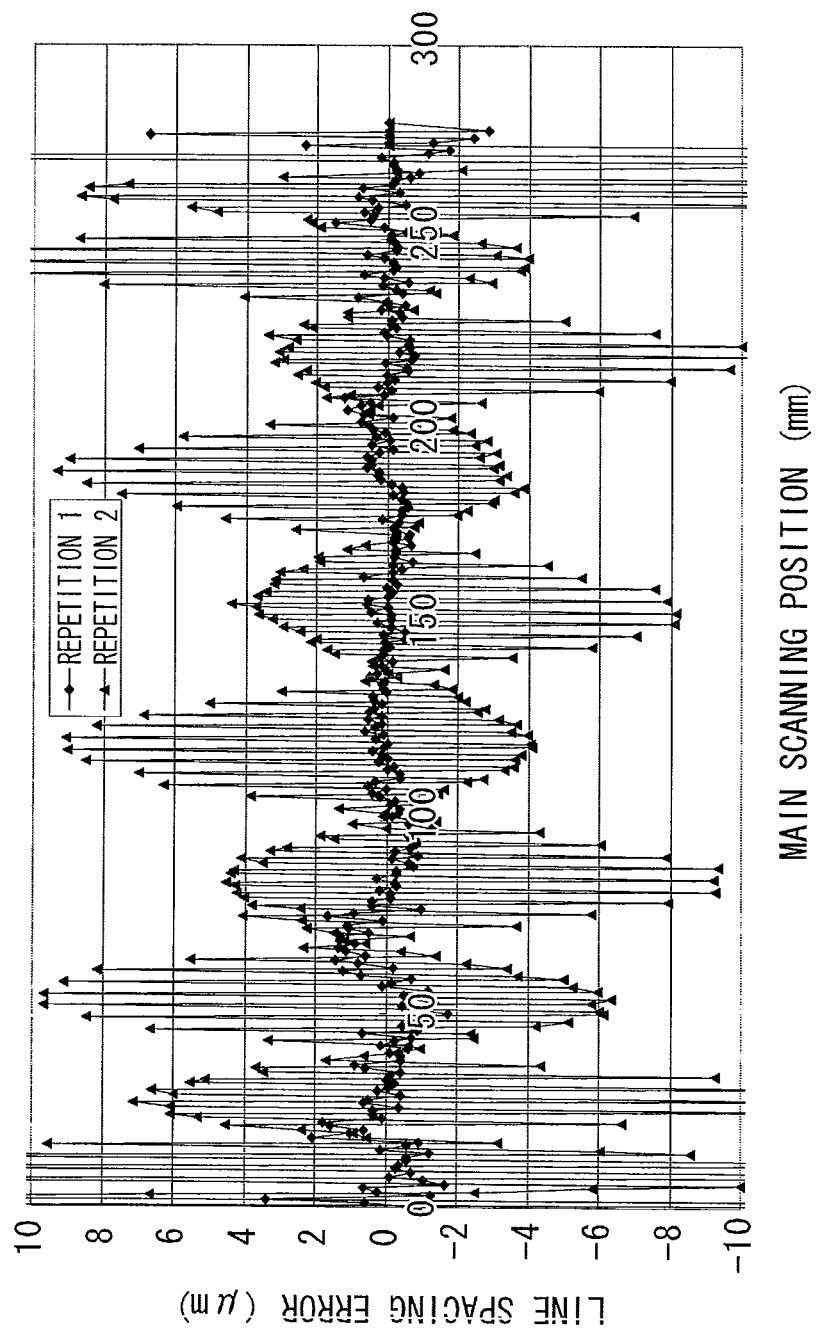
FIG. 41 is a graph showing the results of correction between line blocks using a high-order polynomial expression.

FIG. 41 shows the results of correction processing when repeatedly measuring the same test pattern using a high-order polynomial function for positional correction (a correction function) between the line blocks. The horizontal axis indicates the main scanning direction position and the vertical axis indicates the line spacing error.

As shown in FIG. 41, a phenomenon occurs whereby even when the same test pattern is measured, the measurement values are not stable. In "repetition 1" in FIG. 41, it is possible to measure the test pattern with good accuracy, but in "repetition 2", the measurement value shows periodic positive or negative error. This phenomenon is an oscillatory effect which is characteristic of choosing a high-order polynomial expression.

Figure 54:
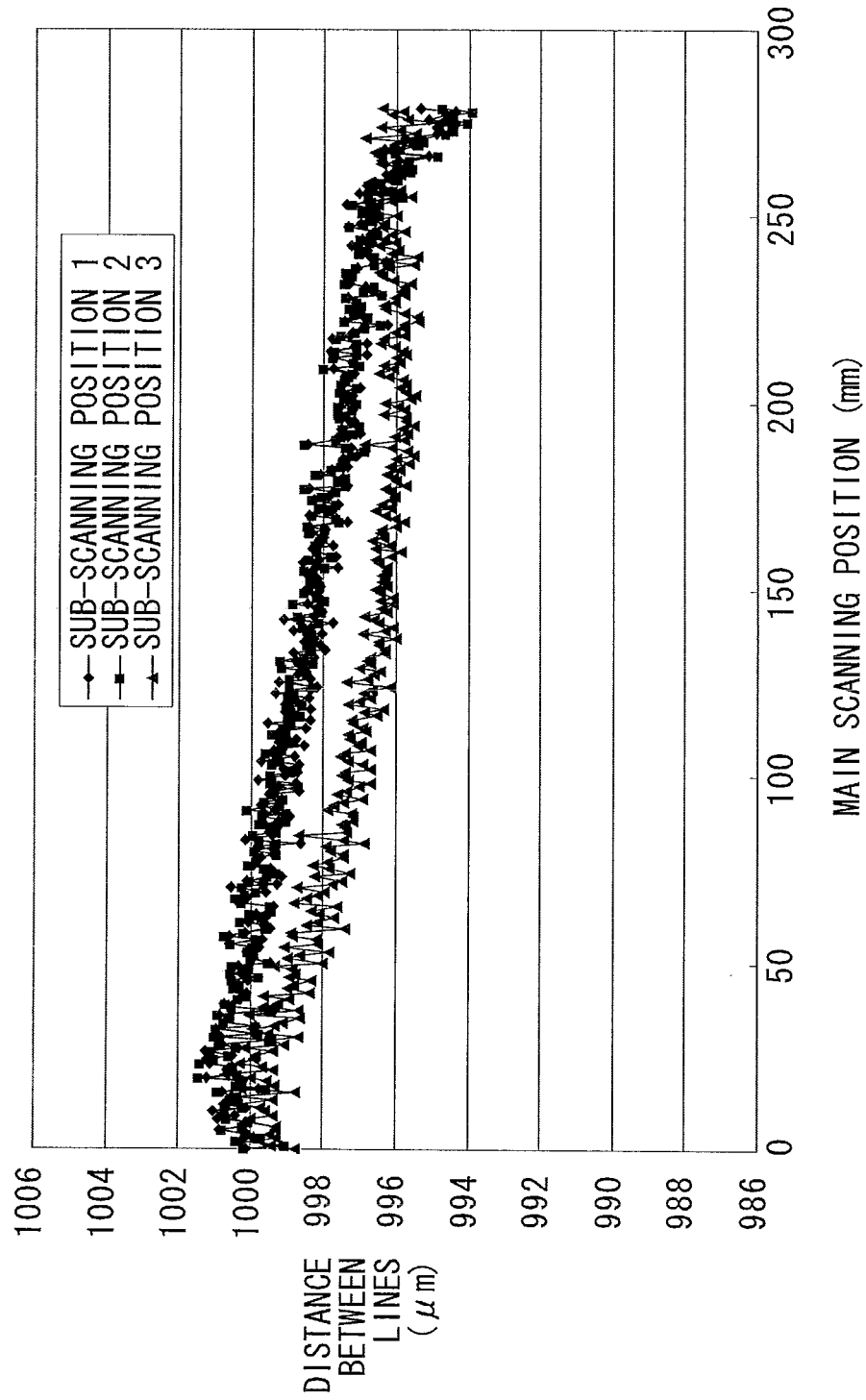
FIG. 54 is a graph showing distortion in the main scanning direction, when an evenly spaced scale is read in, in the related art.
Figure 55:
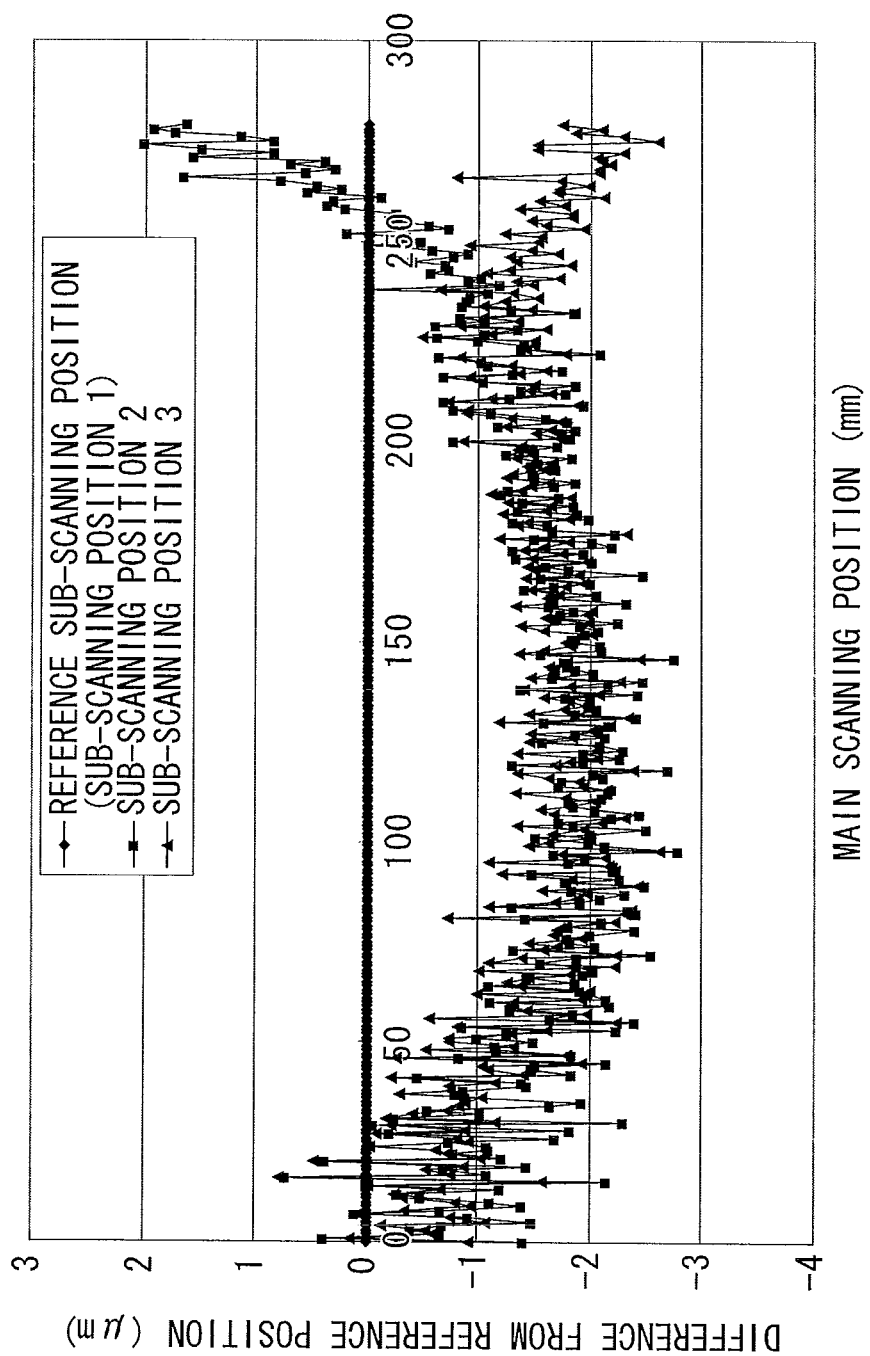
FIG. 55 is a graph showing distortion in the main scanning direction which differs with the sub-scanning position in the related art.

It is surmised that an oscillatory effect of this kind has a high possibility of occurring when the difference in the main scanning direction positional distortion characteristics between respective sub-scanning positions contains a slight periodic component, as in FIG. 54.

Desirably, instead of using a high-order polynomial function in respect of scanner characteristics of this kind, a low-order polynomial function is selected in a piecewise fashion as the correction function.

<Description of Correction Function Based on Piecewise Polynomial Expression>

Figure 42:
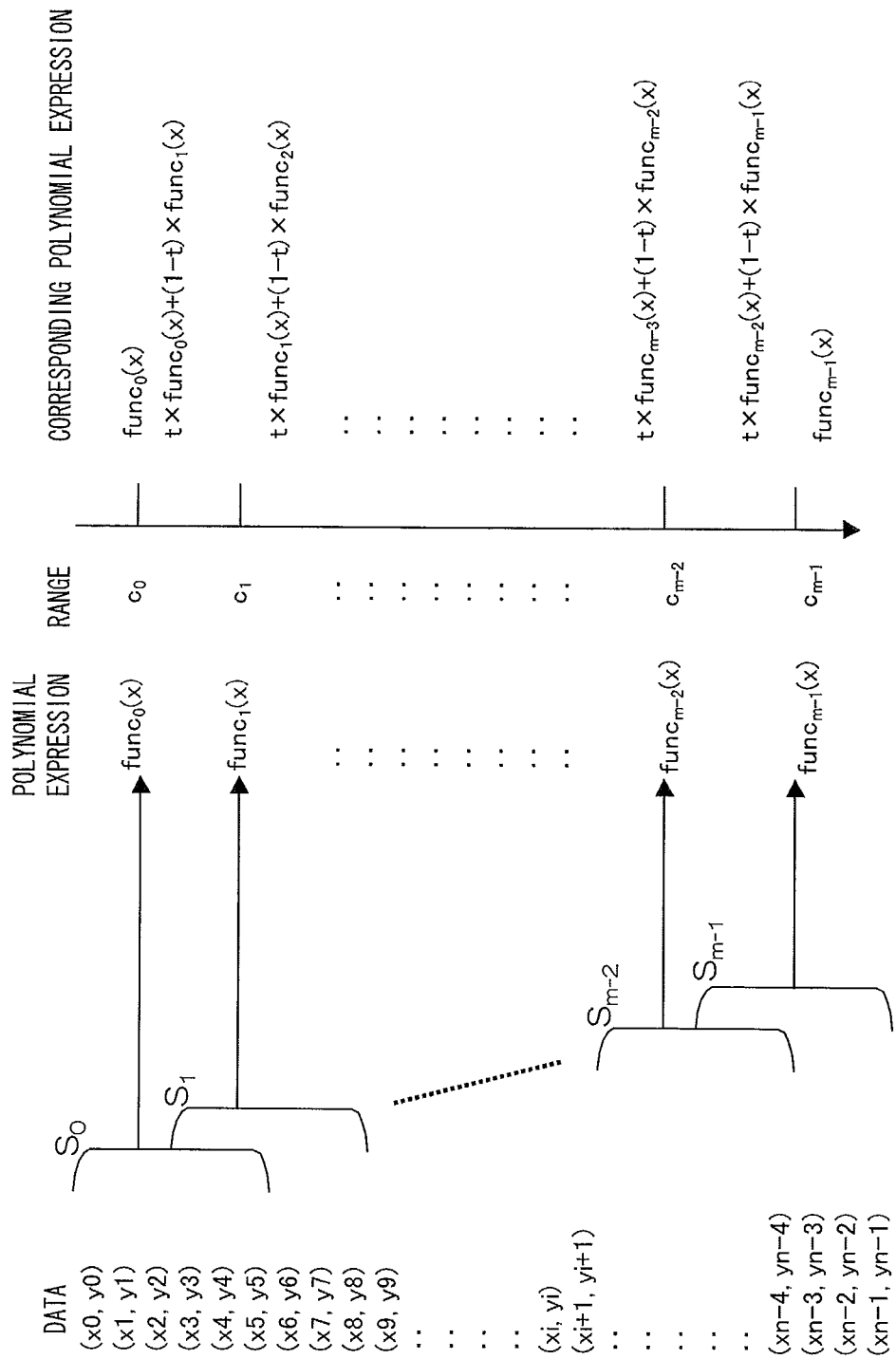
FIG. 42 is an illustrative diagram of a correction function based on a piecewise polynomial expression.

FIG. 42 is an explanatory diagram of correction functions based on a piecewise polynomial expression.

In the data sequence $(x_i, y_i)$ shown on the left-hand side of FIG. 42 (where i=0, 1, 2, . . . , n−1), a data group of a prescribed range (piece) is treated as one group (in this example, six consecutive data groups are taken as one piece unit), and a polynomial expression $func_j(x)$ (where j=0, 1, 2, . . . , m−1) is associated respectively with the data sets $S_0$, $S_1$, . . . , $S_m-1$ of each piece (n and m are natural numbers).

The data sets $S_0$, $S_1$, . . . , $S_m-1$ of the respective pieces are made to overlap with each other partially, between adjacent pieces. The center values $C_0$, $C_1$, . . . , $C_m-2$ of the data sets of each piece $S_0$, $S_1$, . . . , $S_m-1$ are determined, and corresponding polynomial expressions are defined for respective piece ranges set to have boundaries at these values $C_0$, $C_1$, . . . , $C_m-2$. The corresponding polynomial expression for any particular piece range is a weighted average, using ratio t, of the two polynomial expressions $func_j(x)$ and $func_{j+1}(x)$ which relate to that range.

A specific example of application to the measurement data of the test pattern shown in FIG. 9 is given below.

The position data of each line belonging to any one line block is data which is virtually equally spaced in the X coordinate direction. In the case of virtually equally spaced data of this kind, a prescribed number (for example, 6) consecutive data elements taken from the end of the data sequence are extracted as the first data set $S_0$.

The position data (X coordinates) of the lines recorded by the same nozzles (common nozzles) in the line block 0 and the line block 4 are extracted as described below:

$X_0 = \{lb_0\_x_0, lb_0\_x_{20}, lb_0\_x_{40}, lb_0\_x_{60}, lb_0\_x_{80}, lb_0\_x_{100}\}$; and $Y_0 = \{lb_4\_x_0, lb_4\_x_{20}, lb_4\_x_{40}, lb_4\_x_{60}, lb_4\_x_{80}, lb_4\_x_{100}\}$.

The elements in the set $X_0$ belong to the line block 0, and are data for the positions corresponding to the nozzle numbers 0, 20, 40, 60, 80 and 100.

The elements in the set $Y_0$ belong to the line block 4, and are data for the positions corresponding to the common nozzle numbers 0, 20, 40, 60, 80 and 100. The elements in set $X_0$ form the input values of the correction function, and the elements in set $Y_0$ form the output values of the correction function. In other words, correction is applied in such a manner that the set $X_0$ coincides with the set $Y_0$.

The next data set $S_1$, which is partially overlapped with this data set $S_0$, is as follows:

$X_1 = \{lb_0\_x_{60}, lb_0\_x_{80}, lb_0\_x_{120}, lb_0\_x_{140}, lb_0\_x_{160}, lb_0\_x_{180}\}$; and $Y_1 = \{lb_4\_x_{60}, lb_4\_x_{80}, lb_4\_x_{120}, lb_4\_x_{140}, lb_4\_x_{160}, lb_4\_x_{180}\}$; and Thereafter, data sets $S_2$, $S_3$ and so on are extracted similarly, in a partially overlapping fashion.

In other words, the whole of the data sequence that is to be corrected is progressively divided into partial sets $S_0$, $S_1$, $S_2$, . . . of a prescribed range (here, each partial set has 6 data elements, but this number can be set as desired).

Thereupon, the corresponding approximate polynomials $func_0(x)$, $func_1(x)$, $func_2(x)$, . . . are determined by a least-squares method, respectively for the data sets $S_0$, $S_1$, $S_2$, and so on.

Moreover, for each partial set, a roughly central position (center value) is determined. In other words, the center value $C_0$ of the data set $S_0$ is specified. $C_0$ is taken as the average value of $X_0$. The center value $C_1$ of the data set $S_1$ is similarly determined. $C_1$ is taken as the average value of $X_1$. Thereafter, similarly, the center value $C_i$ (where $C_i$ is the average value of $X_i$) is specified respectively for all of the data groups $S_i$.

When determining the approximate polynomial expressions corresponding to the data sets $S_0$, $S_1$, $S_2$, . . . , by the least squares method, the weighting of the least squares calculation can be determined in accordance with the distance $r_{ij}$ from the central value $C_i$ corresponding to the data set $S_i$.

For example, the distance $r_{ij}$ from $C_i$ of the element $x_j$ of data set $S_i$ is defined as:

$$r_{ij} = |x_j - C_i|, x_j \in S_i.$$

Taking the maximum value of $r_{ij}$ as $r_{maxj}$, the weighting $W_j$ is defined using the ratio $(r_{ij}/q_j)$ of $r_{ij}$ to $q_j$ ($q_j = r_{maxj} \times 2$) as follows:

$$w_j = (1 - (r_{ij}/q_j))/(1 + (r_{ij}/q_j)).$$

It is possible to determine approximate functions corresponding to the respective data sets $S_0$, $S_1$, $S_2$, . . . by means of a least squares method incorporating this weighting $W_j$.

The approximate function corresponding to the data set $S_0$ is $func_0(x)$, the approximate function corresponding to the data set $S_1$ is $func_1(x)$ and similarly thereafter, the approximate function corresponding to $S_i$ is $func_i(x)$.

The measurement positions (X coordinates) of the line block 0 $\{lb_0\_x_0, lb_0\_x_4, lb_0\_x_8, . . .\}$ are converted using the thus determined group of correction functions $f_0(x) = \{func_0(x), func_1(x), func_2(x), . . .\}$.

Next, a conversion sequence (correction processing) using piecewise polynomial expressions will be described.

The input value is taken to be $x_k$. Firstly, the input value is classified to one of the following cases, depending on the relative magnitude of $x_k$ and the values of $c_0, c_1, C_2, . . . $.

[1] If $x_k \leq c_0$

[2] If $c_l < x_k < c_l+1$ (where 1 is any integer from 0 to m−1)

[3] If $c_{m-1} \leq x_k$

A case where the terms in [1] or [3] are equal can also be included in case [2].

In the case of [1], the conversion result $y_k$ is found from $y_k = \text{func}_0(x_k)$ by inputting $x_k$ into the corresponding approximate polynomial expression $\text{func}_0(x)$.

In the case of [2], the conversion result $y_k$ is derived as follows by using the approximate polynomial expressions $\text{func}_l(x)$ and $\text{func}_{l+1}(x)$ corresponding respectively to $c_l$ and $c_{l+i}$, and the ratio t which is determined from the relative positions of $c_l$, $c_{l+1}$ and $x_k$:

$$t = (c_{l+1} - x_k)/(c_{l+i} - cl)$$

$$y_k = t \times \text{func}_l(x_k) + (1-t) \times \text{func}_{l+1}(x_k)$$

By combining the two polynomial expressions in a suitable ratio in respect of the overlapping region, it is possible to achieve smooth progression between the piecewise functions.

In the case of [3], the conversion result $y_k$ is found from $y_k = \text{func}_{m-1}(x_k)$ by inputting xk to the corresponding approximate polynomial expression $\text{func}_{m-1}(x)$.

In this way, the measurement positions (X coordinates) of the line block 0 {$lb_0\_x_0$, $lb_0\_x_4$, $lb_0\_x_8$, and so on} are converted.

A correction function $f_1(x)$ is determined in a similar manner for the line block 1 and the line block 4 shown in FIG. 9, and the correction function $f_1(x)$ thus determined is used to convert the measurement positions (X coordinates) of the line block 1 {$lb_1\_x_1$, $lb_1\_x_5$, $lb_1\_x_9$, ... }.

Correction functions $f_2(x)$ and $f_3(x)$ are determined similarly in respect of the line blocks 2 and 3, and the correction functions $f_2(x)$ and $f_3(x)$ thus determined are used respectively to convert the measurement positions (X coordinates) of the line blocks 2 and 3.

In this way, since the positions of the respective line blocks are corrected with reference to the position of the same reference line block, then it is possible to reduce positional error between the line blocks. Furthermore, even if the amount of deformation of the paper is different in the line block 3 compared to the line block 0, it is still possible to reduce measurement error due to deformation of the paper since correction is made with respect to the reference line block.

In particular, since good approximation is possible even if the number of orders of the piecewise polynomial expression described above is restricted to 3 to 5, then it is possible to prevent the occurrence of an oscillatory effect which is a concern when using a high-order polynomial expression as shown in FIG. 41.

For example, if it is sought to achieve an approximation for a page-wide (full-wide) head having A3 width and 1200 DPI, by using a single high-order polynomial expression, then the number of orders becomes 18 to 20 and an oscillatory effect is liable to occur, but according to the present embodiment, since a low-order polynomial expression of 2 to 5 orders is used, then the oscillatory effect is suppressed and correction which matches the distortion (deformation) can be achieved.

In the present embodiment in FIG. 42, three data elements are overlapped between the adjacent pieces, but there is no particular restriction on the amount of overlap. The greater the amount of data that is overlapped, the smoother the correction functions, whereas if the amount of data overlapped is reduced, then the correction functions obtained reflect the effects of the individual polynomial expressions corresponding to the respective pieces more strongly.

When the processing for line block position correction (FIG. 40) has ended and the procedure has returned to the overall sequence in FIG. 13, the procedure than advances to step S112 in FIG. 13 and processing for correcting fixed distortion of the reference line block is carried out.

This processing corrects the positions (X coordinates) converted by the correction functions (piecewise polynomial expressions) described above, using a fixed positional correction table corresponding to the reference line block (this table is referred to as the "fixed positional distortion correction table").

<Correction of Fixed Distortion of Reference Line Block>

Next, the details of processing for correcting fixed distortion of the reference line block indicated in step S112 of FIG. 13 will be described.

Before carrying out correction of the fixed distortion of the reference line block, it is necessary to first create a fixed positional distortion correction table. More specifically, the positional distortion in the main scanning direction of the positions corresponding to the reference line block is measured in advance by reading in a test pattern with the scanner used for measurement, and this information is stored in the form of a fixed positional distortion correction table.

The fixed positional distortion correction table is acquired as described below.

A one-dimensional scale of equally spaced lines is prepared, and this one-dimensional scale is placed at a position (in the sub-scanning direction) corresponding to the reference line block on the test pattern, and the one-dimensional scale is read in with the scanner used for correction. Thereupon, the respective positions read in from the one-dimensional scale are determined on the basis of the scanner coordinates, and taking these results as input values and taking the actual values of the equally spaced lines as output values, the relationship between the input and output values can be determined by applying noise removal processing.

For example, it is possible to determine an approximate polynomial expression from the input-output value relationship and to set this approximate polynomial expression as a fixed positional distortion correction table.

Figure 43:
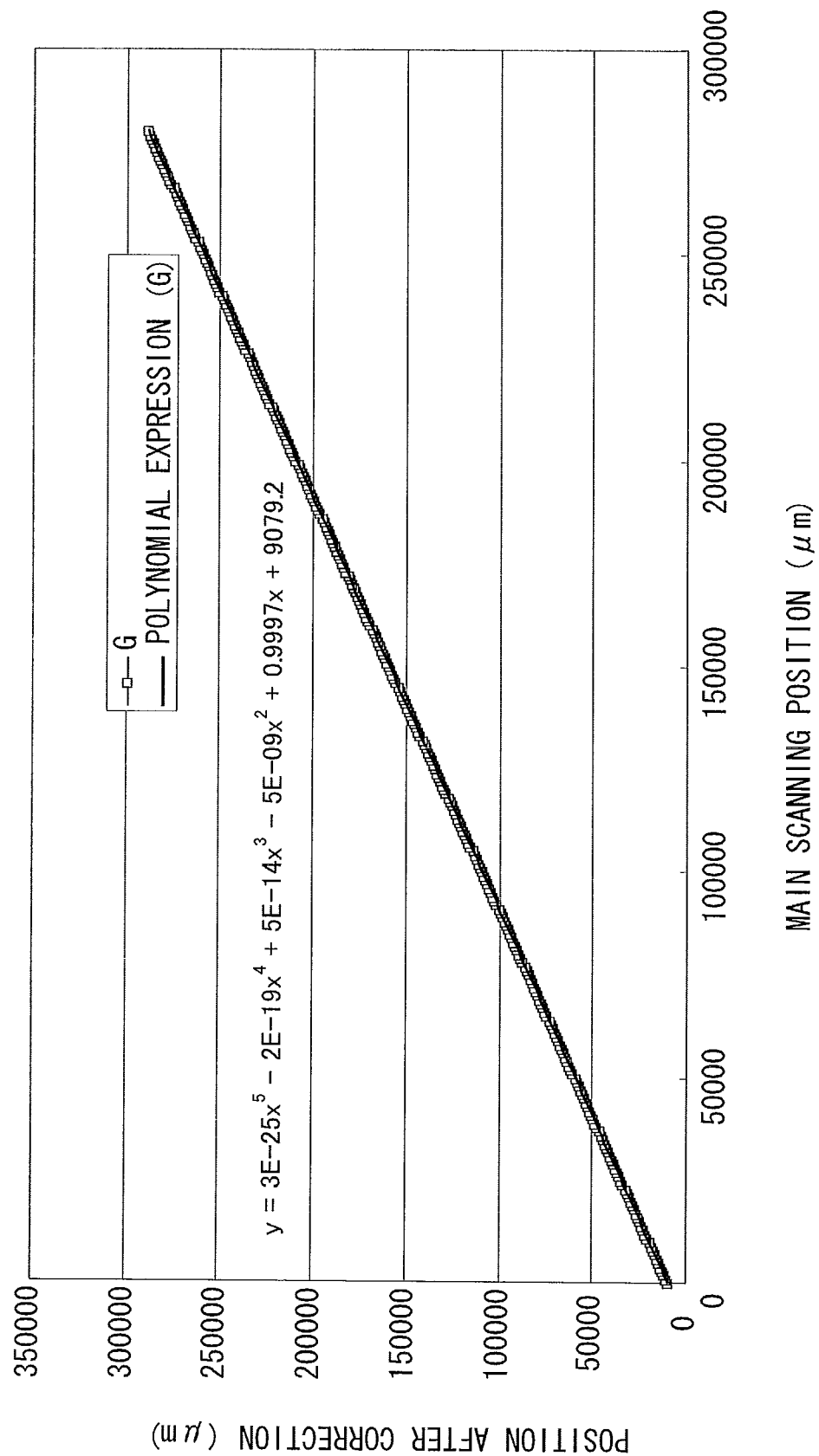
FIG. 43 is a diagram showing an example of a fixed positional distortion table (G channel)
Figure 44:
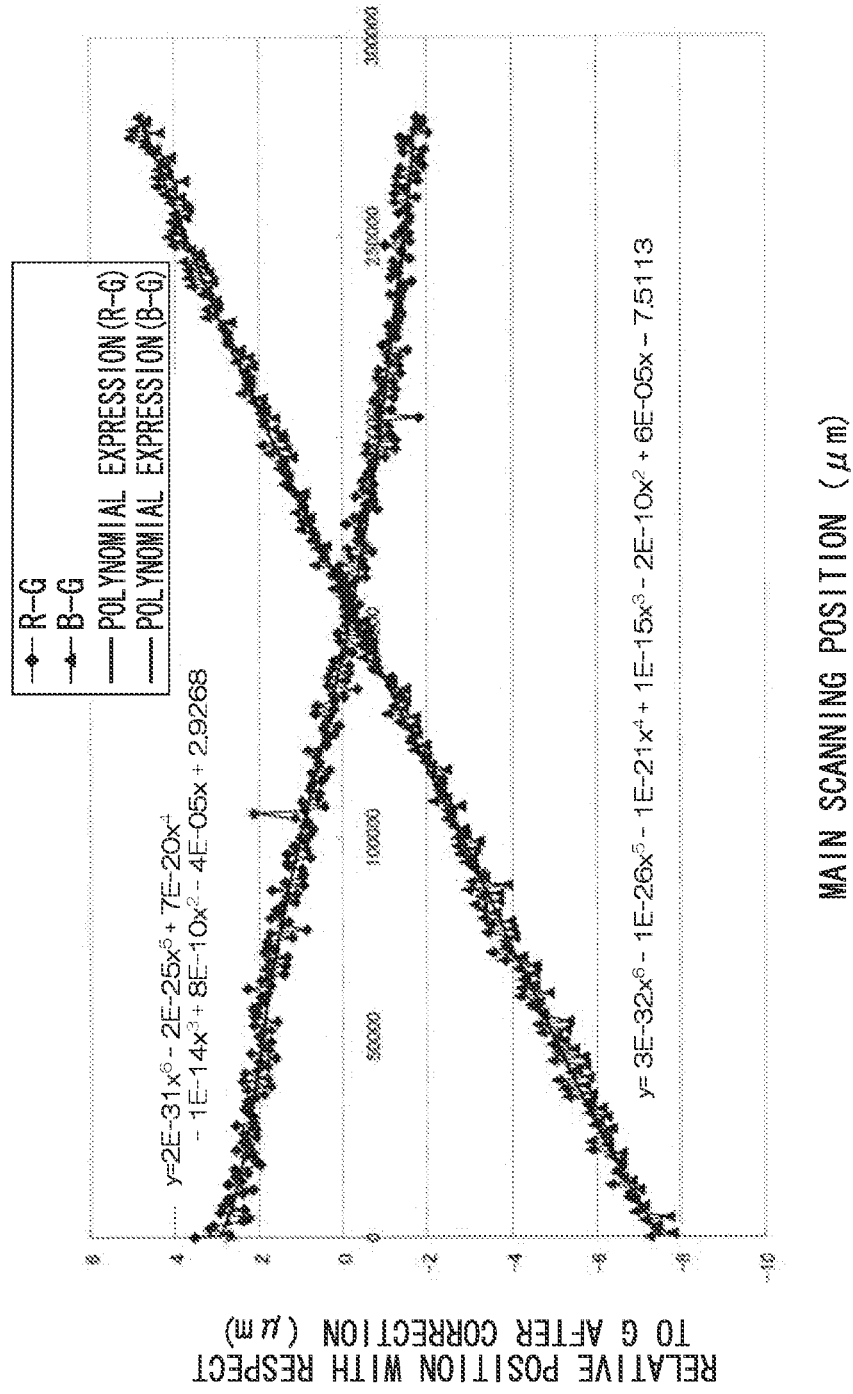
FIG. 44 is a diagram showing an example of a fixed positional distortion table (R and B channels)

FIGS. 43 and 44 are graphs for describing the fixed positional distortion correction tables for respective RGB channels of a color scanner. FIG. 43 shows an approximation of the input values and output values of the G channel of a color scanner, using a 6th-order polynomial expression, when the lines of the one-dimensional scale are formed by a coloring material having virtually uniform spectral reflectivity. Furthermore, FIG. 44 shows a fixed positional distortion correction table in which the respective differentials between the position data of the G channel and the R channel and that of the B channel are determined, and these differential values are approximated by a polynomial expression.

For the positions read in the G channel, the fixed positional distortion correction table for the G channel (FIG. 43) is used directly. On the other hand, for the positions read in the R channel, a table which sums together the fixed positional distortion correction table (FIG. 43) for the G channel and a fixed positional distortion correction table for the differential (R−G) (FIG. 44) is used. For the positions read in the B channel, a table which sums together the fixed positional distortion correction table (FIG. 43) for the G channel and the fixed positional distortion correction table for the differential (B−G) (FIG. 44) is used. In FIGS. 43 and 44, the term "E-α" in the polynomial expression means the (−α)th power of ten.

The fixed positional distortion tables such as that shown in FIGS. 43 and 44 are stored in advance in a storage device, such as a memory, and the table is read out in order to perform correction when carrying out the reference line block fixed distortion correction processing (step S112 in FIG. 13).

Figure 45:
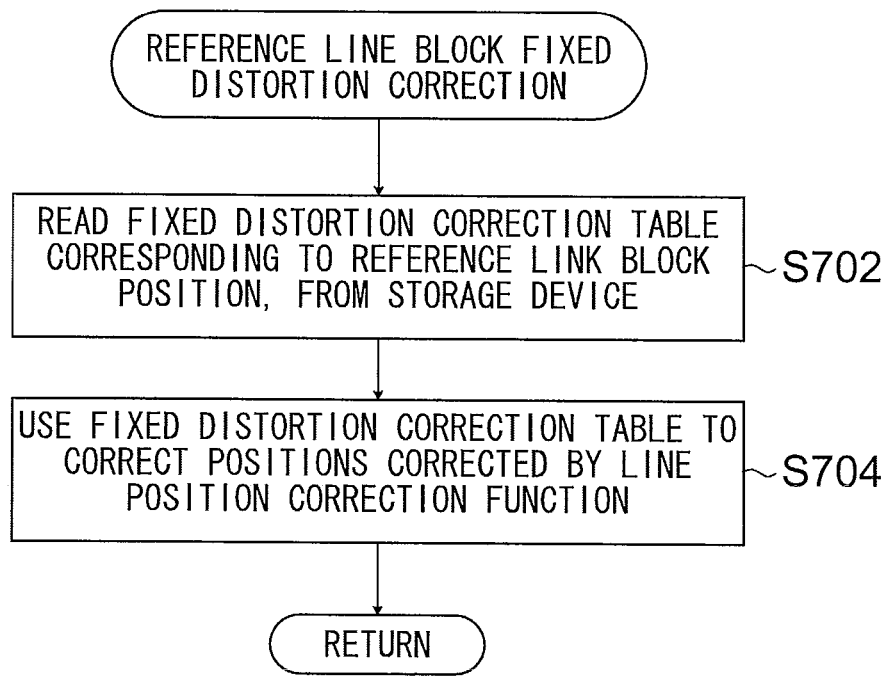
FIG. 45 is a flowchart of reference line block fixed distortion correction processing.

FIG. 45 is a flowchart of the reference line block fixed distortion correction processing. When the reference line block fixed distortion correction flow in FIG. 45 is started, firstly, the fixed distortion correction table corresponding to the reference line block position is read out from the storage device (step S702).

Thereupon, the positions which have been corrected by the line block position correction processing (step S110 in FIG. 13; FIG. 40) are further corrected by using the fixed distortion correction table that has been thus read out (step S704 in FIG. 45). The dot positions thus determined are X coordinates after correction using the fixed position correction table corresponding to the reference line block.

When the processing in step S704 in FIG. 45 has been completed, the procedure exits the sub-routine in FIG. 45, and returns to the general sequence in FIG. 13 and proceeds to step S114 in FIG. 13.

<Consolidation of Line Blocks>

Next, the processing for consolidating the positions corrected by the line position correction functions of the respective line blocks shown in step S114 in FIG. 13 will be described.

In this consolidation processing, the X coordinates of the positions of the respective line blocks, which have been corrected by the fixed positional distortion correction table, are arranged into the nozzle number order. The result of this arrangement into the nozzle number order is the dot deposition positions of the respective nozzles.

According to the dot position measurement method of the present embodiment, it is possible to measure positions with high precision, by correcting the positional distortion in the scanner main scanning direction at the sub-scanning position where the reference line block is read, by means of the fixed main scanning direction positional distortion correction table which has been determined previously. A one-dimensional scale, which is used with the object of creating the fixed correction parameter for correcting one-dimensional positional distortion of this kind, is relatively easy to acquire and is inexpensive compared to a two-dimensional scale.

Other Flows of Dot Position Measurement

Instead of the method in which the fixed positional distortion table using the one-dimensional scale as described above is acquired in advance, presuming that the positional errors of the recording nozzles are distributed as a probability distribution in normal distribution, then it is also possible to specify a positional distortion correcting function for the main scanning direction on the basis of the position measurement values and to correct the position measurement values by means of the positional distortion correcting function thus determined.

Figure 46:
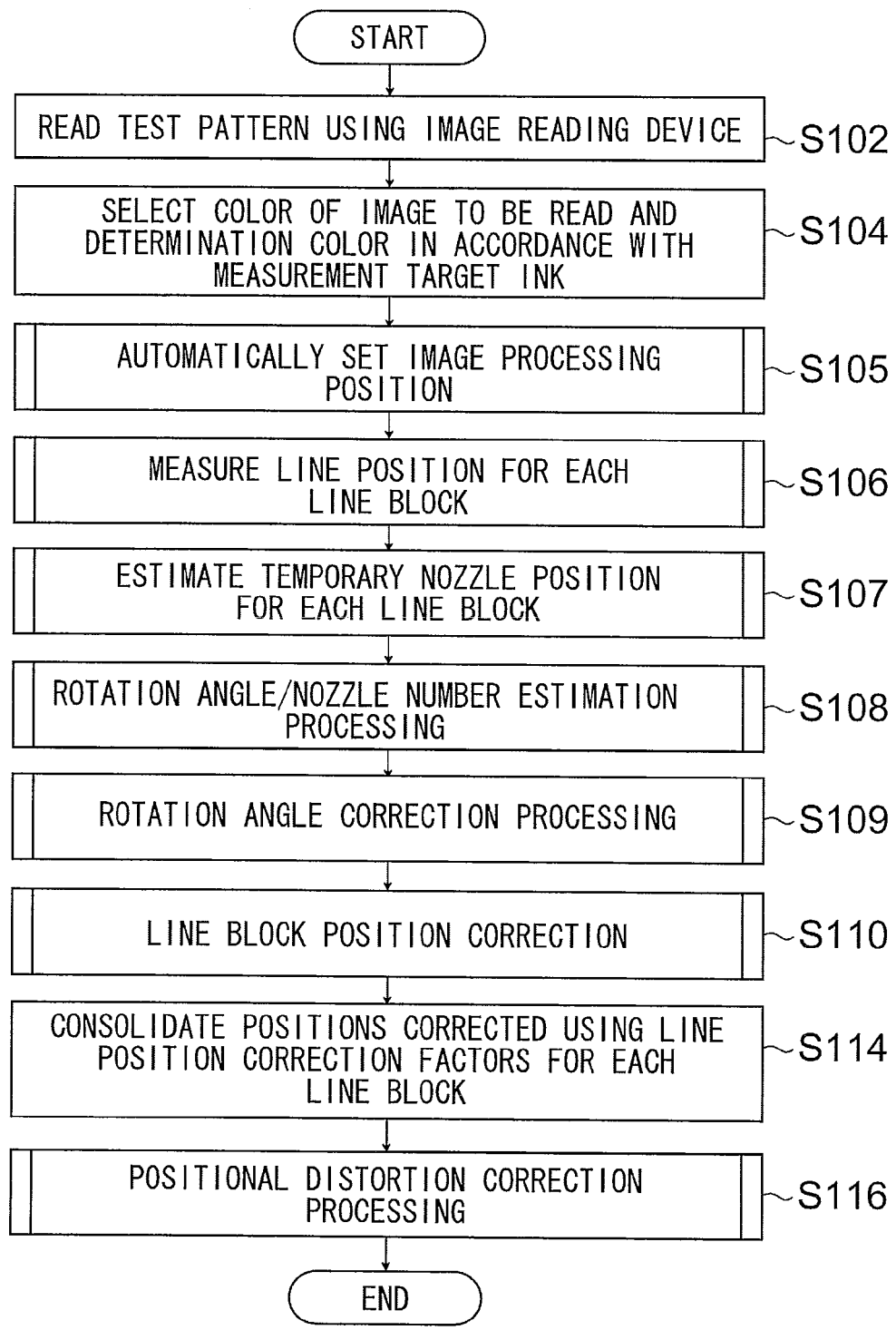
FIG. 46 is a flowchart showing the sequence of dot position measurement relating to a further embodiment.

FIG. 46 is a flowchart showing the sequence of dot position measurement according to a further embodiment of the present invention. In FIG. 46, steps which are the same as or similar to the flowchart shown in FIG. 13 are denoted with the same step numbers and description thereof is omitted here.

The measurement flow shown in FIG. 46 is a method which does not use the "fixed positional distortion correction data" described in FIG. 13. As shown in FIG. 46, the position correction processing between the line blocks is carried out for the respective line blocks (step S110), and the procedure then advances to step S114. At step S114, consolidation processing is carried out to arrange the X coordinates of the positions of the line blocks, which have been corrected by piecewise polynomial expressions in step S110, into the nozzle number order.

Thereupon, the procedure transfers to positional distortion correction processing in step S116. This positional distortion correction processing calculates correction data instead of the "fixed positional distortion correction data" shown in FIG. 13, from the consolidated positional data described above, and calculates the optical distortion of the scanner, and the like. The details of this processing are described below.

Figure 47:
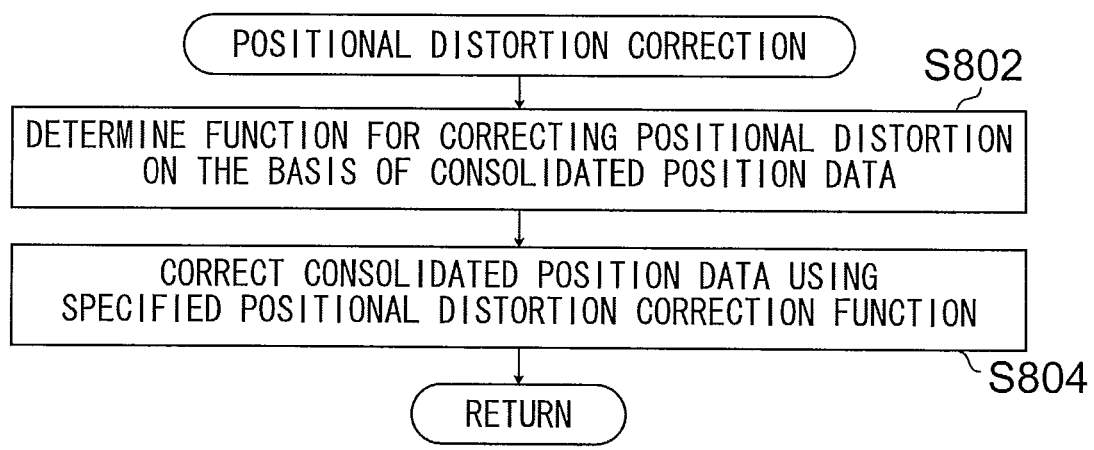
FIG. 47 is a flowchart of positional distortion correction processing.
Figure 48:
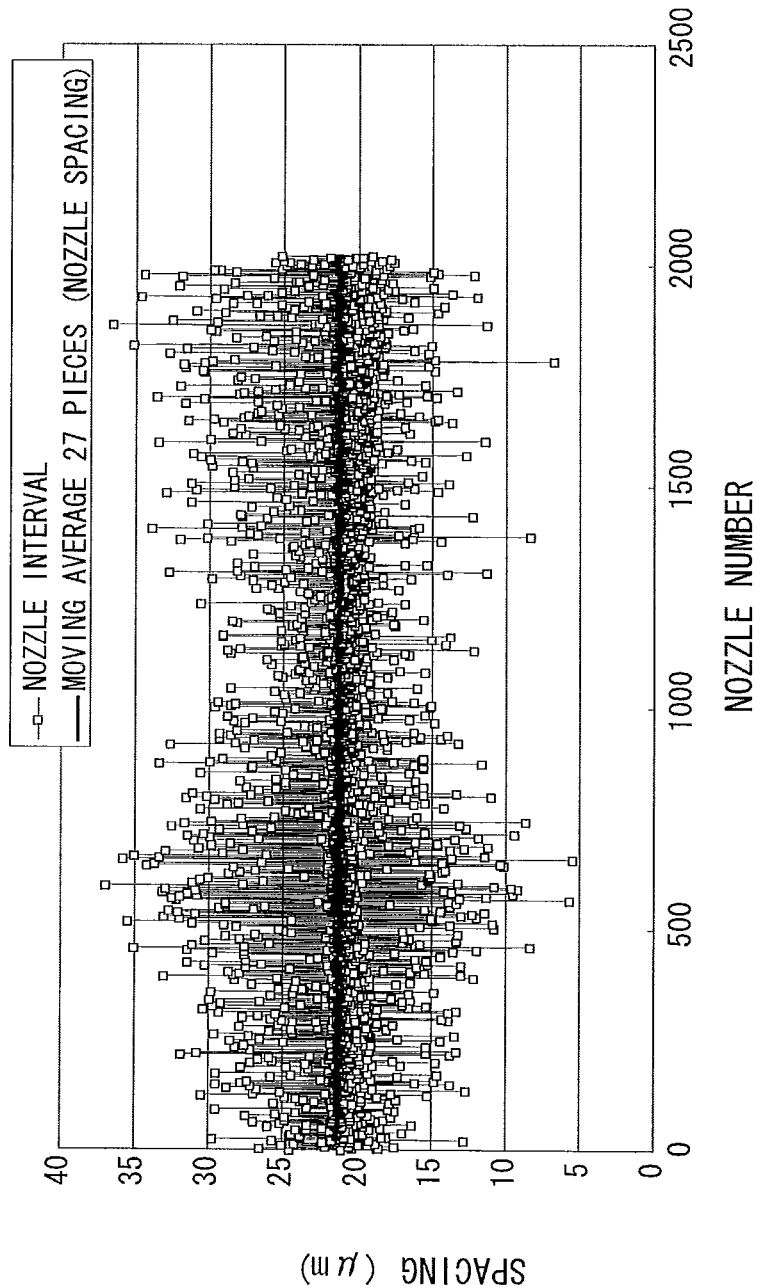
FIG. 48 is a graph showing a spacing value data sequence calculated from a position data sequence, and the moving average of same.

FIG. 47 is a flowchart of positional distortion correction processing. When the positional distortion correction sequence in FIG. 47 is started, firstly, a function for correcting the positional distortion is specified on the basis of the positional data which has been consolidated at step S114 in FIG. 46 (step S802). The consolidated positional data is then corrected using the positional distortion correcting function thus specified (step S804).

When the processing in step S804 in FIG. 47 has been completed, the procedure exits the sub-routine in FIG. 47 and returns to the general sequence in FIG. 46 and the process ends.

Here, a specific example of the calculation method used in steps S802 and S804 will be described.

<First Example of Positional Distortion Correction Processing>

Firstly, the consolidated positional data sequence obtained at step S114, $R_1 = \{xx_0, xx_1, xx_2, xx_3, \ldots, xx_{m-1}\}$ is converted to a data sequence $R_2$ of spacing values. In other words, the difference between each two adjacent data elements, $xx_{i+1}$ and $xx_i$ is calculated as a spacing value $ss_i$, to yield a data set $R_2$. FIG. 34 shows an example of the data set $R_2$ of spacing values (nozzle intervals):

$$R_2 = \{ss_0, ss_1, ss_2, \ldots, ss_{m-2}\}, ss_i = xx_{i+1} - xx_i.$$

A data set $LR_2$ is then created by removing the high-frequency component from the data sequence $R_2$ of spacing values $ss_i$ thus obtained, by means of a moving average or low-pass filtering process. FIG. 34 shows the combined results of a moving average for 27 data pieces.

For example, if the moving average of the "2×nn+1" points is found (where "nn" is a natural number), then the data set $LR_2$ is expressed as follows:

$$LR_2 = \{lss_0, lss_1, lss_2, \ldots, lss_{m-2}\}; \text{ and}$$

$$lss_i = \Sigma(s_{i+k})/(2 \times nn+1), k=-nn, \ldots, nn.$$

Alternatively, if a low-pass filtering process is adopted, then the data set $LR_2$ is expressed as follows:

$$LR_2 = \{lss_0, lss_1, lss_2, \ldots, lss_{m-2}\}; \text{ and}$$

$$lss_i = \Sigma lpf_k \times s_{i+k}, k=-nn, \ldots, nn,$$

where $lpf_k$ is the coefficient of the low-pass filter.

Thus, since the data set $LR_2$ from which high-frequency components have been removed is a data set of spacing values, then in order to convert this to a positional data set, the data set $R2X$ of the successive cumulative sums of $LR_2$ is calculated.

$$R2X = \{r2x_0, r2x_1, r2x_3, \ldots r2x_{m-1}\}; \text{ and}$$

$$r2x_i = \Sigma(lss_k), k=0, \ldots, i-1,$$

where $r2x_0 = 0$.

The calculation for determining the set R2X corresponds to the reverse calculation of the step for converting the consolidated position data sequence $R_1$ to the data sequence of spacing values $R_2$. The data sequence R2X determined in this way indicates the distortion characteristics in the main scanning direction of the scanner.

On the other hand, the data sequence R2Y of ideal positions (data sequence of nozzle number×ideal nozzle spacing) is determined on the basis of the nozzle spacing.

If the nozzle pitch (dot deposition positions) is ideally a uniform pitch, then the nozzle pitch is taken to be LL. In this case, the data sequence of ideal positions R2Y is calculated as follows:

$$R2Y=\{r2y_0, r2y_1, r2y_2, \ldots, r2y_{m-1}\}; \text{ and}$$

$$r2y_i = LL \times i, \text{ where } i=0, 1, 2, \ldots, m-1.$$

The original consolidated position data sequence $R_1$ is corrected by using a correction function which has the data sequence R2X as an input data sequence and the data set R2Y as an output data sequence.

For the correction function, it is possible to use linear interpolation, cubic interpolation, spline interpolation, or the like.

<Second Example of Positional Distortion Correction Processing>

Furthermore, as a further method, it is also possible to employ a method such as the following.

If it is supposed that the deposition position errors of the nozzles are distributed as a probability distribution in normal distribution with respect to the ideal positions, then it is possible to determine the correction function (polynomial expression) corresponding to the positional distortion in the main scanning direction of the scanner, for the consolidated position data sequence $R_1$ obtained at step S114 in FIG. 46, as an approximation by a least-squares method.

More specifically, a function is determined by taking the ideal nozzle positions as the input values X and the data sequence $R_1$ as the output values Y.

The data sequence of the ideal nozzle positions (input values X) is as follows:

$$X=\{xx_0, xx_1, xx_2, \ldots, xx_{m-1}\}; \text{ and}$$

$$xx_i = LL \times i, \text{ where } i=0, 1, 2, \ldots, m-1.$$

Figure 49:
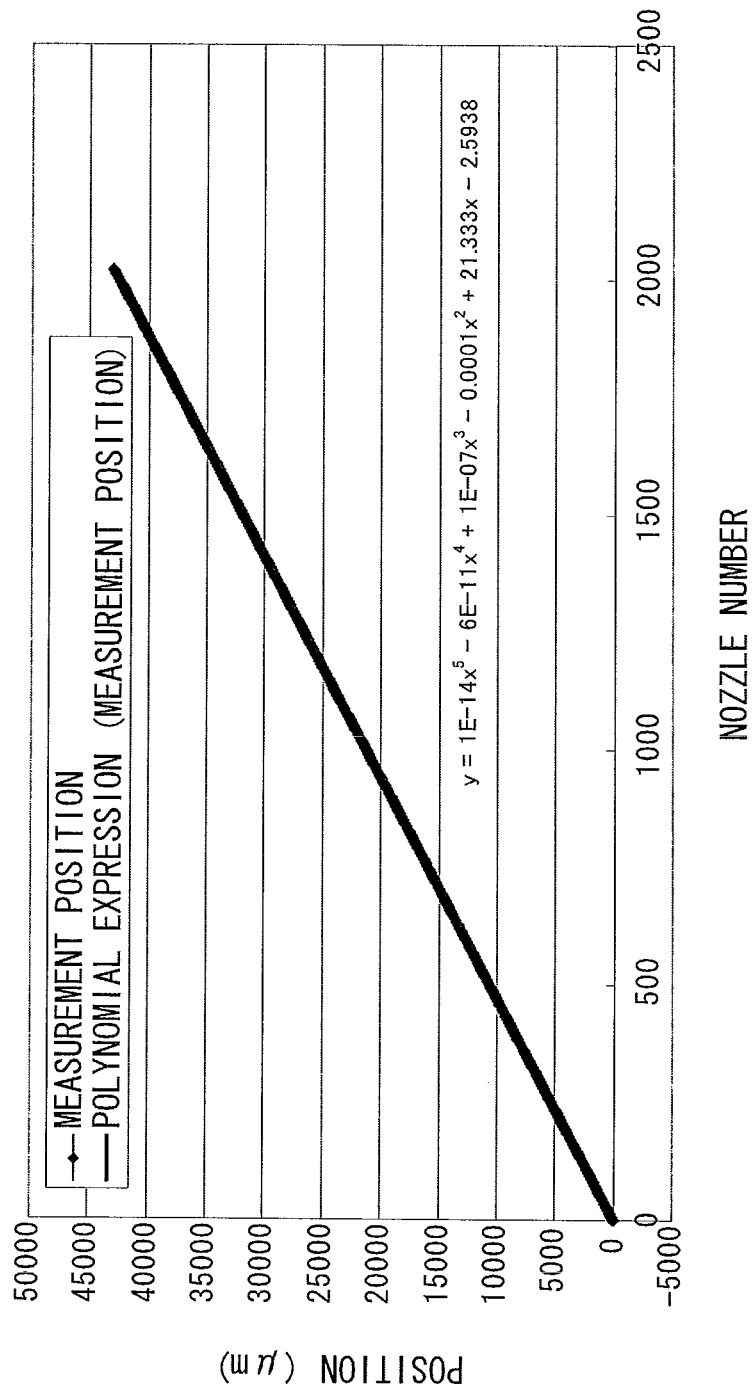
FIG. 49 is a graph showing an example of measurement position data and an approximate polynomial expression.

An approximate polynomial expression func(x) is determined by a commonly known method for the consolidated position data sequence $R_1=\{yy_0, yy_1, yy_2, yy_3, \ldots, yy_{m-1}\}$. FIG. 49 shows an example of measurement position data and an approximate polynomial expression.

In this approximate polynomial expression, similarly to FIG. 42, it is also possible to employ a piecewise polynomial expression.

Thereupon, the differences between the position data sequence $R_1$ and the corresponding approximation are determined, and corrected positions are given by adding the differences thus determined to the ideal nozzle positions:

$$\text{Corrected position} = yy_i - \text{func}(xx_i) + xx_i.$$

The method relating to this second example can also be applied even if the nozzle spacing is not uniform. In this case, $xx_i$ should be substituted with a data sequence of the ideal nozzle positions.

<Determination of Dot Positions>

The X coordinate of the thus corrected line position is a dot position that corresponds to the nozzle number. Information on the scatter of the deposition positions of dots from the respective nozzles can thus be obtained and used in computation to correct image unevenness and so on.

<Measures for further Improving Measurement Accuracy>

In the line block 4, which forms the reference line block, it is desirable to increase the overlap of the ROIs, increase the line length and broaden the averaged range, with the object of improving accuracy in particular. Furthermore, a beneficial effect in reducing the effects of locality in the scanner is obtained if a plurality of line blocks 4 (reference line blocks) are provided in the measurement chart and the positions obtained by statistical processing of a plurality of measurement results are used as the positions of the reference line blocks.

Operating Effects of the Embodiments

According to the present embodiments, the relationship (approximate function expressing the characteristics) between the line position and the temporary nozzle number of each line block is obtained from the read image of the test pattern, the consistency between the temporary nozzle numbers of the line blocks is determined based on this relationship, and errors of the temporary nozzle numbers are corrected. Therefore, the relationship between the nozzle number and the line position can be specified without using an additional pattern such as the coarse pattern (e.g., in Japanese Patent Application Publication No. 2006-168195). As a result, the pattern area of the test pattern can be reduced.

In addition to a so-called 1 ON N off line block (the line block in which the difference in progression between the nozzle numbers potting a line is N+1), at least one line block (the line block in which the difference in progression between the nozzle numbers plotting a line is not equal to N+1) having a line interval different from that of the abovementioned line block is included in the measurement test pattern, whereby the nozzle numbers within a range wider than (N+1) can be corrected.

Moreover, in the present embodiments, the direction of the dot deposition positions on the test pattern to be measured is the same as the main scanning direction of the scanner (FIG. 10), and the reading is performed by lowering the scanner reading resolution in the sub-scanning direction with respect to that of the main scanning direction (FIG. 11). This allows even commercially available scanners to read a whole A3 page in one pass and allows the measurement time to be shortened.

The amount of read image data is approximately 257 MB (at 2400 DPI for the main scanning and 200 DPI for the sub-scanning) and therefore small. This leads to a valuable reduction in the data processing time and prevents the computer performance required for this processing from increasing. Hence, the highly accurate dot position measurement which is aimed at can be implemented at relatively low cost.

In the embodiments, an average profile image, obtained by performing a partial averaging in terms of the line longitudinal direction (the sub-scanning direction of the scanner) when determining a line position in a read image, is formed, and this average profile image is subjected to a filter process. Scattering of ink (satellite droplets) and the contrast of dirt are relatively lowered due to the aforementioned reading at a low resolution in the sub-scanning direction, the averaging, and the filtering process. As a result, there is no requirement for a special method of removing dirt.

The averaging processing simultaneously reduces the adverse effect of irregular noise in the averaging direction, which has the eftbct of increasing the reliability of tone values and improving the accuracy of the algorithm for determining the position based on these tone values. The filtering process also reduces irregular noise components and sampling distortion, thereby smoothing the profile image and improving reliability in terms of the line position.

As a result of the processing (W/B correction processing) to correct tone values, in an averaged profile image, on the basis of the white background close to each line and the ink density, distortion of the profile image, caused by the effects of scanner flare or disruption of the recording paper, is corrected, together with reducing the shading of the scanner in the main scanning direction. Positional accuracy based on tone values can be improved by correcting the tone values in this way.

With the embodiments, a line position is calculated by using a plurality of average profile images with regions (ROI) for calculating the average profile displaced from one another by a fixed amount in a line longitudinal direction, and the plurality of line positions obtained are averaged. This processing adjusts the relative positional relationship (so-called sampling phase) between the read lines and scanner reading elements, thereby improving the line position accuracy still further.

In the embodiments, the reference line block is arranged including a line formed by the nozzles in substantially equal fashion in respect of each of the plurality of line blocks on the line pattern to be measured (FIG. 9). With this reference line block used as a reference position, a measurement position for each line block is corrected, thereby reducing influence of disturbance of a reading image grid caused by the variation in the scanner carriage. Moreover, in use of such a correction method, measurement that renders the reduction of the influence of paper deformation can be achieved.

Example of Composition of Dot Position Measurement Apparatus

Next, an example of the composition of a dot position measurement apparatus which uses the dot position measurement method described above will be explained. A program (dot position measurement processing program) is created which causes a computer to execute the image analysis processing algorithm used in the dot position measurement according to the present embodiment, and by running a computer on the basis of this program, it is possible to cause the computer to function as a calculating apparatus for the dot position measurement apparatus.

Figure 50:
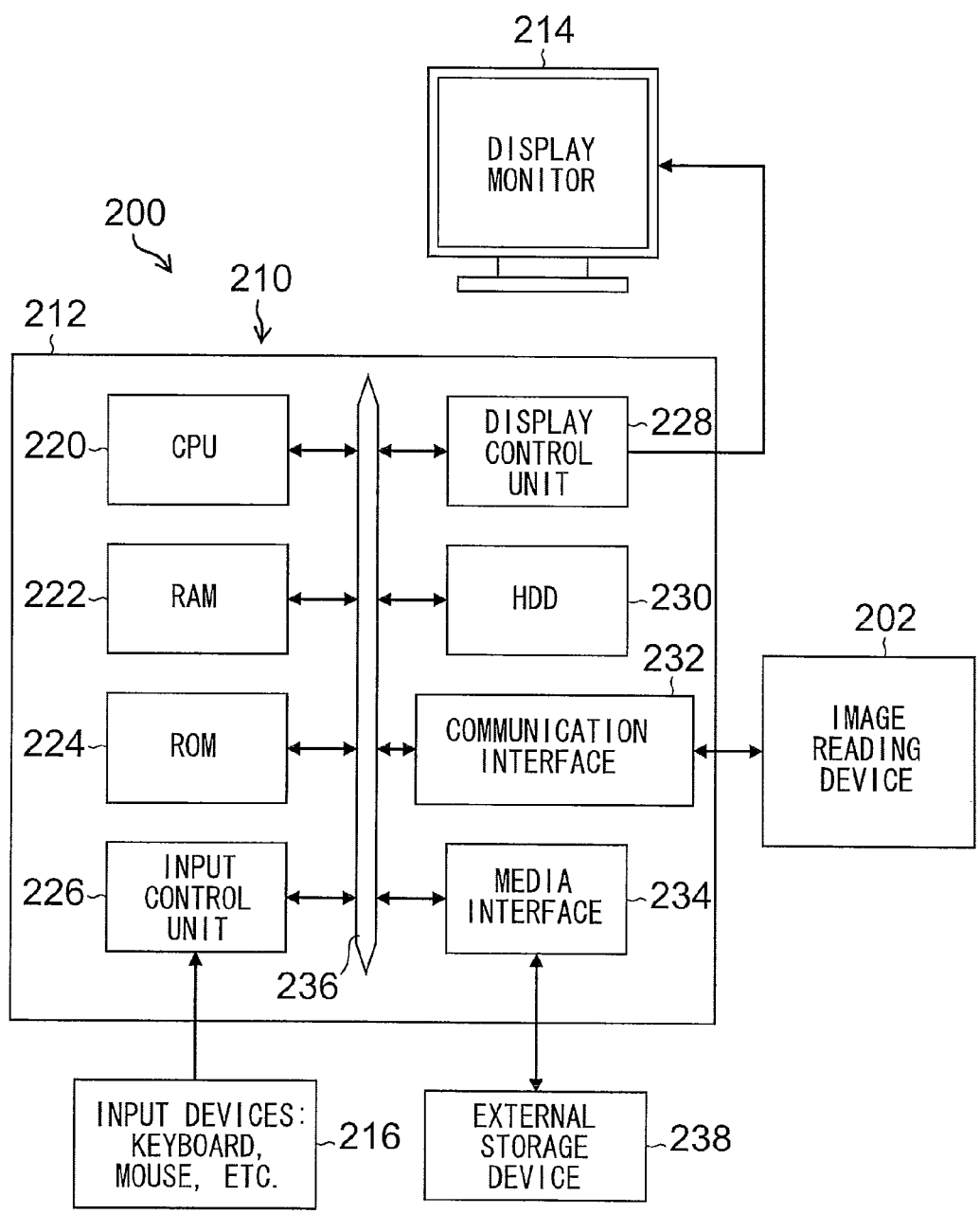
FIG. 50 is a block diagram illustrating an example of the composition of a dot position measurement apparatus.
Figure 51:
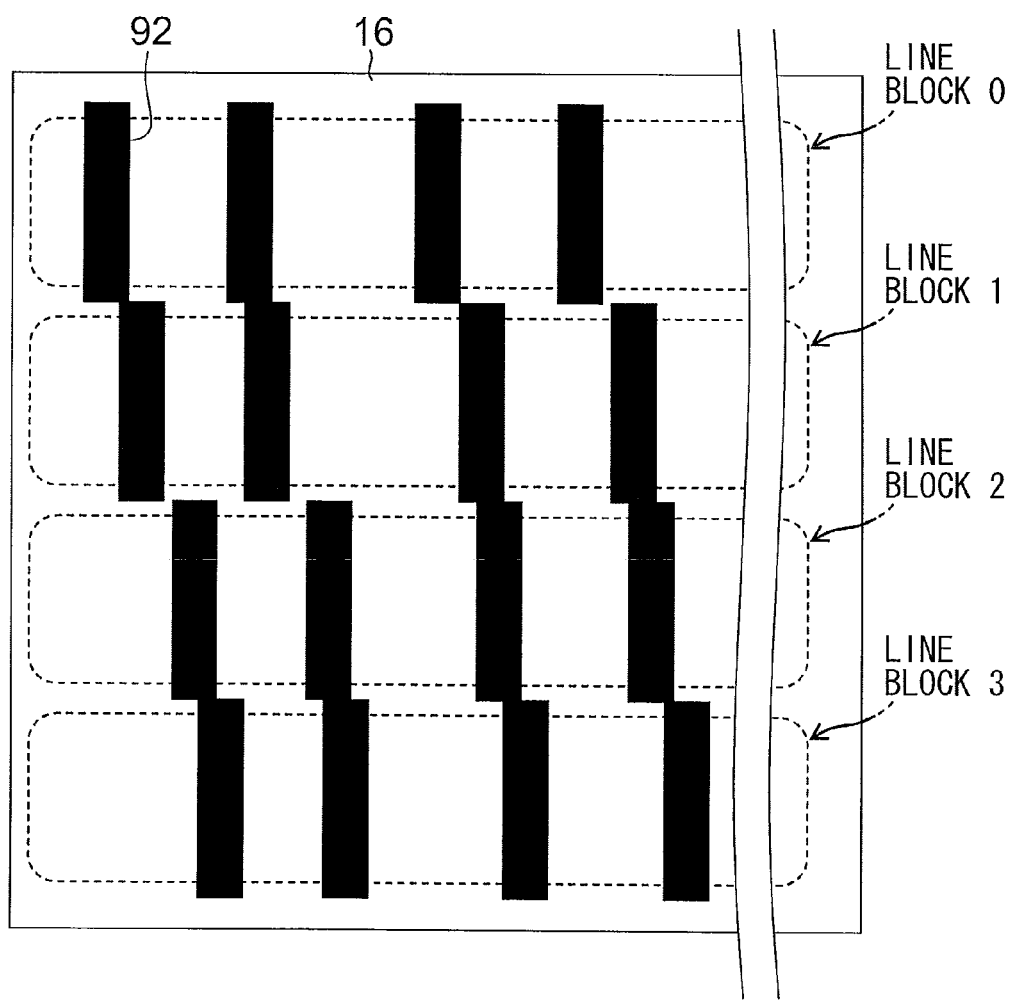
FIG. 51 is a diagram showing an example of a line pattern for dot position measurement in the related art.
Figure 52:
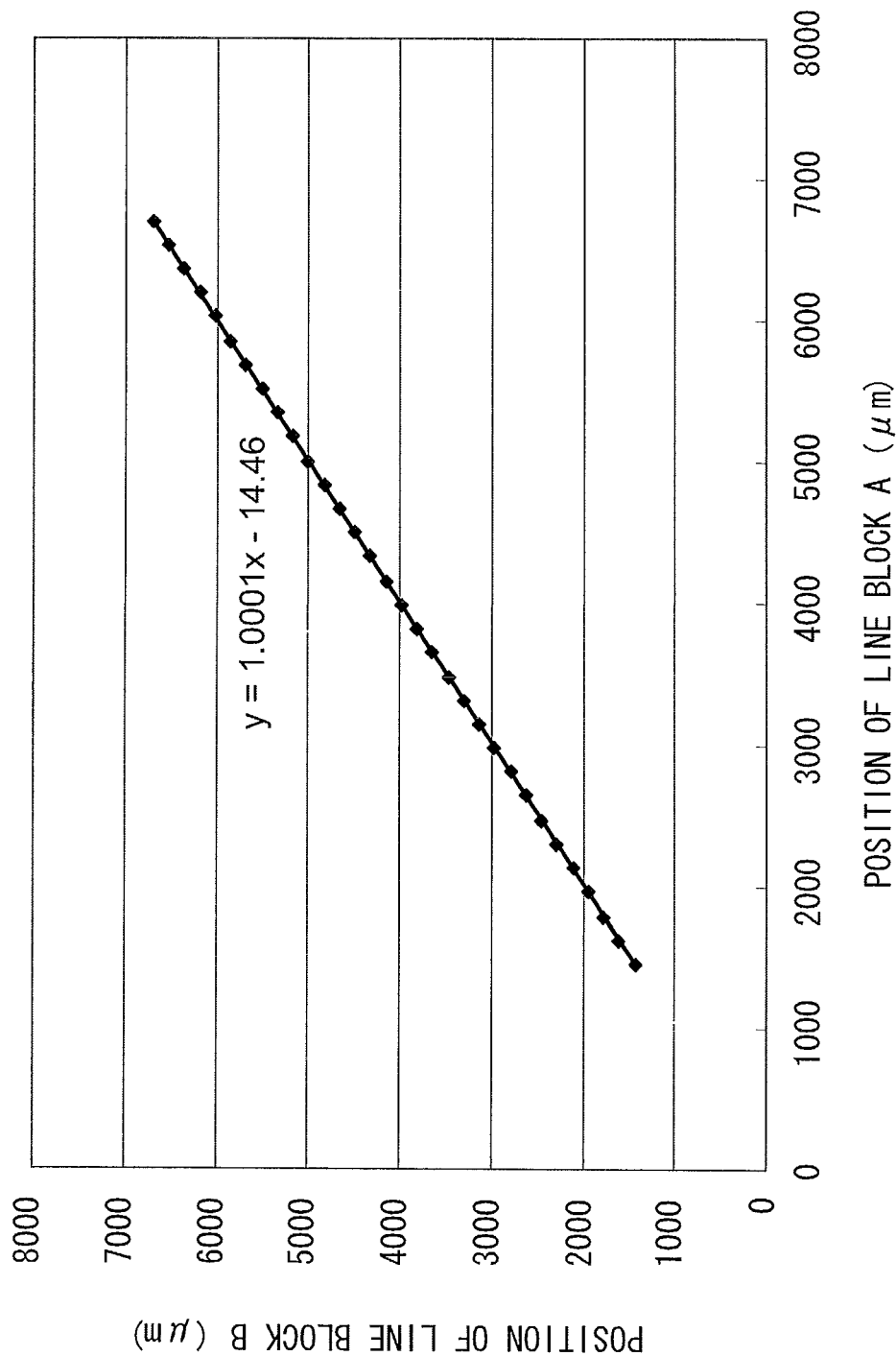
FIG. 52 is a graph showing positional variation depending on the sub-scanning position of the scanner in the related art.

FIG. 50 is a block diagram illustrating an example of the composition of the dot position measurement apparatus. The dot position measurement apparatus 200 illustrated in FIG. 50 includes: a flatbed scanner, which forms an image reading apparatus 202; and a computer 210, which performs calculations for image analysis, and the like.

The image reading apparatus 202 is provided with an RGB line sensor, which images the line patterns for measurement, and also includes a scanning mechanism, which moves the line sensor in the reading scanning direction (the scanner sub-scanning direction in FIG. 10), a drive circuit of the line sensor, and a signal processing circuit, which converts the output signal from the sensor (image capture signal), from analog to digital, in order to obtain a digital image data of a prescribed format, and so on.

The computer 210 includes a main body 212, a display (display device) 214, and an input device 216, such as a keyboard and mouse (input devices for inputting various commands). The main body 212 houses a central processing unit (CPU) 220, a RAM 222, a ROM 224, an input control unit 226, which controls the input of signals from the input device 216, a display control unit 228, which outputs display signals to the display 214, a hard disk device 230, a communication interface 232, a media interface 234, and the like, and these respective circuits are mutually connected by means of a bus 236.

The CPU 220 functions as a general control apparatus and computing apparatus (computing device). The RAM 222 is used as a temporary data storage region, and as a work area during execution of the program by the CPU 220. The ROM 224 is a rewriteable non-volatile storage device which stores a boot program for operating the CPU 220, various settings values and network connection information, and the like. An operating system (OS) and various applicational software programs and data, and the like, are stored in the hard disk apparatus 230.

The communication interface 232 is a device for connecting to an external device or communication network, on the basis of a prescribed communications system, such as USB (Universal Serial Bus), LAN, Bluetooth (registered trademark), or the like. The media interface 234 is a device which controls the reading and writing of an external storage device 238, which is typically a memory card, a magnetic disk, a magneto-optical disk, or an optical disk.

In the present embodiment, the image reading apparatus 202 and the computer 210 are connected through the communication interface 232, and the data of a captured image which is read in by the image reading apparatus 202 is input to the computer 210. A composition can be adopted in which the data of the captured image acquired by the image reading apparatus 202 is stored temporarily in the external storage device 238, and the captured image data is input to the computer 210 via this external storage device 238.

The image analysis processing program used in the method of measuring the dot positions according to the embodiment of the present invention is stored in the hard disk device 230 or the external storage device 238, and the program is read out, developed in the RAM 222 and executed, according to requirements. Alternatively, it is also possible to adopt a mode in which a program is supplied by a server situated on a network (not illustrated) which is connected via the communications interface 232, or a mode in which a computation processing service based on the program is supplied by a server based on the Internet.

The operator is able to input various initial values, by operating the input device 216 while observing the application window (not illustrated) displayed on the display monitor 214, as well as being able to confirm the calculation results on the monitor 214.

Furthermore, the data resulting from the calculation operations (measurement results) can be stored in the external storage device 238 or output externally via the communications interface 232. The information resulting from the measurement process is input to the inkjet recording apparatus through the communication interface 232 or the external storage device 238.

Modified Embodiment 1

A composition in which the functions of the dot position measurement apparatus 200 illustrated in FIG. 50 are incorporated in the inkjet recording apparatus is also possible. An embodiment in which a series of operations such as printing and then reading a measurement line pattern, and then performing dot position measurement by analyzing the image are carried out continuously by a control program of the inkjet recording apparatus, is also possible.

For example, a line sensor (print detection unit) for reading a print result may be provided downstream of the print unit 12 in the inkjet recording apparatus 10 illustrated in FIG. 1, and a measurement line pattern can be read with the line sensor.

Modified Embodiment 2

In the respective embodiments described above, an inkjet recording apparatus using a page-wide full line type head having a nozzle row of a length corresponding to the entire width of the recording medium has been described, but the scope of application of the present invention is not limited to this, and the present invention may also be applied to an inkjet recording apparatus which performs image recording by means of a plurality of head scanning actions which move a short recording head, such as a serial head (shuttle scanning head), or the like.

Modified Embodiment 3

In FIG. 1, the belt conveyance method is used as the conveyance device for the recording medium (recording paper 16), but in implementing the present invention, the conveyance device of the recording medium is not limited to the belt conveyance method and various other modes, such as a drum conveyance method or nip conveyance method, may be adopted.

Modified Embodiment 4

In the foregoing description, the inkjet recording apparatus has been described as one example of the image forming apparatus having the recording head, but the scope of application of the present invention is not limited to this. It is also possible to apply the present invention to image forming apparatuses employing various types dot recording methods, apart from an inkjet apparatus, such as a thermal transfer recording apparatus equipped with a recording head which uses thermal elements (heaters) are recording elements, an LED electrophotographic printer equipped with a recording head having LED elements as recording elements, or a silver halide photographic printer having an LED line type exposure head, or the like.

Furthermore, the meaning of the term "image forming apparatus" is not restricted to a so-called graphic printing application for printing photographic prints or posters, but rather also encompasses industrial apparatuses which are able to form patterns that may be perceived as images, such as resist printing apparatuses, wire printing apparatuses for electronic circuit substrates, ultra-fine structure forming apparatuses, etc., which use inkjet technology.

In other words, the present invention can be applied broadly, as a dot deposition (landing) position measurement technology, to various apparatuses (coating apparatus, spreading apparatus, application apparatus, line drawing apparatus, wiring drawing apparatus, fine structure forming apparatus, and so on) that eject a functional liquid or various other liquids toward a liquid receiving medium (recording medium) by using a liquid ejection head that functions as a recording head.

As can be seen from the description of embodiments of the present invention, described in detail hereinabove, this specification discloses various technological concepts including the following aspects of the invention.

An aspect of the present invention is directed to a dot position measurement method, comprising: a line pattern forming step of forming a measurement line pattern including a plurality of lines formed by dot sequences corresponding to respective recording elements on a recording medium, by continuously recording dots by the recording elements while causing a recording head having the recording elements and the recording medium to move relatively to each other in a relative movement direction, the measurement line pattern including: a plurality of line blocks each constituted of a group of lines to be recorded using the recording elements spaced a prescribed interval apart in an effective direction of alignment of the recording elements which is perpendicular to the relative movement direction, the line blocks being formed at mutually different positions in a lengthwise direction of the lines on the recording medium; and a reference line block containing lines to be recorded by the recording elements which are common respectively with the recording elements forming the line blocks; a reading step of reading the measurement line pattern formed on the recording medium in the line pattern forming step by an image reading device, and acquiring electronic image data representing a read image of the measurement line pattern; a position-in-line-block identifying step of identifying line positions in each of the line blocks and the reference line block, from the read image acquired in the reading step; and a position correcting step of correcting the line positions of the line blocks determined in the position-in-line-block identifying step in accordance with the reference line block, by employing a correction function using a piecewise polynomial expression.

According to this aspect of the present invention, even when unrecordable recording to elements exist, the correspondence relation of the recording element numbers with the line positions can be defined accurately, and highly accurate positional measurement can be realized. Moreover, no special pattern is required to understand the positions of the recording elements, thus the problem in which the area required by the measurement line pattern increases can be avoided.

Preferably, the determination step includes a relative position calculation step of obtaining relative positions of the line blocks from the function obtained for each of the line blocks; and the relationship between the temporary recording element number and the line positions among the line blocks is made consistent by changing the temporary recording element number of one of the line blocks that has a different tendency than the other of the line blocks, in accordance with a result of the relative position calculation step.

The correspondence relation between the line position and the temporary recording element number in the line block can be estimated from the function obtained for each line block, and the adequacy of the temporary recording element numbers is determined based on the relative positions between the line blocks.

Preferably, a tilt angle between the line blocks which expresses the relative position is calculated in the relative position calculation step.

There is a mode in which the tilt angle between the line blocks is calculated as a barometer expressing the relative position between the line blocks. The tilt of the line connecting two points (representative points) between the line blocks is calculated, and a line block having a wrong temporary recording element number can be identified from the difference between the tendencies of the tilt angles.

Moreover, the tilt (rotation angle) of the read image can be corrected from the tilt angles. The dot positions can be thus measured with a high degree of accuracy.

Preferably, the measurement line pattern includes a plurality of series of line blocks having mutually different line spaces of the group of lines.

According to this mode, the temporary recording element numbers can be corrected with a range of common multiples of line intervals of different series. Compared to the case where only one system of line blocks is used, the temporary recording element numbers can be corrected in a wider range.

Preferably, the measurement line pattern includes a reference line block containing lines to be recorded by the recording elements which are common respectively with the recording elements forming the line blocks; the position-in-line-block identifying step identifies the line positions in each of the line blocks and the reference line block, from the read image acquired in the reading step; and the dot position measurement method further comprises a position correcting step of correcting the line positions of the line blocks determined in the position-in-line-block identifying step in accordance with the reference line block.

According to this mode, it is possible to correct the positions of lines measured in the line blocks on the basis of the reference line block, and even if there is inconsistency or variation in the image reading apparatus used for the measurement, or variation in the positional distortion at the reading position, it is possible to reduce the effects of disturbance of the reading image grid points caused by these factors, and therefore high-accuracy measurement becomes possible. Furthermore, it is possible to perform measurement which reduces the effects of paper deformation.

By providing the reference line block, a configuration including "plurality of series of line blocks" described above can be created.

Preferably, the reference line block includes the lines recorded by the common recording elements, in substantially equal respectively to the line blocks.

By adopting a composition which includes the reference line block containing the lines formed by the common recording elements with the respective line blocks, in substantially even fashion, it is possible to correct the measurement positions of the line blocks accurately by taking the reference line block as a reference position.

Preferably, recording element numbers i (i=0, 1, 2, 3, ...) are assigned to the recording elements from an end of the effective recording element row aligned in a breadthways direction which is perpendicular to the relative movement direction, A is an integer larger than 1, B is an integer not smaller than 0 and not larger than A−1, C is an integer larger than 1 where C≠A, and C and A do not have a common denominator apart from 1, D is an integer not smaller than 0 and not larger than C−1, and N is an integer not smaller than 0; and the measurement line pattern is formed to include the line blocks formed on the recording medium at different recording timings in respective groups of AN+B recording element numbers, and the reference block formed in CN+D recording element numbers.

According to this mode, it is possible to form a plurality of line patterns including lines corresponding to all of the recording elements, as well as being able to form a reference line block containing lines formed by the same recording elements as the respective line blocks, in substantially even fashion.

Preferably, the position correction step corrects the line positions of the line blocks determined in the position-in-line-block identifying step in accordance with the reference line block, by employing a correction function using a piecewise polynomial expression.

According this mode, when correcting the measurement position of each line block based on the reference line block as the reference position, a correction function by the piecewise polynomial is adopted. Therefore, good approximation can be realized using a relatively low-order polynomial. Furthermore, compared to the case where the correction function of a single high-order polynomial is applied to the whole data range, more accurate correction can be performed.

In addition, it is possible to correct the positions of lines measured in the line blocks on the basis of the reference line block, and even if there is inconsistency or variation in the image reading apparatus used for the measurement, or variation in the positional distortion at the reading position, it is possible to reduce the effects of disturbance of the reading image grid points caused by these factors, and therefore high-accuracy measurement becomes possible. Furthermore, it is possible to perform measurement which reduces the effects of paper deformation.

Preferably, the polynomial expression is a low-order polynomial of an order not greater than five.

By adopting a piecewise polynomial expression for the correction function, it is possible to achieve good approximation even using relatively low-order polynomial expressions corresponding to the respective pieces, and therefore it is possible to suppress oscillatory effects which are a problem in the case of using a correction function based on a high-order polynomial expression, and high-accuracy measurement is possible.

Preferably, the position correcting step carries out correction by determining a correction function which causes the positions of lines recorded by the common recording element to coincide, between the reference line block and each of the line blocks.

Preferably, the above-described piecewise polynomial expression is used as this correction function.

Preferably, a line formed by the common recording element with the reference line block is extracted from each of the line blocks; and the correction function, an input value of which is the line position of the extracted line measured from the respective line blocks and an output value of which is the line position of the extracted line measured from the reference line block, is determined respectively for each line block.

According to this mode, it is possible to consolidate the line positions measured from the respective line blocks, over the position of the reference line block.

Preferably, a data sequence of measurement values representing the positions of the lines is divided into data regions of a prescribed range, a portion of the data is overlapped respectively between mutually adjacent data regions, and the polynomial expressions corresponding respectively to the data regions are determined; and the correction function relating to the overlapped data is a function which combines two corresponding polynomial expressions.

According to this mode, it is possible to correct a data region which spans two pieces, by means of smooth correction functions.

Preferably, the dot position measurement method further comprises: a correction table creating step of creating a fixed positional distortion correction table for correcting positional distortion characteristics of the image reading device in advance; and a fixed positional distortion correcting step of one of further correcting results corrected in the position correcting step, and correcting the line position data before correction in the position correcting step, by using the fixed positional distortion correction table.

The distortion characteristics of the image reading device are investigated in advance, and a fixed correction table (fixed positional distortion correction table) is prepared in advance in order to correct these distortion characteristics. By using this fixed positional distortion table to further correct the measurement position data after correction in the position correcting step, it is possible to correct variation caused by optical distortion of the image reading apparatus, or other factors.

It is also preferable that the dot position measurement method further comprises: a positional distortion correcting function determining step of determining a positional distortion correcting function for the image reading device, in accordance with results corrected in the position correcting step; and a positional distortion correcting step of further correcting the results corrected in the position correcting step, by using the determined positional distortion correcting function.

Instead of the aforementioned mode where the fixed positional distortion correction table is prepared, it is also possible to adopt a mode which determines a positional distortion correcting function by calculation on the basis of measurement position data obtained by reading a test pattern.

Preferably, the positional distortion correcting function determining step includes: a spacing value data generating step of generating spacing value data from the results corrected in the position correcting step; a high-frequency component removal calculation step of applying one of a moving average process and a low-pass filtering process to the spacing value data; and a position data sequence generating step of successively acquiring cumulative sums of the data sequence obtained in the high-frequency component removal calculation step and thereby converting same to a data sequence representing positions, wherein the positional distortion correcting function is determined to convert the data sequence generated in the position data sequence generating step to a data sequence of ideal positions.

One mode of a mode for determining a positional distortion correcting function by calculation involves applying a moving average process or low-pass filtering process to the data sequence of spacing values, thereby converting the obtained data sequence to a positional data sequence. By this means, it is possible to obtain a positional data sequence which expresses the distortional characteristics of the image reading device, and therefore high-accuracy measurement is possible by correcting the measurement position data using a correction function which converts the obtained positional data to a data sequence of ideal positions.

Preferably, the positional distortion correcting function determining step includes an approximate polynomial expression calculation step of determining an approximate polynomial expression by a least-squares method, from a data sequence representing positions obtained by correction in the position correcting step; and a difference between the approximate polynomial expression determined in the approximate polynomial expression calculation step and the data sequence representing the positions is determined, and corrected positions are determined by adding the difference thus determined to the ideal position values.

A further mode of a method for determining a positional distortion correcting function by calculation involves determining an approximate polynomial expression for the data sequence representing positions obtained by correction in the position correcting step. This approximate polynomial expression reflects the distortional characteristics of the image reading device. Corrected positions are obtained by determining the difference between the approximate polynomial expression and the data sequence representing positions obtained by correction in the position correcting step, and adding this difference to the ideal position values.

By this means, it is possible to achieve high-accuracy measurement which reduces the effects of the distortional characteristics of the image reading device.

Preferably, when reading the measurement line pattern in the reading step by means of the image reading device, reading is carried out, with the lengthwise direction of the lines of the measurement line pattern being oriented in a sub-scanning direction of the image reading device.

Preferably, the reading step acquires electronic image data representing the read image of the measurement line pattern by performing reading at a reading resolution lower in a sub-scanning direction of the image reading device in comparison with a reading resolution in the main scanning direction of the image reading device.

According to the present mode, since the measurement line pattern is read at low resolution in the sub-scanning direction, the data volume of the read image is small and the reading time is fast. Furthermore, since the data volume of the read image is small, then beneficial effects are obtained in that the data processing time is shortened and the processing load is also restricted.

Preferably, the dot position measurement method further comprises: a region setting step of setting a plurality of averaged regions in which image signals of the line block constituted of the lines aligned in the main scanning direction are averaged in the sub-scanning direction on the read image, at different positions in the sub-scanning direction within that line block; an average profile image creating step of creating average profile images corresponding to positions in the main scanning direction, by averaging the image signals in the sub-scanning direction within each of the averaged regions which are set at the different positions; and a position-in-averaged-region specifying step of specifying the line positions within the averaged regions from the average profile images, wherein the position-in-line-block specifying step specifies the positions of the respective lines in the line block, in accordance with the line positions in the averaged regions specified from the average profile images corresponding respectively to the averaged regions.

According to the present mode, lines positions (in other words, the positions of dots recorded by the recording elements) are determined using a plurality of average profile images obtained from a plurality of averaged regions at different positions in the sub-scanning direction, and therefore it is possible to measure dot positions with very high accuracy in relation to the reading resolution.

Preferably, the dot position measurement method further comprises: an edge position identifying step of identifying, for each line, two edge positions of the line from the average profile image, wherein the position-in-averaged-region specifying step specifies the line position in the averaged region in accordance with the two edge positions specified in the edge position identifying step.

According to the present mode, it is possible to identify line positions with high accuracy.

Preferably, the dot position measurement method further comprises a filtering step of performing a filtering process on the average profile images.

By averaging the image signal in terms of the sub-scanning direction so as to form an average profile image, irregular noise components caused by dirt and satellites can be reduced; however, by further performing a filtering process on the average profile image, irregular noise components and sampling distortion can be reduced still further, whereby reliability of line position measurement can be improved.

Preferably, the dot position measurement method further comprises a tone value correcting step of correcting tone values of the read image according to density values of a recording region where the dots are recorded and a non-recording region where the dots are not recorded on the recording medium.

According to this aspect, distortion of the profile image caused by the effects of disruption of the recording paper and so on, can be corrected, and also shading of the image reading device can be reduced, thereby improving line position measurement accuracy.

Preferably, the dot position measurement method further comprises: a rotation angle determination step of determining a relative rotation angle between the measurement line pattern and the image reading device according to positions of the lines formed in different positions on the recording medium with a same one of the recording elements in the line pattern forming step; and a rotation correcting step of calculating rotational correction with respect to position information according to the relative rotation angle determined in the rotation angle determination step.

The relative rotation angle can be determined from the positions of the lines formed spaced apart by a predetermined distance on the recording medium, using the same one of the recording elements.

Another aspect of the present invention is directed to a dot position measurement apparatus, comprising: an image reading device which acquires electronic image data representing a read image of a measurement line pattern by reading in the measurement line pattern in which a plurality of lines are formed by dot sequences corresponding to respective recording elements on a recording medium, by continuously recording dots by the recording elements while causing a recording head having the recording elements and the recording medium to move relatively to each other in a relative movement direction, the measurement line pattern including a plurality of line blocks each constituted of a group of lines to be recorded using the recording elements spaced a prescribed interval apart in an effective direction of alignment of the recording elements which is perpendicular to the relative movement direction, the line blocks being formed at mutually different positions in a lengthwise direction of the lines on the recording medium; a position-in-line-block identifying device which identifies line positions in each of the line blocks, from the read image acquired by the image reading device; a function determination device which provides a temporary recording element number corresponding to the line positions within each of the line blocks, and obtains a function representing a relationship between the temporary recording element number and the line positions for each of the line blocks; a determination device which determines whether there is an error in the temporary recording element number for each of the line blocks, between the line blocks, in accordance with the function obtained for each of the line blocks; and a recording element position specifying device which changes the temporary recording element number of at least one of the line blocks which is determined to have the error in the temporary recording element number by the determination device, and specifies a correspondence relation between the line positions within each of the line blocks and the recording elements.

Preferably, the determination device includes a relative position calculation device which obtains relative positions of the line blocks from the function obtained for each of the line blocks; and the relationship between the temporary recording element number and the line positions among the line blocks is made consistent by changing the temporary recording element number of one of the line blocks that has a different tendency than the other of the line blocks, in accordance with a result of the relative position calculation device.

Preferably, the measurement line pattern includes a reference line block containing lines to be recorded by the recording elements which are common respectively with the recording elements forming the line blocks; the position-in-line-block identifying device identifies the line positions in each of the line blocks and the reference line block, from the read image acquired by the image reading device; and the dot position measuring apparatus further comprises a position correcting device which corrects the line positions of the line blocks determined in the position-in-line-block identifying device in accordance with the reference line block.

Preferably, the dot position measurement apparatus further comprises: a storage device which stores in advance a fixed positional distortion correction table for correcting positional distortion characteristics of the image reading device; and a fixed positional distortion correcting device which performs one of further correction of results corrected by the position correcting device by using the fixed positional distortion correction table, and correction of the line position data before correction by the position correcting device, by using the fixed distortion correction table.

Preferably, the dot position measurement apparatus further comprises: a positional distortion correcting function determining device which determines a positional distortion correcting function for the image reading device in accordance with results corrected by the position correcting device; and a positional distortion correcting device which further corrects the results corrected by the position correcting device, by using the determined positional distortion correcting function.

Preferably, the positional distortion correcting function determining device includes: a spacing value data generating device which generates spacing value data from the results corrected by the position correcting device; a high-frequency component removal calculation device which applies one of a moving average process and a low-pass filtering process to the spacing value data; and a position data sequence generating device which successively acquires cumulative sums of the data sequence obtained by the high-frequency component removal calculation device and thereby converts same to a data sequence representing positions, wherein the positional distortion correcting function is determined to convert the data sequence generated by the position data sequence generation device to a data sequence of ideal positions.

Preferably, the positional distortion correcting function determining device includes an approximate polynomial expression calculation device which determines an approximate polynomial expression by a least-squares method, from a data sequence representing positions obtained by correction by the position correcting device; and a difference between the approximate polynomial expression determined in the approximate polynomial expression calculation device and the data sequence representing the positions is determined, and corrected positions are determined by adding the difference thus determined to the ideal position values.

Preferably, the dot position measurement apparatus further comprises: a region setting device which sets a plurality of averaged regions in which image signals of the line block constituted of the lines aligned in the main scanning direction are averaged in the sub-scanning direction on the read image, at different positions in the sub-scanning direction within that line block; an average profile image creation device which creates average profile images corresponding to positions in the main scanning direction, by averaging the image signals in the sub-scanning direction within each of the averaged regions which are set at the different positions; and a position-in-averaged-region specifying device which specifies the line positions within the averaged regions from the average profile images, wherein the position-in-line-block specifying device specifies the positions of the respective lines in the line block, in accordance with the line positions in the averaged regions specified from the average profile images corresponding respectively to the averaged regions.

Preferably, the dot position measurement apparatus further comprises: an edge position identifying device which identifies, for each line, two edge positions of the line from the average profile image, wherein the position-in-averaged-region specifying device specifies the line position in the averaged region in accordance with the two edge positions specified by the edge position identifying device.

Preferably, the dot position measurement apparatus further comprises a filtering device that performs a filtering process of the average profile images.

Preferably, the dot position measurement apparatus further comprises a tone value correcting device which corrects tone values of the read image according to density values of a recording region where the dots are recorded and a non-recording region where the dots are not recorded on the recording medium.

Preferably, the dot position measurement apparatus further comprises: a rotation angle determination device which determines a relative rotation angle between the measurement line pattern and the image reading device according to positions of the lines formed in different positions on the recording medium with a same one of the recording elements; and a rotation correcting device which calculates rotational correction with respect to position information according to the relative rotation angle determined by the rotation angle determination device.

Another aspect of the present invention is directed to a computer readable medium storing instructions causing a computer to function as the position-in-line-block identifying device, the function determination device, the determination device, and the recording element position specifying device in the dot position measurement apparatus.

Note that, according to the above program, an aspect can also be directed toward providing a program causing a computer to function as the relative position calculation device, the position correcting device, the storage device, the fixed positional distortion correcting device, the positional distortion correcting function determining device, the positional distortion correcting device, the spacing value data generating device, the high-frequency component removal calculation device, the position data sequence generating device, the approximate polynomial expression calculation device, the region setting device, the average profile image creation device, the position-in-averaged-region specifying device, the edge position identifying device, the filtering device, the tone value correcting device, the rotation angle determination device, and the rotation correcting device.

The program of the present invention can be adopted as an operating program of a CPU (central processing unit) incorporated in a printer or the like, or applied to a computer system such as a personal computer.

Alternatively, the program may be constituted as standalone application software, or integrated as part of another application such as image editing software. A program of this type can also be recorded on an information storage medium (external storage apparatus) such as a CD-ROM or magnetic disk and supplied to a third party via this information storage medium, or a program download service can be provided via a communication link such as the Internet.

Furthermore, an inkjet recording apparatus serving as one aspect of an image forming apparatus of the present invention for forming an image on a recording medium by using a recording head includes: a droplet ejection head (corresponding to the "recording head") which has a droplet ejection element array in which are arranged a plurality of droplet ejection elements (corresponding to the "recording elements") which each have a nozzle which ejects ink droplets for forming dots, and a pressure generating device (piezoelectric element or heating element or the like) for generating an ejection pressure; and an ejection control device which controls ejection of droplets from the recording head on the basis of ink ejection data generated from the image data, wherein an image is formed on the recording medium by the droplets ejected from the nozzle.

As an example of the composition of the recording head, a full line head with a recording element array in which are arranged a plurality of recording elements over a length corresponding to the entire width of the recording medium can be used. In this case, the composition may involve combining a plurality of comparatively short recording head modules which each have a recording element array not matching the length corresponding to the entire width of the recording element, such that, by linking the modules together, a recording element array is formed with a length corresponding to the entire width of the recording element.

A full line head is normally disposed along a direction orthogonal to the relative feed direction of the recording medium (relative conveyance direction), but the configuration may also be such that the recording head are arranged in an inclined direction at a certain predetermined angle to the direction orthogonal to the conveyance direction.

"Recording medium" encompasses various media that accept the recording of an image by the action of a recording head (for example, so-called, an image formation medium, printed medium, print-receiving medium, image-receiving medium, ejection-receiving medium or the like), such as spooled paper, cut paper, seal paper, an OHP sheet or other resin sheet, film, fabric, an intermediate transfer medium, and a print substrate on which a wiring pattern is printed by an inkjet recording apparatus, and the recording media may include other media regardless of shape and material.

"Conveyance device" encompasses an aspect where a recording medium is conveyed to a stopped (fixed) recording head, an aspect where a recording head is moved to a stopped recording medium, and an aspect where both the recording head and the recording medium are moved.

In cases where a color image is formed by an inkjet head, recording heads which each correspond each color of a plurality of inks (recording liquids) may be arranged, or inks of a plurality of colors may be ejected by one recording head.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:
1. A dot position measurement method, comprising:
a line pattern forming step of forming a measurement line pattern including a plurality of lines formed by dot sequences corresponding to respective recording elements on a recording medium, by continuously recording dots by the recording elements while causing a recording head having the recording elements and the recording medium to move relatively to each other in a relative movement direction, the measurement line pattern including a plurality of line blocks each constituted of a group of lines to be recorded using the recording elements spaced a prescribed interval apart in an effective direction of alignment of the recording elements which is perpendicular to the relative movement direction, the line blocks being formed at mutually different positions in a lengthwise direction of the lines on the recording medium;
a reading step of reading the measurement line pattern formed on the recording medium in the line pattern forming step by an image reading device, and acquiring electronic image data representing a read image of the measurement line pattern;
a position-in-line-block identifying step of identifying line positions in each of the line blocks, from the read image acquired in the reading step;
a function determination step of providing a temporary recording element number corresponding to the line positions within each of the line blocks starting from one of ends of the group of lines at the line block, to each of the line positions, and obtaining a function representing a relationship between the temporary recording element number and the line positions for each of the line blocks;

a determination step of determining whether there is an error in the temporary recording element number for each of the line blocks, between the line blocks, in accordance with the function obtained for each of the line blocks; and a recording element position specifying step of changing the temporary recording element number of at least one of the line blocks which is determined to have the error in the temporary recording element number in the determination step, and specifying a correspondence relation between the line positions within each of the line blocks and the recording elements.

2. The dot position measurement method as defined in claim 1, wherein:

the determination step includes a relative position calculation step of obtaining relative positions of the line blocks from the function obtained for each of the line blocks; and the relationship between the temporary recording element number and the line positions among the line blocks is made consistent by changing the temporary recording element number of one of the line blocks that has a different tendency than the other of the line blocks, in accordance with a result of the relative position calculation step.

3. The dot position measurement method as defined in claim 2, wherein a tilt angle between the line blocks which expresses the relative position is calculated in the relative position calculation step.

4. The dot position measurement method as defined in claim 1, wherein the measurement line pattern includes a plurality of series of line blocks having mutually different line spaces of the group of lines.

5. The dot position measurement method as defined in claim 1, wherein:

the measurement line pattern includes a reference line block containing lines to be recorded by the recording elements which are common respectively with the recording elements forming the line blocks;

the position-in-line-block identifying step identifies the line positions in each of the line blocks and the reference line block, from the read image acquired in the reading step; and the dot position measurement method further comprises a position correcting step of correcting the line positions of the line blocks determined in the position-in-line-block identifying step in accordance with the reference line block.

6. The dot position measurement method as defined in claim 5, wherein the reference line block includes the lines recorded by the common recording elements, in substantially equal respectively to the line blocks.

7. The dot position measurement method as defined in claim 1, wherein:

recording element numbers i (i=0, 1, 2, 3, ...) are assigned to the recording elements from an end of the effective recording element row aligned in a breadthways direction which is perpendicular to the relative movement direction, A is an integer larger than 1, B is an integer not smaller than 0 and not larger than A−1, C is an integer larger than 1 where C≠A, and C and A do not have a common denominator apart from 1, D is an integer not smaller than 0 and not larger than C−1, and N is an integer not smaller than 0; and the measurement line pattern is formed to include the line blocks formed on the recording medium at different recording timings in respective groups of AN+B recording element numbers, and the reference block formed in CN+D recording element numbers.

8. The dot position measurement method as defined in claim 5, wherein the position correction step corrects the line positions of the line blocks determined in the position-in-line-block identifying step in accordance with the reference line block, by employing a correction function using a piecewise polynomial expression.

9. The dot position measurement method as defined in claim 5, further comprising:

a correction table creating step of creating a fixed positional distortion correction table for correcting positional distortion characteristics of the image reading device in advance; and a fixed positional distortion correcting step of one of further correcting results corrected in the position correcting step, and correcting the line position data before correction in the position correcting step, by using the fixed positional distortion correction table.

10. The dot position measurement method as defined in claim 5, further comprising:

a positional distortion correcting function determining step of determining a positional distortion correcting function for the image reading device, in accordance with results corrected in the position correcting step; and a positional distortion correcting step of further correcting the results corrected in the position correcting step, by using the determined positional distortion correcting function.

11. The dot position measurement method as defined in claim 1, wherein, when reading the measurement line pattern in the reading step by means of the image reading device, reading is carried out, with the lengthwise direction of the lines of the measurement line pattern being oriented in a sub-scanning direction of the image reading device.

12. The dot position measurement method as defined in claim 1, wherein the reading step acquires electronic image data representing the read image of the measurement line pattern by performing reading at a reading resolution lower in a sub-scanning direction of the image reading device in comparison with a reading resolution in the main scanning direction of the image reading device.

13. The dot position measurement method as defined in claim 1, further comprising:

a region setting step of setting a plurality of averaged regions in which image signals of the line block constituted of the lines aligned in the main scanning direction are averaged in the sub-scanning direction on the read image, at different positions in the sub-scanning direction within that line block;

an average profile image creating step of creating average profile images corresponding to positions in the main scanning direction, by averaging the image signals in the sub-scanning direction within each of the averaged regions which are set at the different positions; and a position-in-averaged-region specifying step of specifying the line positions within the averaged regions from the average profile images, wherein the position-in-line-block specifying step specifies the positions of the respective lines in the line block, in accordance with the line positions in the averaged regions specified from the average profile images corresponding respectively to the averaged regions.

14. The dot position measurement method as defined in claim 13, further comprising:
an edge position identifying step of identifying, for each line, two edge positions of the line from the average profile image,
wherein the position-in-averaged-region specifying step specifies the line position in the averaged region in accordance with the two edge positions specified in the edge position identifying step.

15. The dot position measurement method as defined in claim 1, further comprising a tone value correcting step of correcting tone values of the read image according to density values of a recording region where the dots are recorded and a non-recording region where the dots are not recorded on the recording medium.

16. The dot position measurement method as defined in claim 1, further comprising:
a rotation angle determination step of determining a relative rotation angle between the measurement line pattern and the image reading device according to positions of the lines formed in different positions on the recording medium with a same one of the recording elements in the line pattern forming step; and
a rotation correcting step of calculating rotational correction with respect to position information according to the relative rotation angle determined in the rotation angle determination step.

17. A dot position measurement apparatus, comprising:
an image reading device which acquires electronic image data representing a read image of a measurement line pattern by reading in the measurement line pattern in which a plurality of lines are formed by dot sequences corresponding to respective recording elements on a recording medium, by continuously recording dots by the recording elements while causing a recording head having the recording elements and the recording medium to move relatively to each other in a relative movement direction, the measurement line pattern including a plurality of line blocks each constituted of a group of lines to be recorded using the recording elements spaced a prescribed interval apart in an effective direction of alignment of the recording elements which is perpendicular to the relative movement direction, the line blocks being formed at mutually different positions in a lengthwise direction of the lines on the recording medium;
a position-in-line-block identifying device which identifies line positions in each of the line blocks, from the read image acquired by the image reading device;
a function determination device which provides a temporary recording element number corresponding to the line positions within each of the line blocks starting from one of ends of the group of lines at the line block, to each of the line positions, and obtains a function representing a relationship between the temporary recording element number and the line positions for each of the line blocks;
a determination device which determines whether there is an error in the temporary recording element number for each of the line blocks, between the line blocks, in accordance with the function obtained for each of the line blocks; and
a recording element position specifying device which changes the temporary recording element number of at least one of the line blocks which is determined to have the error in the temporary recording element number by the determination device, and specifies a correspondence relation between the line positions within each of the line blocks and the recording elements.

18. The dot position measuring apparatus as defined in claim 17, wherein:
the determination device includes a relative position calculation device which obtains relative positions of the line blocks from the function obtained for each of the line blocks; and
the relationship between the temporary recording element number and the line positions among the line blocks is made consistent by changing the temporary recording element number of one of the line blocks that has a different tendency than the other of the line blocks, in accordance with a result of the relative position calculation device.

19. The dot position measuring apparatus as defined in claim 17, wherein:
the measurement line pattern includes a reference line block containing lines to be recorded by the recording elements which are common respectively with the recording elements forming the line blocks;
the position-in-line-block identifying device identifies the line positions in each of the line blocks and the reference line block, from the read image acquired by the image reading device; and
the dot position measuring apparatus further comprises a position correcting device which corrects the line positions of the line blocks determined in the position-in-line-block identifying device in accordance with the reference line block.

20. The dot position measurement apparatus as defined in claim 19, further comprising:
a storage device which stores in advance a fixed positional distortion correction table for correcting positional distortion characteristics of the image reading device; and
a fixed positional distortion correcting device which performs one of further correction of results corrected by the position correcting device by using the fixed positional distortion correction table, and correction of the line position data before correction by the position correcting device, by using the fixed distortion correction table.

21. The dot position measurement apparatus as defined in claim 19, further comprising:
a positional distortion correcting function determining device which determines a positional distortion correcting function for the image reading device in accordance with results corrected by the position correcting device; and
a positional distortion correcting device which further corrects the results corrected by the position correcting device, by using the determined positional distortion correcting function.

22. The dot position measurement apparatus as defined in claim 17, further comprising:
a region setting device which sets a plurality of averaged regions in which image signals of the line block constituted of the lines aligned in the main scanning direction are averaged in the sub-scanning direction on the read image, at different positions in the sub-scanning direction within that line block;
an average profile image creation device which creates average profile images corresponding to positions in the main scanning direction, by averaging the image signals in the sub-scanning direction within each of the averaged regions which are set at the different positions; and a position-in-averaged-region specifying device which specifies the line positions within the averaged regions from the average profile images, wherein the position-in-line-block specifying device specifies the positions of the respective lines in the line block, in accordance with the line positions in the averaged regions specified from the average profile images corresponding respectively to the averaged regions.

23. The dot position measurement apparatus as defined in claim 22, further comprising:

an edge position identifying device which identifies, for each line, two edge positions of the line from the average profile image, wherein the position-in-averaged-region specifying device specifies the line position in the averaged region in accordance with the two edge positions specified by the edge position identifying device.

24. The dot position measurement apparatus as defined in claim 17, further comprising a tone value correcting device which corrects tone values of the read image according to density values of a recording region where the dots are recorded and a non-recording region where the dots are not recorded on the recording medium.

25. The dot position measurement apparatus as defined in claim 17, further comprising:

a rotation angle determination device which determines a relative rotation angle between the measurement line pattern and the image reading device according to positions of the lines formed in different positions on the recording medium with a same one of the recording elements; and a rotation correcting device which calculates rotational correction with respect to position information according to the relative rotation angle determined by the rotation angle determination device.

26. A non-transitory computer readable medium storing instructions causing a computer to function as the position-in-line-block identifying device, the function determination device, the determination device, and the recording element position specifying device in the dot position measurement apparatus as defined in claim 17.

* * * * *